United States Patent [19]

LeBrun et al.

[11] Patent Number: 4,510,619

[45] Date of Patent: Apr. 9, 1985

[54] DOCUMENT PROCESSING SYSTEM

[75] Inventors: Thomas Q. LeBrun; John Torkelson, both of Dallas; Roy E. Dempster; Richard G. Van Tyne, both of Richardson, all of Tex.

[73] Assignee: BancTec, Incorporated, Dallas, Tex.

[21] Appl. No.: 307,809

[22] Filed: Oct. 1, 1981

[51] Int. Cl.³ .............................................. G06K 9/00
[52] U.S. Cl. ...................................... 382/57; 235/432; 235/475
[58] Field of Search ................... 382/57; 235/432, 454, 235/475

[56] References Cited

U.S. PATENT DOCUMENTS

| | | | |
|---|---|---|---|
| 2,787,190 | 4/1957 | McWhirter et al. | 88/24 |
| 3,170,139 | 2/1965 | Rabinow | 382/57 |
| 3,264,610 | 8/1966 | Rabinow | 382/57 |
| 3,305,833 | 2/1967 | Gallien | 382/57 |
| 3,832,682 | 8/1974 | Brok et al. | 382/57 |
| 3,942,153 | 3/1976 | Balko et al. | 340/146.3 F |
| 4,013,876 | 3/1977 | Anstin | 235/151 |
| 4,027,142 | 5/1977 | Paup et al. | 235/475 |
| 4,037,198 | 7/1977 | Essenmacher et al. | 382/57 |
| 4,068,212 | 1/1978 | Templeton | 382/57 |
| 4,088,982 | 5/1978 | Haas | 382/57 |
| 4,101,959 | 7/1978 | Domike et al. | 364/200 |
| 4,139,901 | 2/1979 | Ganske et al. | 364/900 |
| 4,201,978 | 5/1980 | Nally | 382/57 |
| 4,205,780 | 6/1980 | Burns et al. | 235/454 |
| 4,264,808 | 4/1981 | Owens et al. | 235/432 |
| 4,315,246 | 2/1982 | Milford | 382/57 |

Primary Examiner—Leo H. Boudreau
Attorney, Agent, or Firm—Kenneth R. Glaser

[57] ABSTRACT

A document processing system including a modular transport system which includes a digital image capture system, character recognition circuitry, document encoding systems, endorsers, audit trail printers and an in-line microfilm record system. Associated video terminals and non-impact printers are utilized to provide visual images of documents processed by the system. Selected documents may be read, endorsed, encoded, digitally imaged, filmed and sorted in a single continuous pass through the document processing system of the present invention.

1 Claim, 81 Drawing Figures

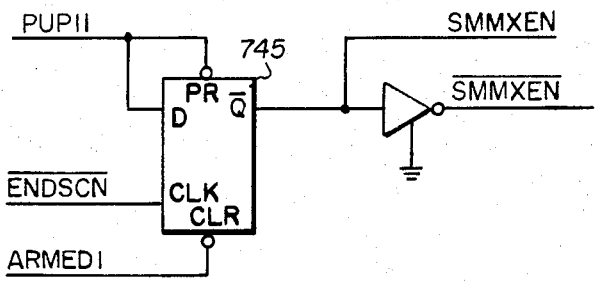
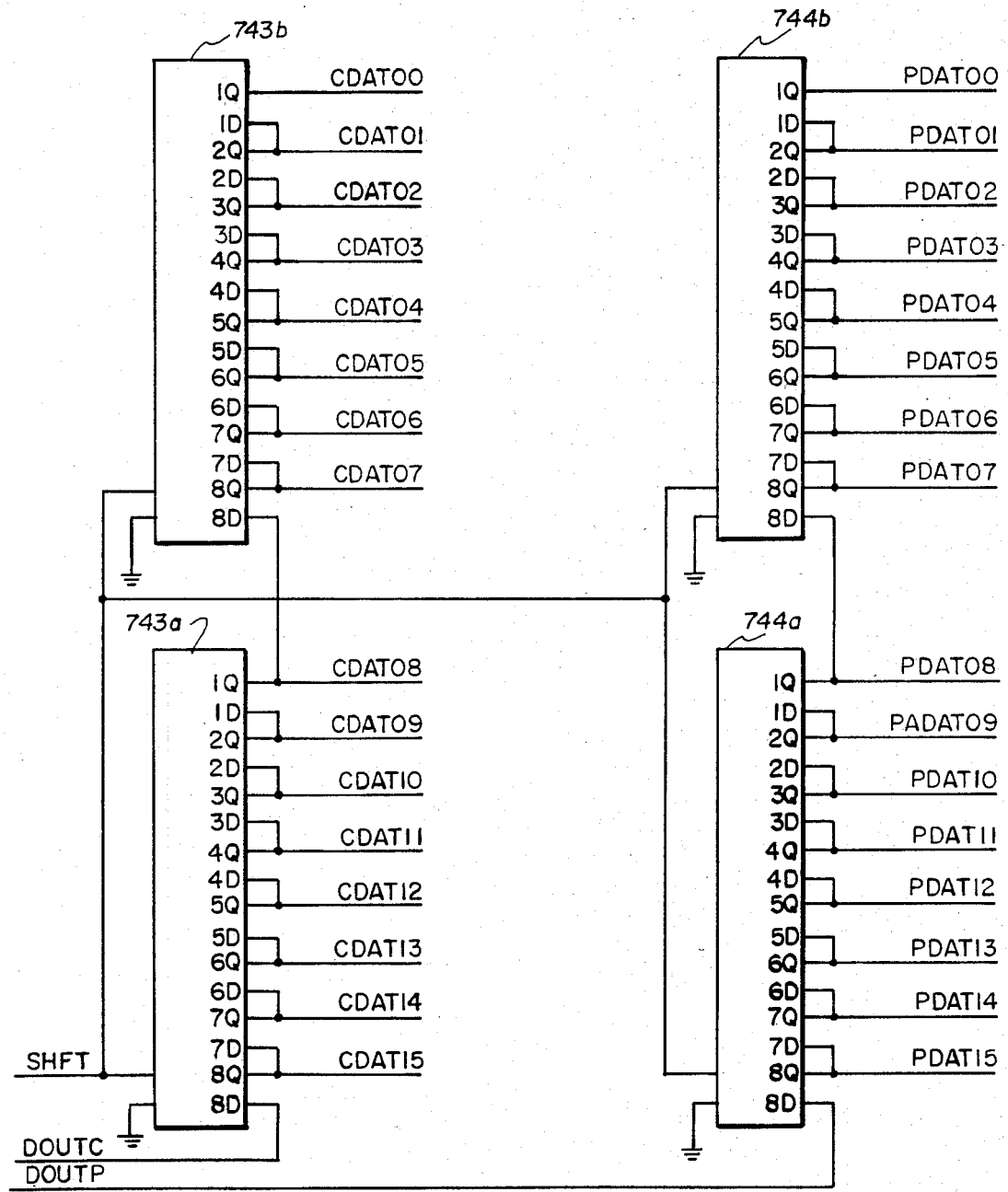
FIG. 7k

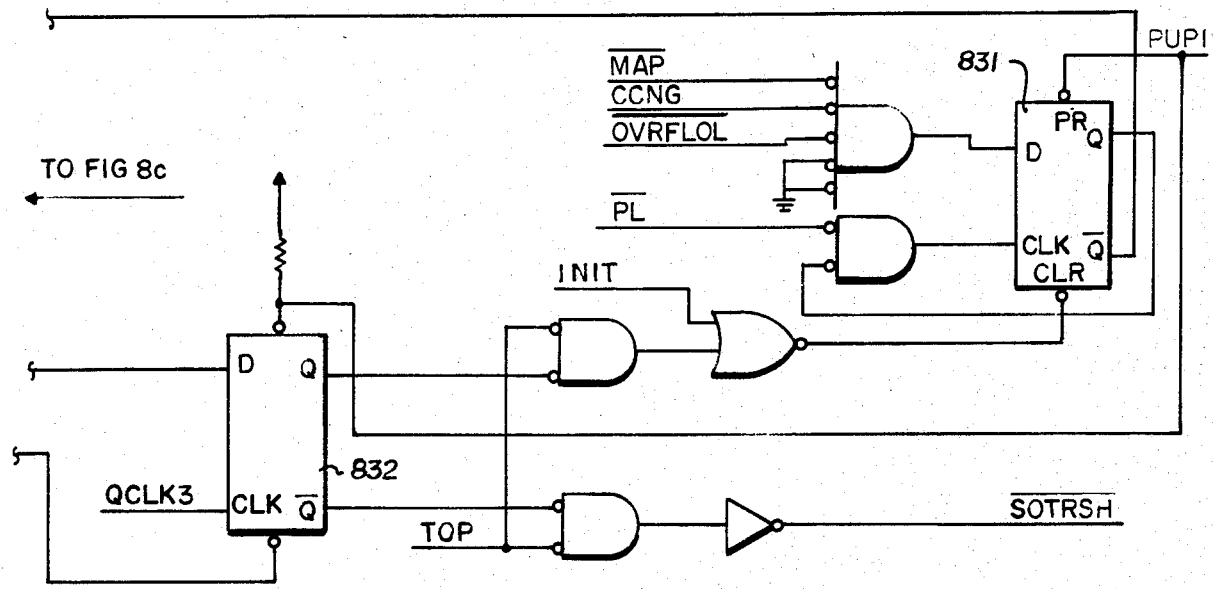
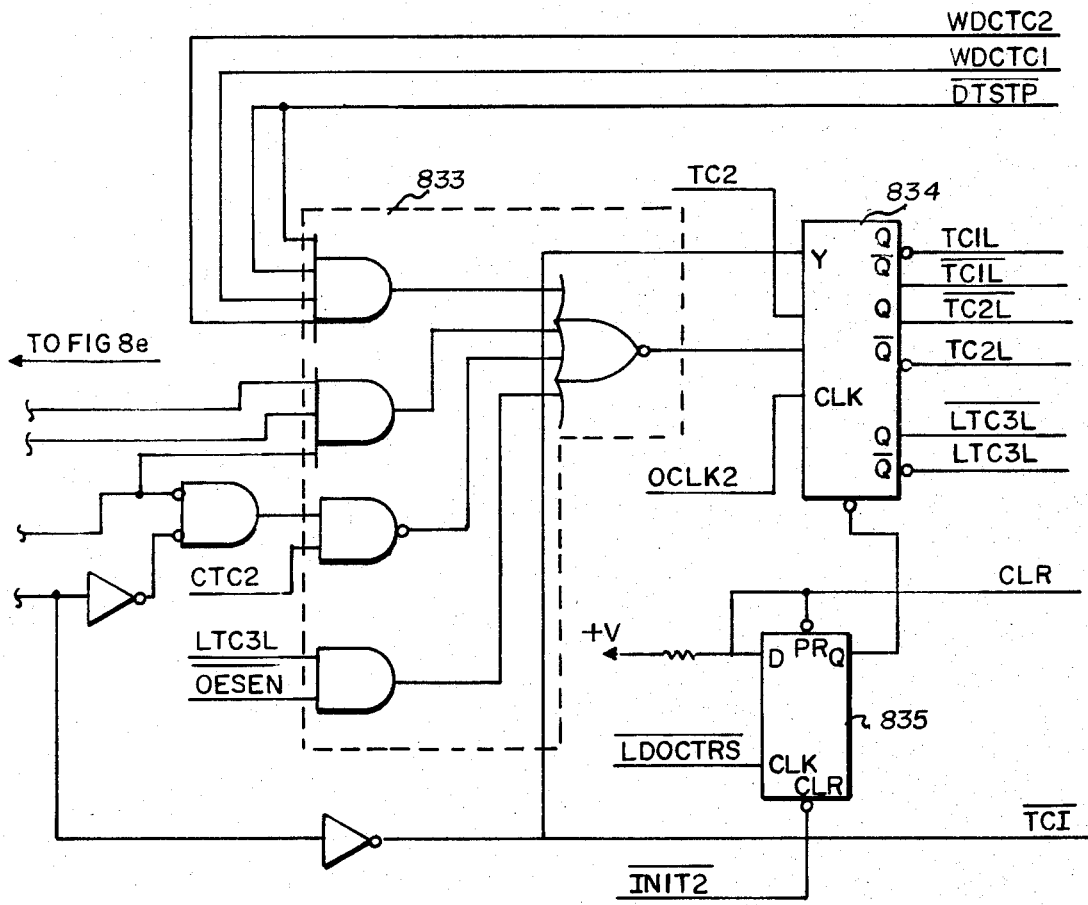
FIG. 8f

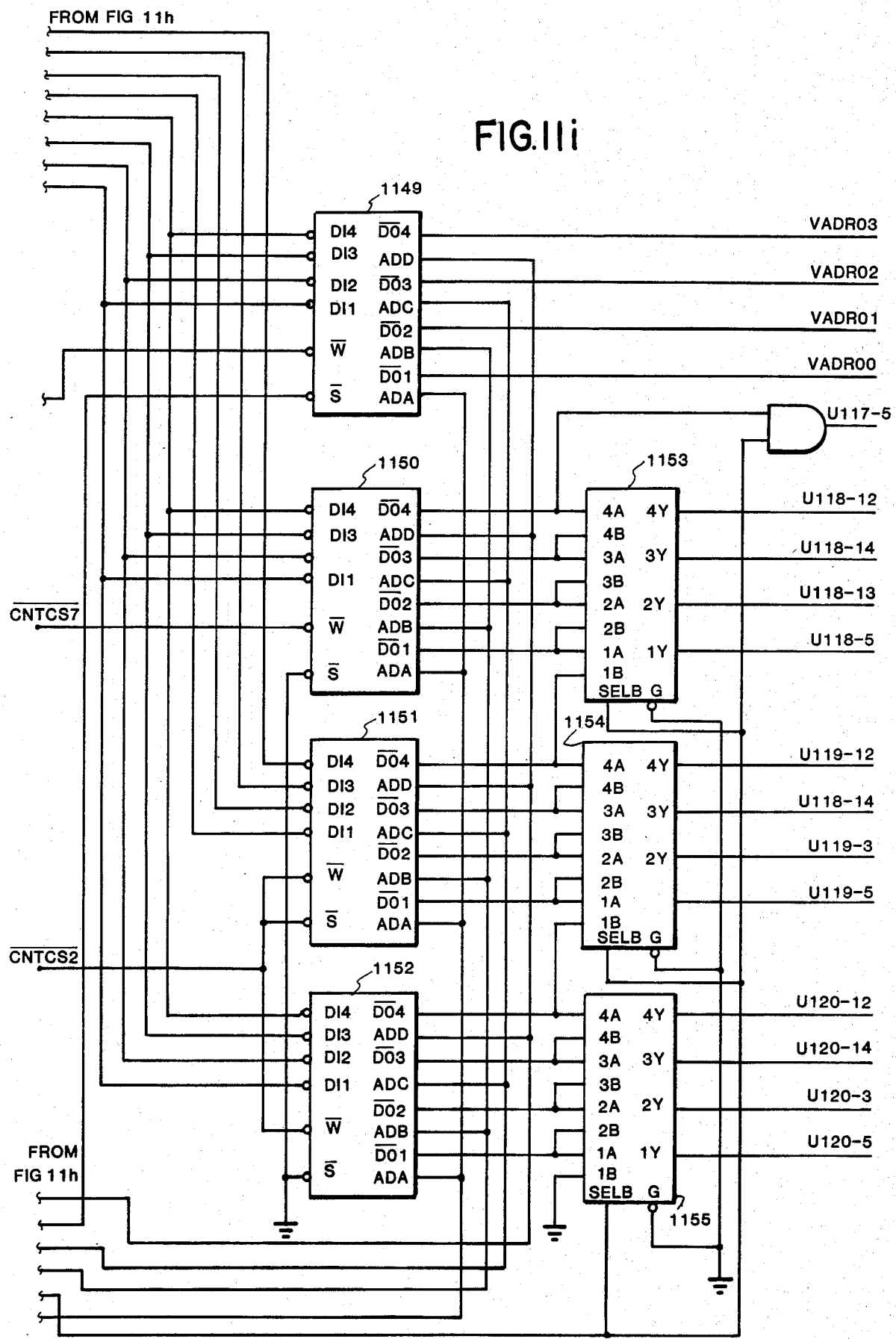

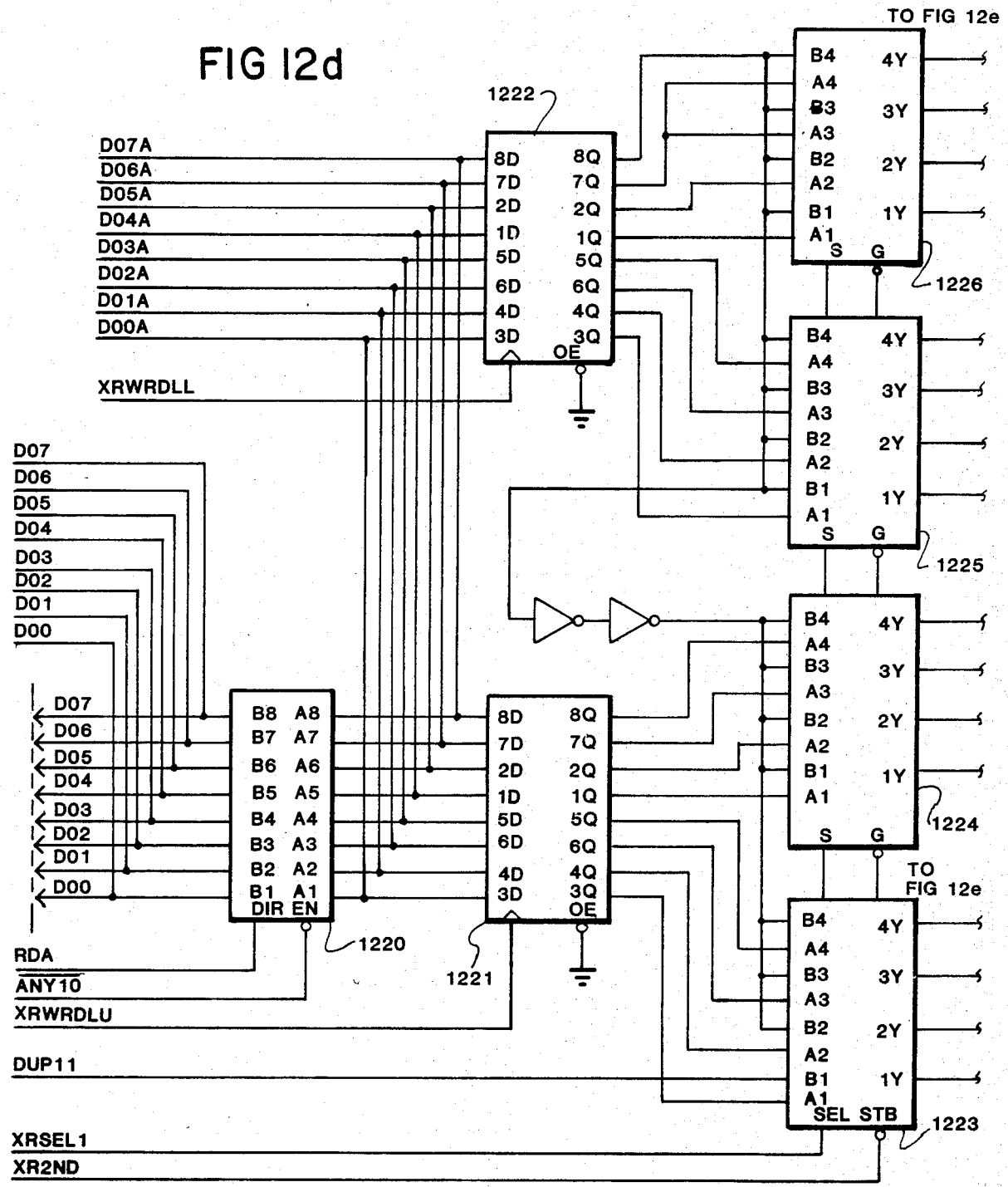

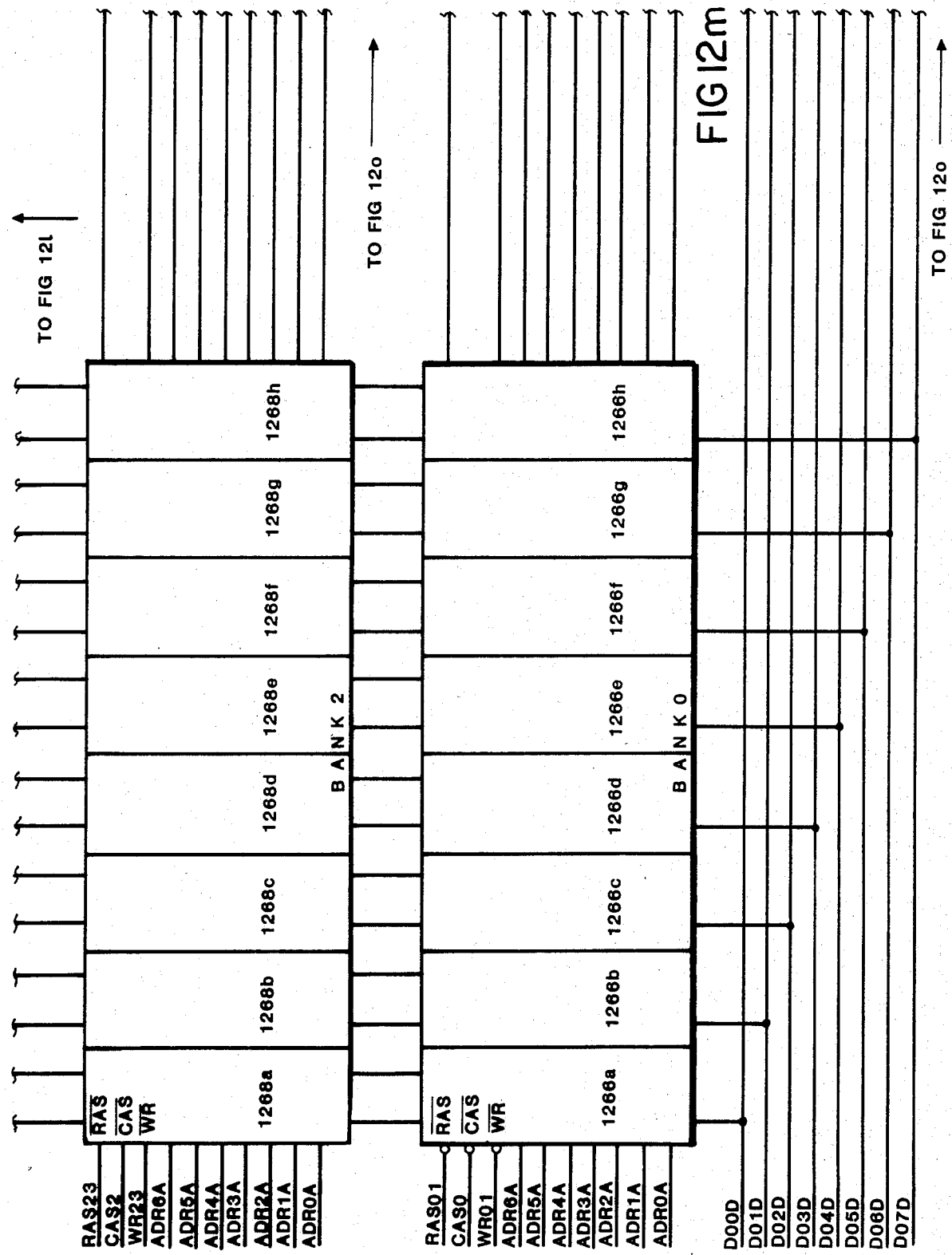

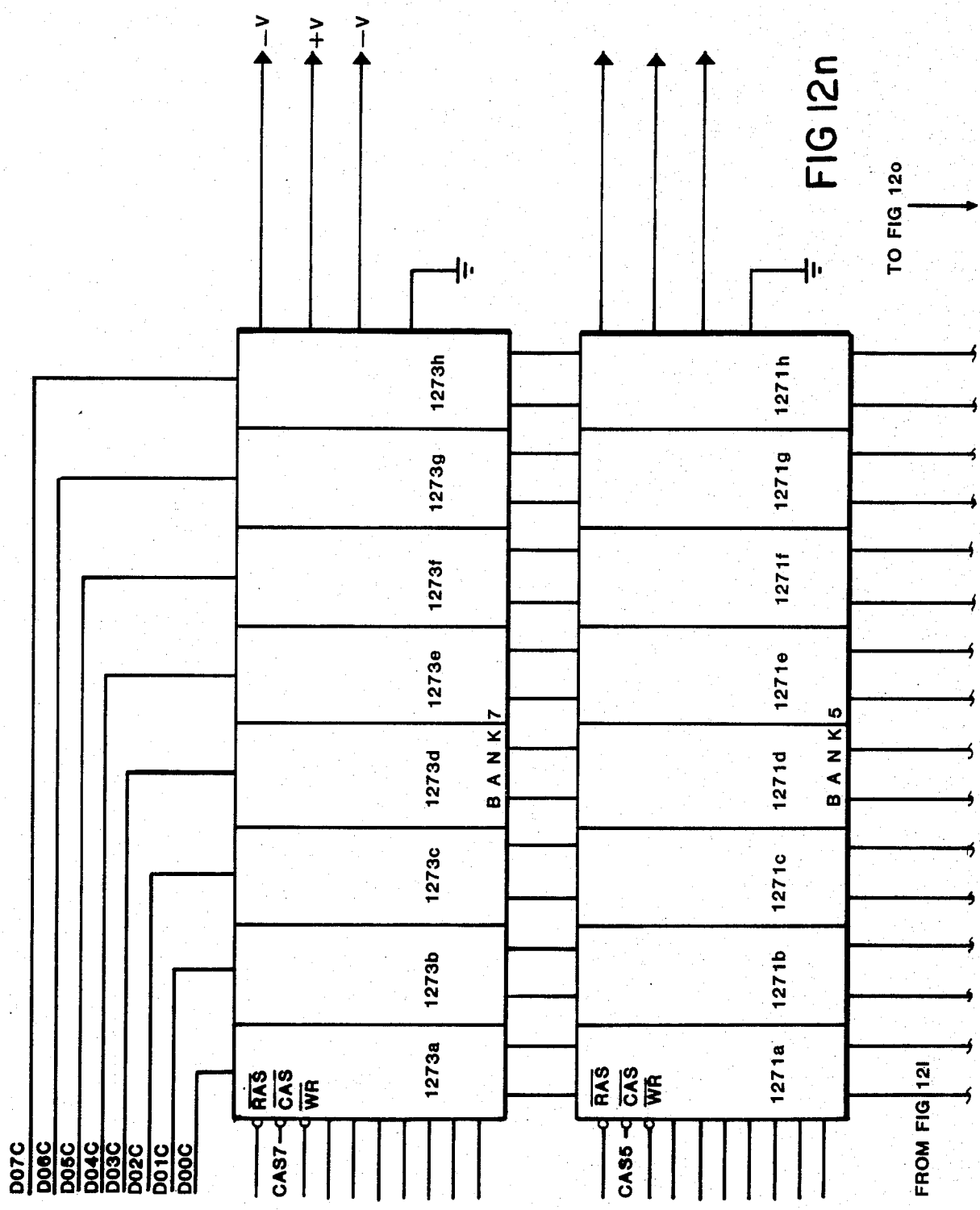

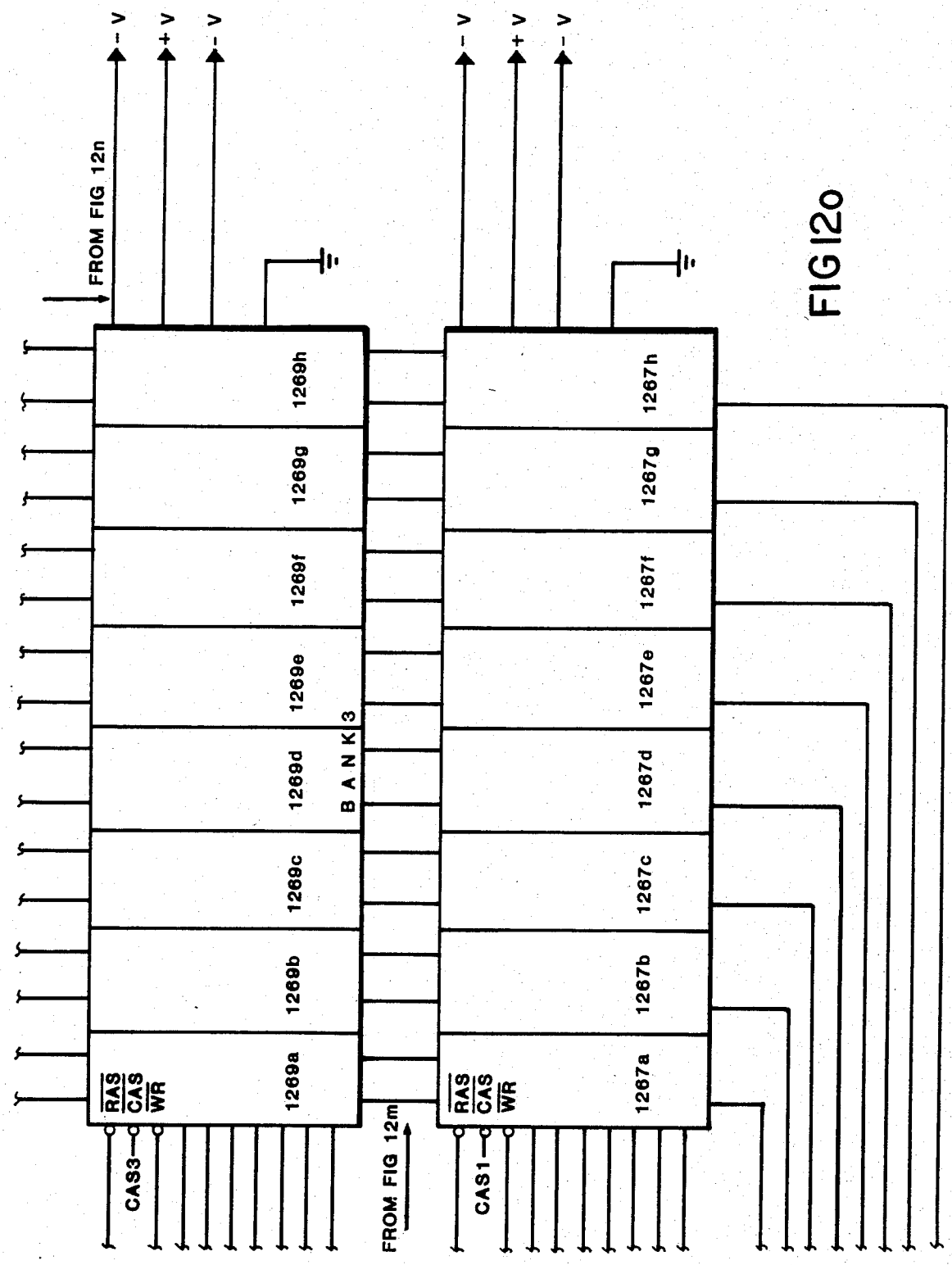

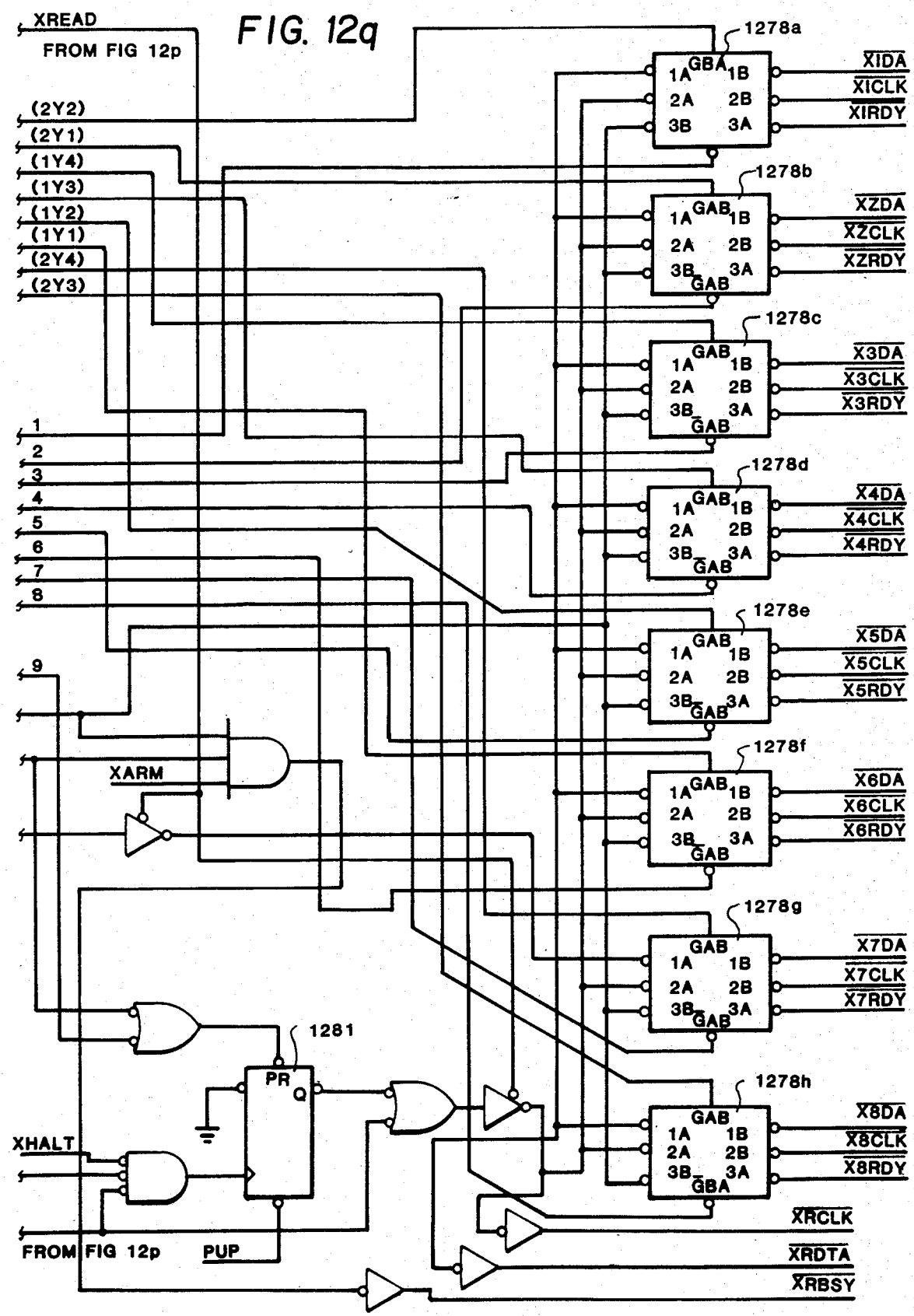

DOCUMENT PROCESSING SYSTEM

BACKGROUND OF THE INVENTION

This invention relates to document processing systems in general and in particular to document processing systems adapted to be utilized in the processing of financial documents such as checks, invoices, payment advices, vouchers, drafts, credit card charges and the like.

Document processors are well known in the prior art. Document processors which read and sort financial documents have been in common use for some time, however, various other functions which are necessary to most financial operations have been relegated to separate subsystems or specialized processors to prevent major bottlenecks in the document processing system.

Among the peripheral features which have not, in the past, been accomplished by a primary document processor are encoding with magnetic ink, microfilming and endorsing.

Recently, state of the art document processors have been developed which utilize digital imaging to obtain visual data from a financial document for amount entry, or for correcting characters which are unreadable by machine. However, such document processors still require manual transfer of documents to other processors to accomplish traditionally slower speed operations such as encoding. This additional manual transfer can yield lower efficiency in processing and may result in possible errors.

SUMMARY OF THE INVENTION

Accordingly, it is one object of the present invention to provide an improved financial document processor.

It is another object of the present invention to provide an improved document processor which includes an in-line encoder for encoding documents with magnetic ink characters.

It is yet another object of the present invention to provide an improved financial document processor which utilizes a modular transport system capable of an increased or decreased number of functions as desired.

It is another object of the present invention to provide an improved financial document processor which combines all required operations into a single document processor.

The foregoing objects are achieved as is now described. A document processing system is provided which includes a modular transport system. The modular transport system can include a digital image capture system, character recognition circuitry, document encoding systems, document endorsing systems, audit trail printers, an in-line microfilm record system and a high speed document sorter. Associated video terminals and non-impact printers such as laser printers are utilized to provide visual images of documents processed by the system. Selected documents may be read, endorsed, encoded, annotated with an audit trail indicia, digitally imaged, filmed and sorted in a single continuous pass through the document processing system of the present invention.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

GENERAL SYSTEM DESCRIPTION

Figure 1A:
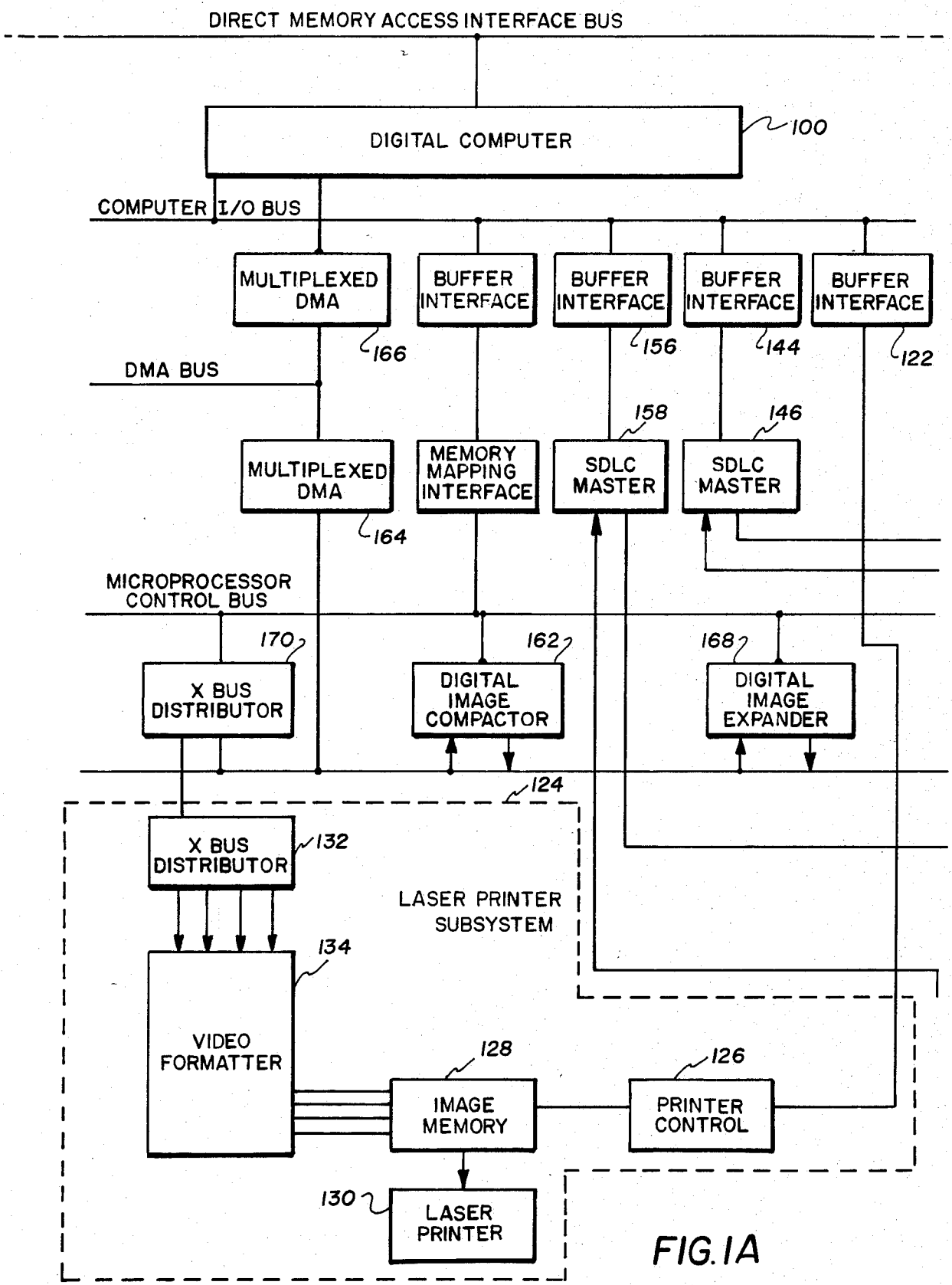
FIGS. 1a and 1b form a general block diagram of the document processing system of the present invention.
Figure 1B:
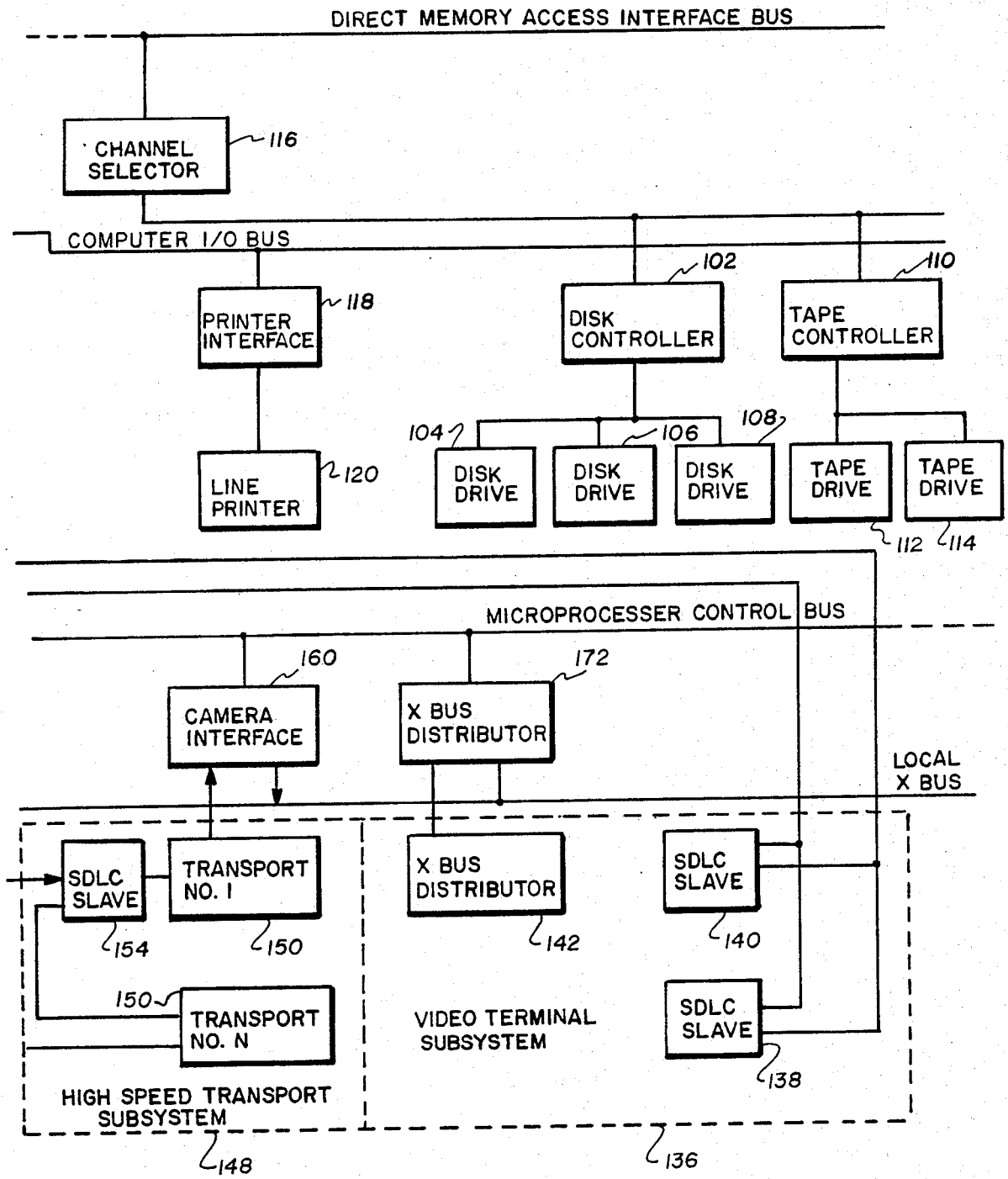

Referring to FIGS. 1a and 1b, there is depicted a general block diagram of the various subsystems comprising the document processing system which embodies the present invention.

The document processing system is controlled by digital computer 100. Digital computer 100 coordinates the storage and retrieval of digitized document images and associated data which are stored, in the disclosed embodiment, in magnetic disk storage. Disk controller 102 controls the actual access of digitized document images via disk drives 104, 106, and 108. Additional data, accounting information or program data may be accessed by digital computer 100 through tape controller 110 which controls magnetic tape drives 112 and 114. It will be appreciated by those skilled in the art that disk controller 102 and tape controller 110 may control an increased or decreased number of disk or tape drives, as a matter of design choice. Digital computer 100 may selectively access either magnetic disk storage or magnetic tape storage through channel selector 116.

Digital computer 100, in the embodiment disclosed, interfaces with a local operator via the computer I/O bus and printer interface 118. Printer interface 118 controls line printer 120. In alternate modes of operation wherein remote communication with digital computer 100 is desired, a modem and appropriate interface circuitry may be utilized.

Digital computer 100 also controls the operation of laser printer subsystem 124, through laser printer interface 122. Laser printer subsystem 124 is utilized to provide hard copy of selected digital images and may be utilized to generate account statements, billing statements, or other correspondence comprising any combination of alphanumeric characters and images. The operation of laser subsystem 124 is described in greater detail herein.

Video terminal subsystem 136 is utilized in the document processing system of the present invention to provide a real time, controllable video display of selected documents and alphanumeric information. The display is utilized to facilitate processing of information on each document. Digital computer 100 controls the operation of video terminal subsystem 136 through buffer interface 144 and synchronous data link control master 146. A plurality of video display terminals may be utilized with each SDLC master, in a manner which will be explained in detail below.

High speed transport subsystem 148 is utilized to transport individual documents through image capture stations, machine readers, encoders and sorters. A plurality of high speed transports may be utilized within each document processing system, thereby increasing the capacity of an individual system. High speed transport system 148 is controlled utilizing buffer interface 156 and synchronous data link control master 158. High speed transport system 148 will be explained in greater detail with respect to FIG. 2.

Digital image data obtained from the digital camera or cameras installed in each high speed transport is transferred to camera interface 160. Camera interface 160 is described in detail with reference to FIGS. 6a through 6i and is utilized to couple the image data to digital image compactor 162. Digital image compactor 162 is utilized to remove any redundancies contained in a selected image and to encode the remaining data. In addition to the specific algorithm taught in the disclosed embodiment, the document processing system of the present invention will function with other known data compaction algorithms, such as, for example, the CCITT standard algorithm. The thus compacted digital image will require substantially less storage space in the document processing system. The compacted image data may be transferred to storage via multiplexed direct memory access 164 and multiplexed direct memory access 166. Two direct memory systems are utilized in order to provide compatible interfaces between the local X bus and the direct memory access interface bus of digital computer 100.

Retrieval and display of a compacted digital image may take place in several ways. A compacted image is transferred to the local X bus via direct memory access 164 and direct memory access 166. The compacted image is applied to digital image expander 168. The redundancies present in the original image are restored and the subsequent image is transferred via X bus distributor 170 or X bus distributor 172 to either laser printer subsystem 124 or video terminal subsystem 136 for reproduction of a hard copy or an electronic image.

DIGITAL COMPUTER

The document processing system of the preferred embodiment of the present invention utilizes a digital computer 100, FIG. 1, to control the operation of the system and coordinate the storage and retrieval of document images. In a preferred embodiment of the present invention, digital computer 100 was actually constructed utilizing a Series 3200 minicomputer, manufactured by the Perkin-Elmer Computer Systems Division of Oceanport, N.J.

The Model 3242 minicomputer utilizes 32-bit architecture and a 32-bit operating system. The main memory storage, in the embodiment disclosed, contains 1536 kilobytes of 150 nanosecond MOS memory. Supplementing the computer's main memory store are disc drives 104, 106 and 108, FIG. 1, Model 9775 manufactured by Control Data Corporation of Minneapolis, Minn., and tape drives 112 and 114, FIG. 1, Model TPAC 4516, manufactured by Perkin-Elmer of Oceanport, N.J.

Digital computer 100 also includes a rechargeable battery backup system (not shown) to sustain the main memory in the event of a power failure. The preferred embodiment of digital computer 100 utilizes a battery rated at 320 megabyte-minutes, which is capable of maintaining the memory integrity of 16 megabytes for twenty minutes.

DOCUMENT TRANSPORT

Figure 2:
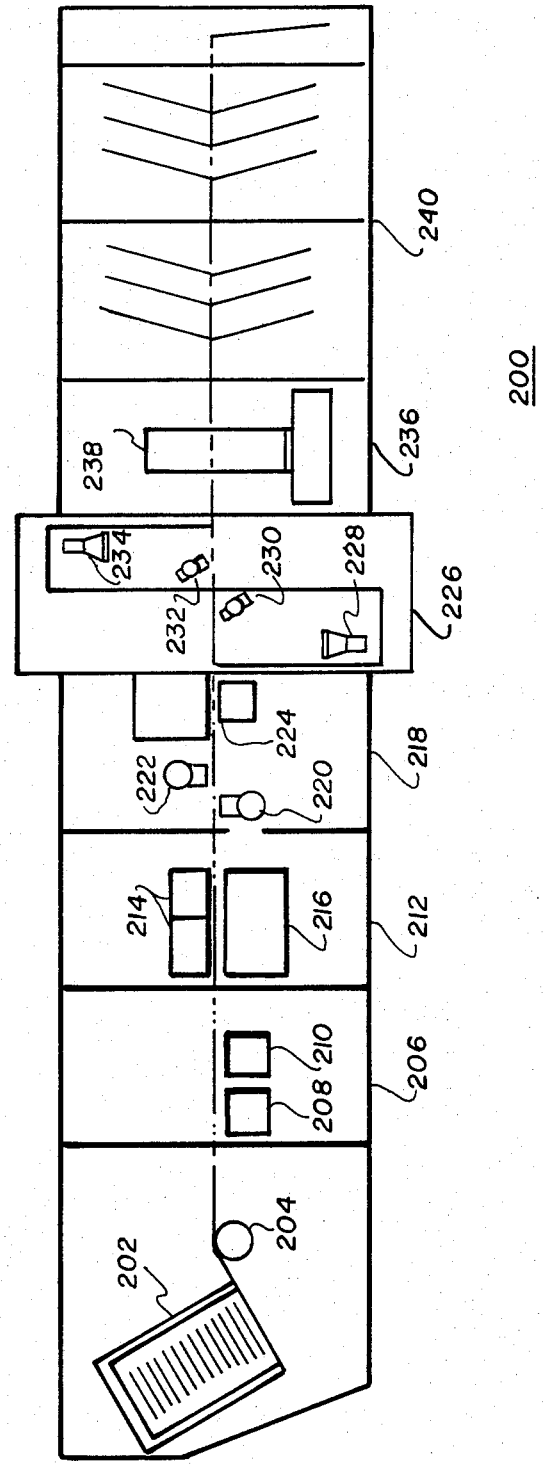
FIG. 2 depicts a diagrammatic view of the document transport of the document processing system of the present invention.

Referring now to FIG. 2, there is depicted a diagrammatic plan view of document transport 200. Document transport 200, in a preferred embodiment, is a specially built transport which may be modified to include additional equipment or to exclude undesired capabilities. The transport constructed and depicted in FIG. 2 utilizes high speed endless belts which are driven by pinch rollers in the manner well known in the art. The pinch rollers are driven by synchronous AC motors at a nominal speed of 52 inches per second in the disclosed embodiment. Sections of the transport may be driven at different speeds in a manner described below.

Documents are loaded into document transport 200 by means of document hopper 202. Single documents are loaded from document hopper 202 via feed drum 204. The documents are then passed along document transport 200 between rollers and the endless belts (not shown).

The first section of document transport 200, reader section 206, includes an optical character reader 208 and a magnetic ink character reader 210. Those skilled in the art will appreciate that a single model optical reader, such as the 30–250 ips read head manufactured by Input Business Machines, Incorporated of Rockville, Md., can function as either an OCR reader or may be utilized to optically read MICR characters with appropriate control electronics. OCR reader 208 may be utilized in the applications wherein the amount field or other information is printed in an OCR format.

The next section of document transport 200 is encoder section 212. Encoder section 212 includes hammer bank assembly 214 and die and ribbon assembly 216 and is utilized to encode selected documents with selectable indicia, while the document is traversing document transport 200. The operation of the encoder section will be explained in greater detail with reference to FIG. 3.

Section 218 of document transport 200 is the endorser section. Endorser section 218 contains ink jet printers 220 and 222 and endorser 224. Ink jet printers 220 and 222 are standard state of the art ink jet printers that may be utilized, in the disclosed embodiment, to print selected indicia upon each document which passes through document transport 200. The selected indicia may be utilized to assist in audit trail functions or in any other function desired. Endorser 224 is utilized to endorse documents such as checks. The structure and operation of endorser 224 will be explained in greater detail with respect to FIG. 4.

The next section in document transport 200, through which each document is transported, is camera section 226. Camera section 226 contains, in the embodiment disclosed, two digital video cameras, 228 and 234 and two illumination sources, 230 and 232. Each document which passes through camera section 226 is scanned on both sides utilizing video cameras 228 and 234. The operation of camera section 226 is explained below with reference to FIGS. 5 and 6.

The penultimate section of document transport 200, microfilm section 236, contains a microprocessor controlled microfilm recorder 238. Microfilm recorder 238 is described in greater detail below, and is utilized to provide hard copy of selected documents which have been processed by the system of this invention. Microfilm recorder 238 is capable of accurately recording documents traveling at greater rates of speed than that present in earlier sections of document transport 200, and as a consequence, the transport speed is increased in microfilm section 236 to a nominal speed of 100 inches per second. This transition is accomplished by utilizing a slipping drive at the interface between microfilm section 236 and camera section 226. Thus, while a portion of a document is still traveling at a nominal speed of 52 inches per second in camera section 226, the slipping drive (not shown) in microfilm section 236 allows the document to slip until fully released.

The final section of document transport 200 is stacker section 240. Stacker section 240, in any manner well known in the art, sorts the documents processed through document transport 200 into one of several pockets. The number of pockets is, of course a design choice wholly dependent upon the application desired.

As those skilled in the art will appreciate, the modularity of design employed in document transport 200 will allow great flexibility in many applications. Whole sections of document transport 200 may be deleted or rearranged to permit a wide variety of custom applications. Further, the number and type of devices within each module may be increased or decreased as a matter of design choice.

ENCODER

Figure 3A:
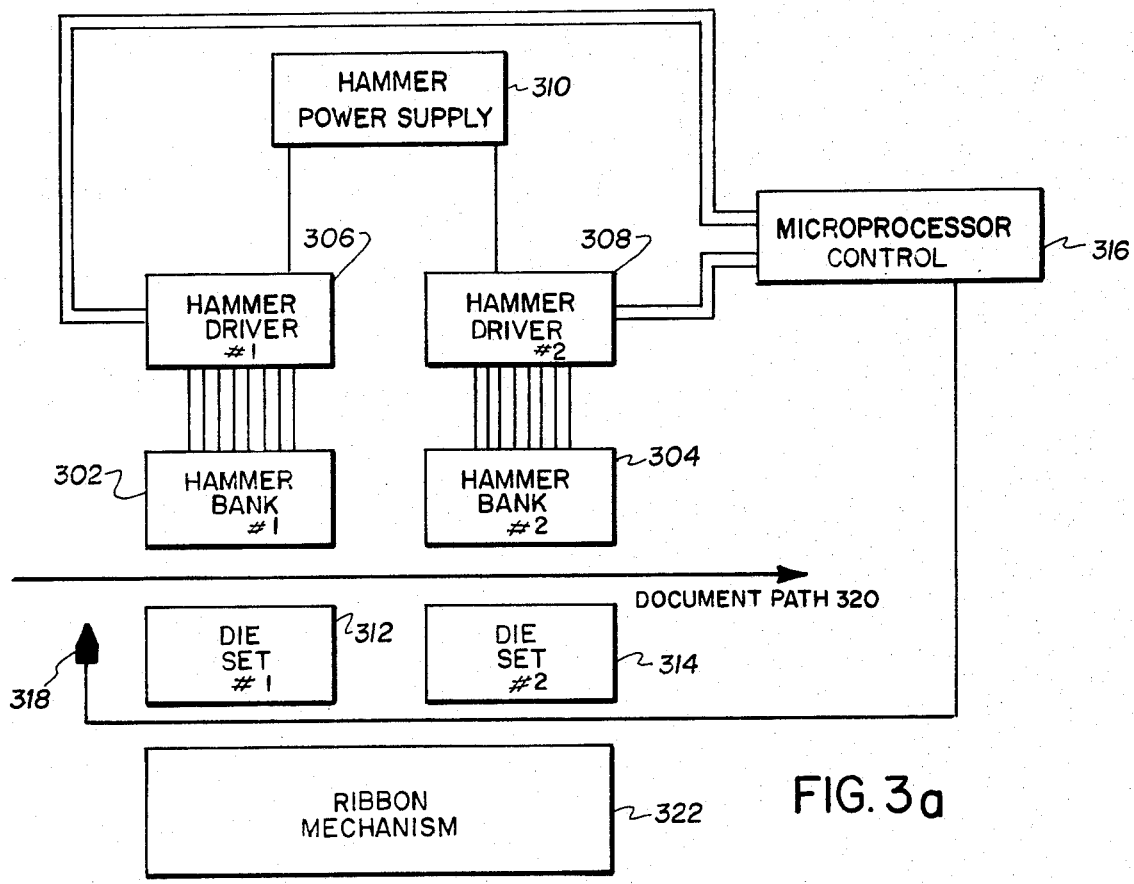
FIG. 3a depicts a block diagram of the encoder of the document processing system of the present invention.

With reference now to FIG. 3a, there is depicted a schematic view of encoder 300 of the present invention. An important feature of the present invention is an ability to encode continuously moving documents. In known document processing systems document encoding proves to be the major bottleneck to high speed processing. Typical solutions have included a separate slower portion of the document processor in which a document is stepped through an encoder, or a separate off-line encoder. Document encoder 300 is capable of encoding documents which are continuously moving at the rate of the document processing system of the present invention.

Document encoder 300 utilizes, in the illustrated embodiment of the present invention, two identical electromagnetic hammer banks, hammer bank 302 and hammer bank 304. It will be apparent, however, upon reference to the foregoing explanation, that a fewer or greater number of hammer banks may be utilized in systems wherein slower or faster transport speeds are desired. Hammer banks 302 and 304 are electromagnetic hammers such as part no. CCE-05-306 manufactured by Dataproducts, Woodland Hills, Calif. Each hammer bank is controlled by a hammer driver. In the disclosed embodiment, hammer driver 306 controls hammer bank 302 and hammer driver 308 controls hammer bank 304. Hammer power supply 310 provides operating power for all hammer drivers and hammer banks.

Positioned opposite each hammer bank is an appropriately encoded die. The selection of characters utilized in a particular application is strictly a design choice and may include OCR characters, MICR characters or any other desired character pattern. The illustrated embodiment includes two substantially identical die sets, die set 312 and die set 314. However, as a matter of design choice, a single die set may be utilized. Also included in the illustrated embodiment is microprocessor control 316, which provides control signals to hammer drivers 306 and 308 in response to signals from optical sensor 318. Optical sensor 318 is utilized to detect the presence of a document along document path 320. Ribbon mechanism 322 is also depicted in FIG. 3a, and will be explained in greater detail with reference to FIG. 3b.

Figure 3B:
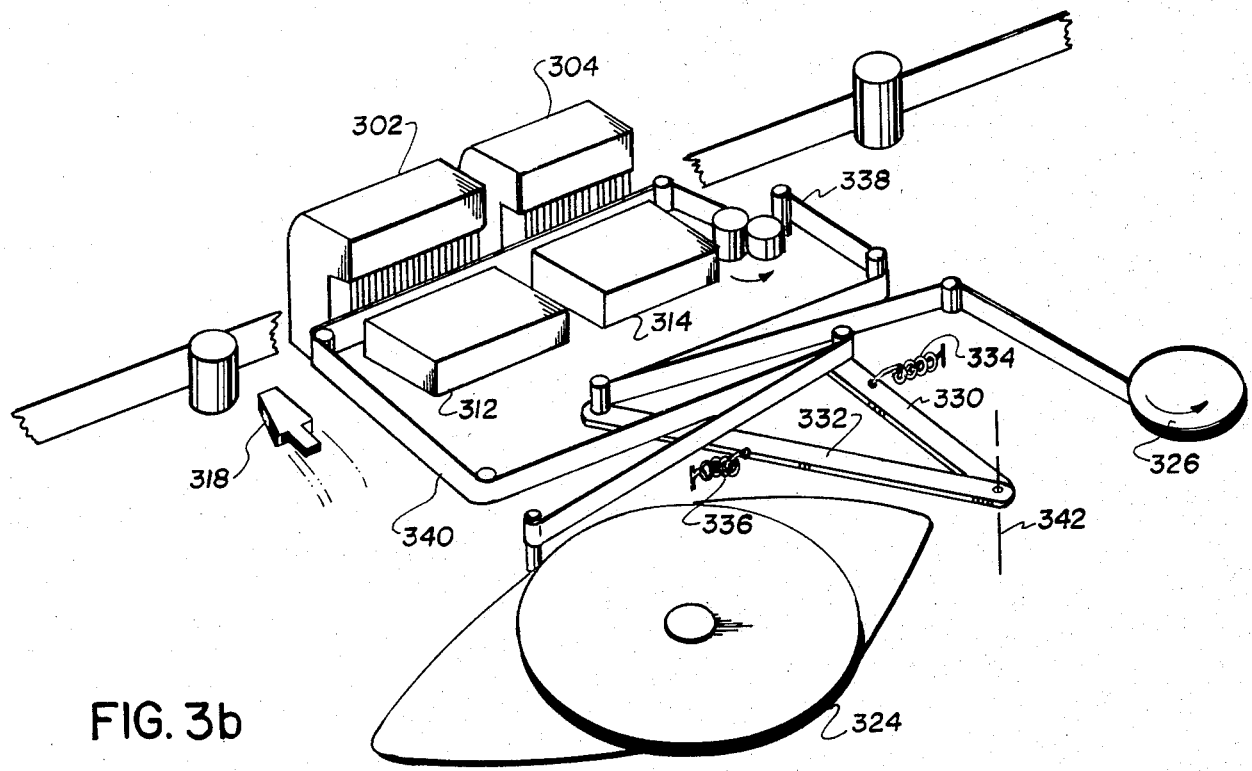
FIG. 3b depicts a diagrammatic view of the encoder of the document processing system of the present invention.

FIG. 3b depicts a partially diagrammatic view of the major components of document encoder 300. As explained above, hammer banks 302 and 304 selectively strike portions of die sets 312 and 314, upon receipt of control signals generated by a microprocessor control 316 (see FIG. 3a), in conjunction with an item presence signal generated by optical sensor 318.

Ribbon mechanism 322 (FIG. 3a) is shown in greater detail in FIG. 3b and includes a ribbon supply reel 324, ribbon takeup reel 326, ribbon tensioning arms 330 and 332 and ribbon capstan 338. Ribbon supply reel 324 provides a fresh supply of magnetic ink ribbon 340. Such magnetic ink ribbons are typically single strike ribbons, that is to say the magnetic ink associated with each character is totally removed from the ribbon during the printing of that character and further attempts to print utilizing the same section of ribbon 340 will result in invalid magnetic signatures. Therefore, it is necessary to advance magnetic ink ribbon 340 after each character is printed, and it is advantageous, from an economy standpoint, to advance ribbon 340 only while a document is present in encoder 300. This is accomplished utilizing ribbon capstan 338 which is electronically controlled by microprocessor control 316 during those periods when a document is detected by optical sensor 318. For reasons which will be explained below, ribbon 340 is driven by ribbon capstan 338 at the same speed as documents on the transport. The rapid acceleration of ribbon 340 to transport speed is accomplished without damage to ribbon 340 utilizing ribbon tensioning arms 330 and 332. Ribbon tensioning arms 330 and 332 are pivotally mounted at point 342 and resiliently biased utilizing springs 334 and 336. A rapid acceleration of ribbon 340 is then absorbed by ribbon tensioning arms 330 and 332 until ribbon supply reel 324 and ribbon takeup reel 326 can compensate.

In operation, encoder 300 utilizes two character sets to compensate for the duty cycle of the hammer bank utilized. Each individual hammer within hammer banks 306 and 308 has a duty cycle of approximately 0.004 seconds. Document encoding standards for MICR require individual characters to be encoded approximately one-eighth inch apart, or one-tenth inch spacing for OCR. At a nominal transport speed of 52 inches per second, a document will travel one-eighth inch in approximately 0.0024 seconds. It should therefore be apparent that with a duty cycle of 0.004 seconds, a single hammer and die combination will be unable to repetitively strike a single character at one-eighth inch intervals. Thus, the use of multiple hammers and substantially identical character sets will allow full encoding at the present duty cycle. Consider a possible worse case analysis, a desired encoding of eight consecutive identical characters. Those skilled in the art will appreciate that a single hammer and die will be able to encode alternate digit positions at the stated speed of operation. The second group of hammers and characters allows encoder 300 to fill in the missing digits. More specifically, hammer bank 306 and die set 312 may encode the odd digit positions in a desired field, and hammer bank 308 and die set 314 may encode the even digit positions. Thus, it should be apparent that increased or decreased transport speeds may be accommodated by utilizing a greater or fewer number of hammer banks and die sets, without requiring a faster duty cycle for individual hammers. It should also be apparent that since certain portions of a particular digit field may be encoded by one hammer bank while other postions may be encoded by a second hammer bank, it will be advantageous to maintain ribbon 340 at the same speed as the documents passing through encoder 300. By so doing, the used portion of ribbon 340 associated with a particular character will maintain its relative position directly above that particular character on the document.

ENDORSER

Figure 4:
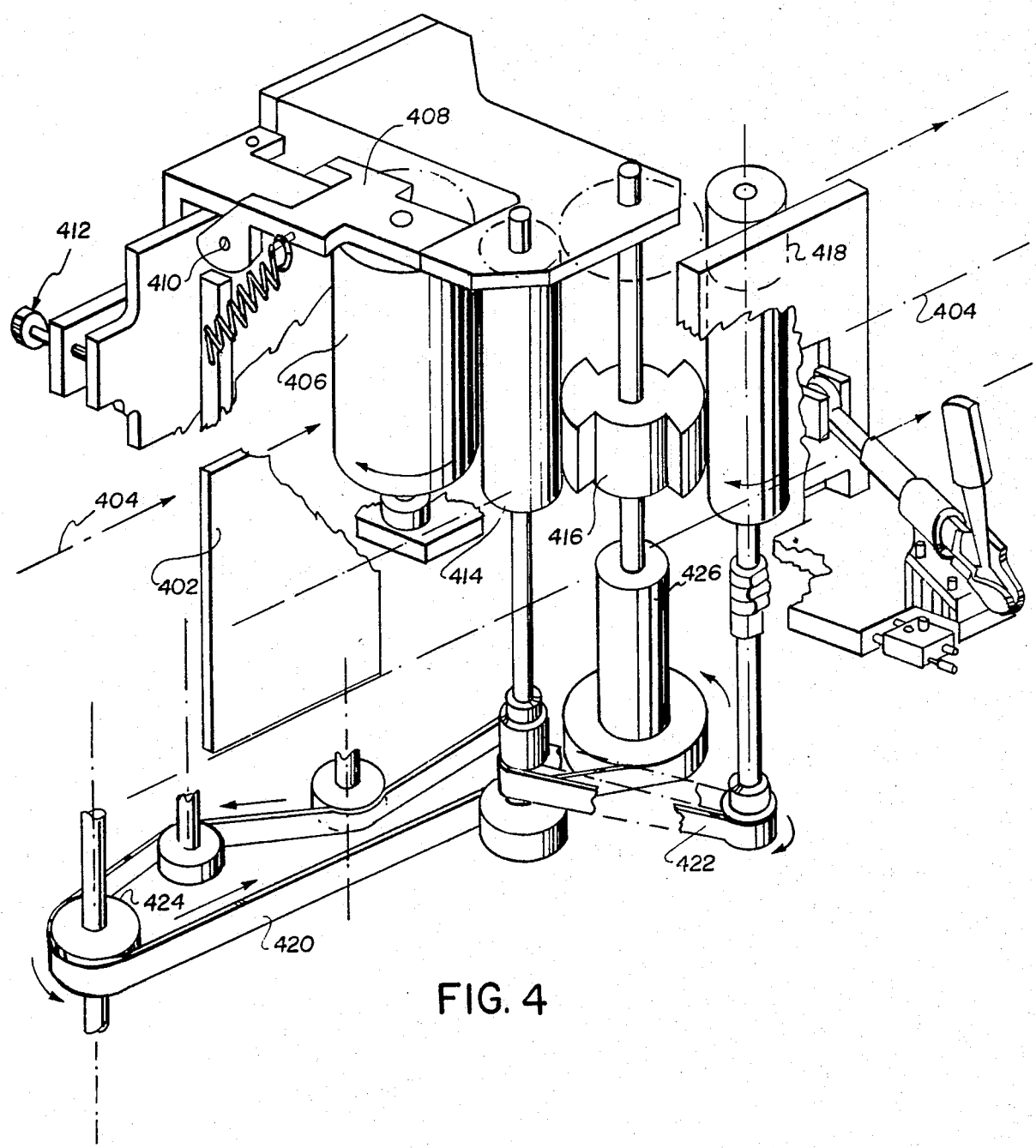
FIG. 4 depicts a diagrammatic view of the endorser of the document processing system of the present invention.

Referring now to FIG. 4, a cutaway view of the major components of endorser mechanism 400 is depicted. A section of a document 402 is shown on document path 404. The belt drive mechanism which transports document 402 along document path 404 is not shown.

Ink roller 406 is mounted in bracket 408, which may be pivoted upward at pivot point 410 to allow replacement of ink roller 406. Additionally, pressure adjuster 412 may be utilized to adjust the amount of pressure exerted by ink roller 406 upon transfer roller 414.

Transfer roller 414 is mounted in tangential proximity to endorser plate 416 and is utilized to transfer ink to endorser plate 416 from ink roller 406. Transfer roller 414, endorser plate 416 and platen 418 are all driven by belt 420 and belt 422 and drive pulley 424; however, electronically controlled clutch 426 is utilized to selectively engage endorser plate 416. Thus, when it is desired to endorse a selected document, ink is transferred to endorser plate 416 and electronic clutch 426 is energized, urging endorser plate 416 into contact with platen 418 and rotating endorser plate 416 and platen 418 at an appropriate speed.

Electronic clutch 426 is controlled, in a preferred embodiment, utilizing an appropriately programmed microprocessor type device. Therefore, documents may be transported through the document processing system of the present invention and be selectively endorsed.

VIDEO CAMERA

Figure 5:
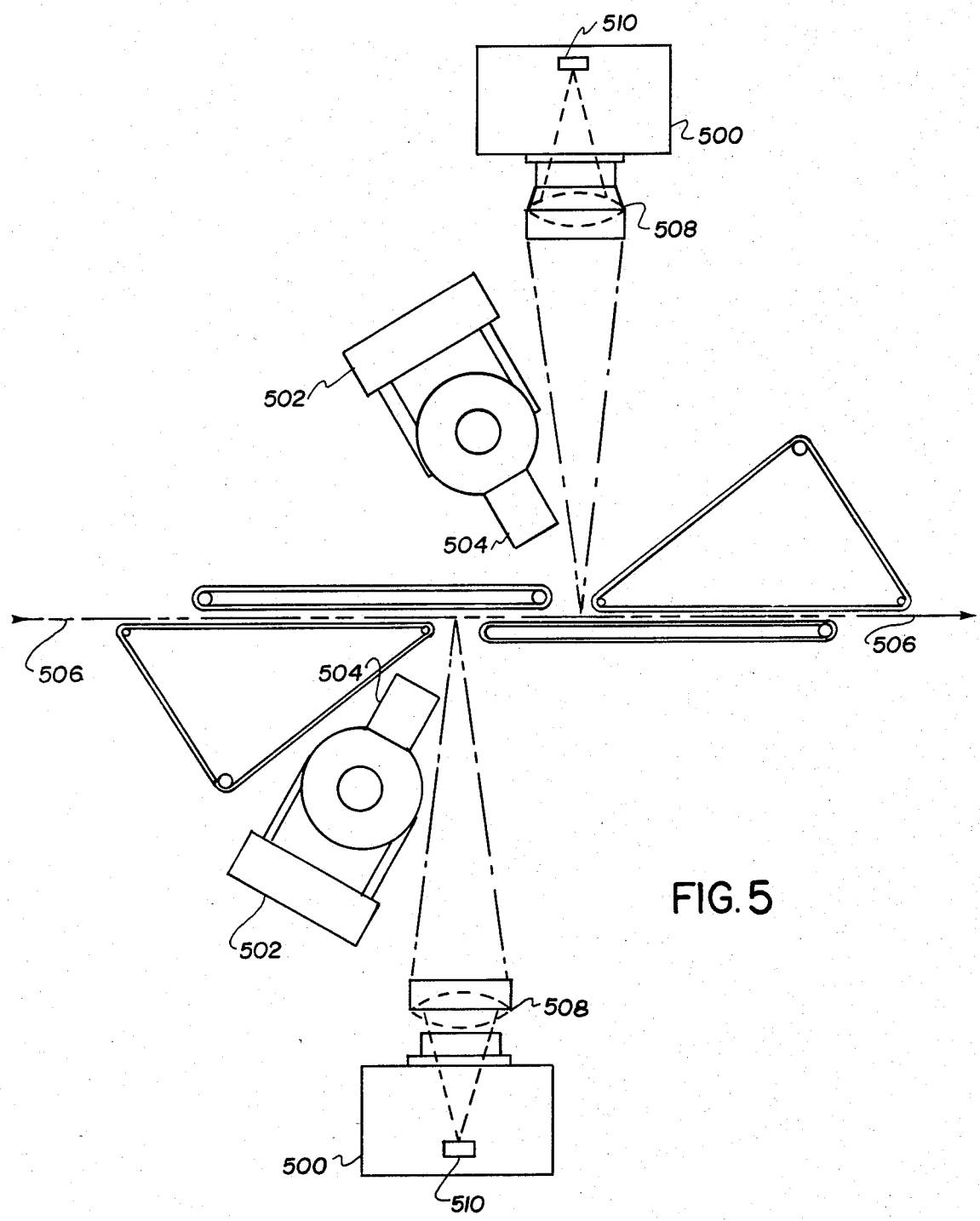
FIG. 5 depicts a diagrammatic view of the camera system of the document processor of the present invention.

FIG. 5 depicts a diagrammatic view of a system utilizing two video cameras 500 and illumination sources 502 whereby the image on both sides of a document may be captured. Each illumination source 502 is comprised of two 500 watt tungsten halogen bulbs, encased in a housing having cooling means and an optical focus assembly 504. Optical focus assembly 504 comprises a plurality of lenses arranged, in any manner well known in the art, to focus a vertical bar of intense light onto document plane 506. In the embodiment disclosed, the vertical bar is generally rectangular in shape and is approximately six inches tall and one tenth of an inch wide. As discussed above, documents are transported laterally across this illuminated portion to enable video image capture.

The light reflected from each document passes through each camera lens assembly 508 and is focused on line scanner 510. Camera lens assembly 508 is a fixed magnification ratio lens typically utilized in fixed working distance applications such as photographic enlargers. Line scanner 510 is a solid state line scanner such as those commercially available from the Reticon Corporation of Sunnyvale, Calif. Line scanner 510 is a high density, monolithic, linear array of silicon photodiodes with integrated scanning circuits for serial readout. The array, in the embodiment disclosed, consists of a row of 768 silicon photodiodes, having a storage capacitor associated therewith upon which may be integrated the photocurrent, and a transistor switch for periodic readout via an integrated scanning circuit. The individual photodiodes of line scanner 510 are one mil square and are spaced center-to-center, one mil apart.

During image capture, a document is transported laterally across the vertical bar of light generated by each illumination source 502. Each camera lens assembly 508 focuses the reflected light from the document onto line scanner 510. Each of the 768 silicon photodiodes contained within line scanner 510 produces an electrical signal which is proportional to the intensity of the incident light. The photodiodes are then sampled at a high rate, the line scanner utilized in the preferred embodiment may be sampled at frequencies as high as ten megahertz. The combination of the lateral motion of the document and the vertical action of sequential sampling of the photodiodes in line scanner 510 will produce a two dimensional picture of a document with a resolution within 0.007 of an inch.

The output of line scanner 510 is amplified and coupled to additional circuitry as a series of pulses wherein the area of each pulse is proportional to the intensity of the incident light on each photodiode. This series of pulses is utilized in the camera control circuitry to sense the presence of a document and to dynamically adjust the threshhold level utilized to determine whether a particular value is white or black. The series of pulses is also applied to the data compression system for compression, storage and subsequent retrieval.

CAMERA BUFFER AND INTERFACE CIRCUITRY

With reference now to FIGS. 6a–6i, there is depicted a schematic view of the major components of the camera buffer and interface circuitry of the document processor of the present invention. While the disclosed embodiment of the present invention utilizes two video cameras, in many cases only one set of buffer and interface circuitry will be depicted. Those ordinarily skilled in the art will appreciate the simple duplication of circuitry necessary to accomodate two video cameras.

Figure 6A:
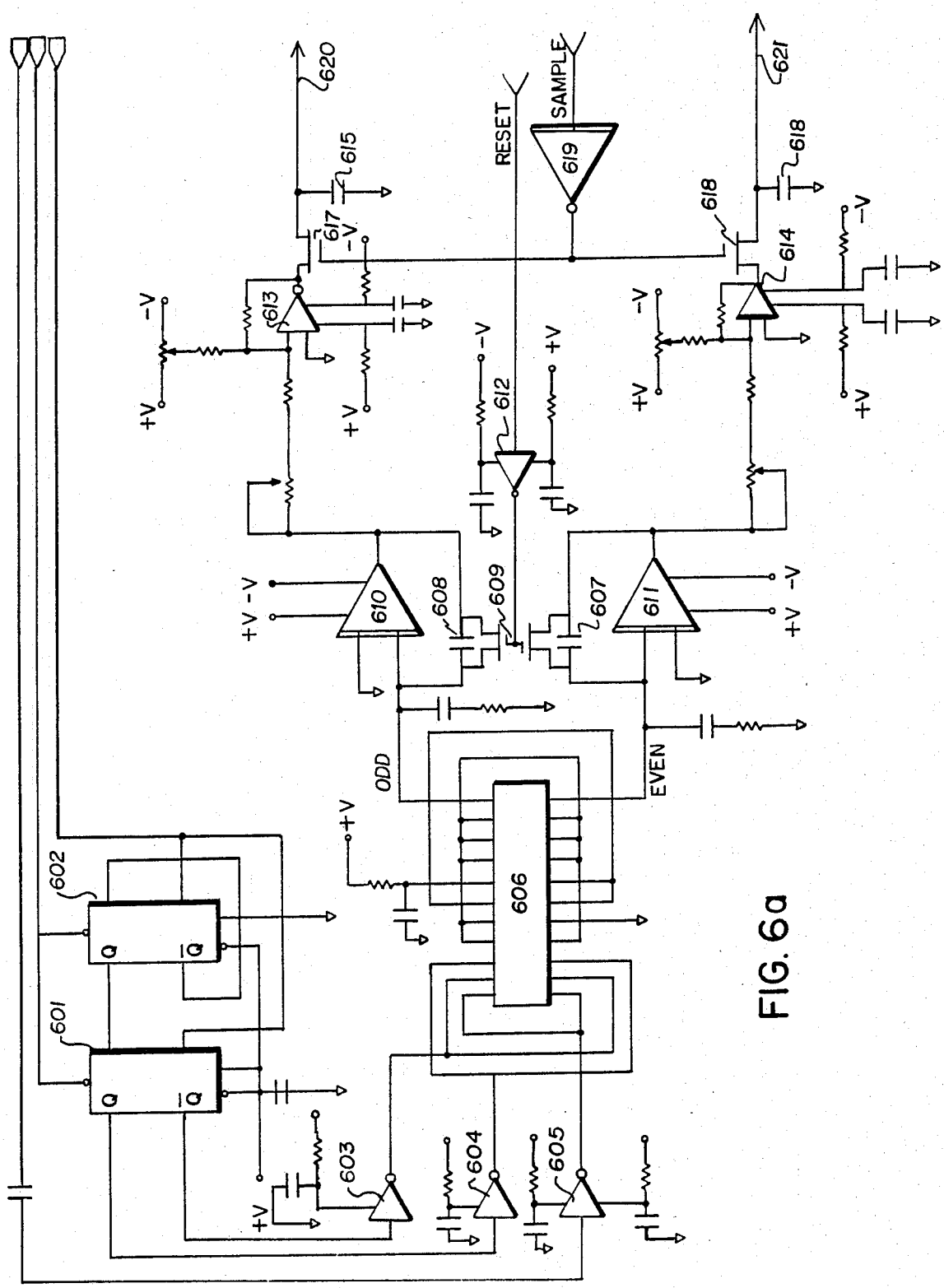
FIGS. 6a–6i depict a schematic view of the components of the camera buffer and interface circuitry of the document processor of the present invention.

Referring now to FIG. 6a, oscillators 601 and 602 are utilized, in conjunction with the basic clock signal (30.5 megahertz in a preferred embodiment) to provide the scanning pulses to line scanner 606. Oscillators 601 and 602 are implemented, in a preferred embodiment of the present invention, utilizing standard 74S74 type flip-flop integrated circuits. The control pulses necessary to operate line scanner 606 are applied via amplifiers 603, 604 and 605, which are utilized to provide level adjustments. Line scanner 606, in the illustrated embodiment, is an RL-768C integrated circuit manufactured by the Reticon Corporation of Sunnyvale, Calif. Additional details concerning the construction of line scanner 606 are disclosed above with respect to the video camera description. Line scanner 606 is scanned at a parallel rate of three megahertz. That is, the odd numbered cells in line scanner 606 are scanned at a three megahertz rate and the even numbered cells are also scanned at a three megahertz rate. Thus, line scanner 606, with proper multiplexing of the dual outputs, is capable of generating video pulses at a six megahertz rate.

Even cell and odd cell outputs of line scanner 606 are applied to amplifiers 611 and 610 respectively. Amplifiers 611 and 610, in conjunction with capacitors 607 and 608, are utilized to capture the output of each individual scan cell. Switching transistor 609 is utilized to alternately remove all charge accumulated on capacitors 607 and 608 between sampling times for adjacent cells of line scanner 606. The RESET signal accomplishes this and is applied to switching transistor 609 through inverter 612.

The outputs of amplifiers 610 and 611, representing the relative charge present on capacitors 608 and 607 during each cell scan, are further amplified by amplifiers 613 and 614, in a manner well known in the art. The outputs of amplifiers 613 and 614 are next applied to two sample and hold circuits. The sample and hold circuits are comprised of switching transistors 617 and 618 and storage capacitors 615 and 616. Thus, the charge present on capacitors 615 and 616 is indicative of the amount of light striking the corresponding scanning cells of line scanner 606 at any selected time. The signals are then coupled, via lines 620 and 621 to a final stage of amplification, consisting of amplifiers 622 and 623 (see FIG. 6b).

Figure 6B:
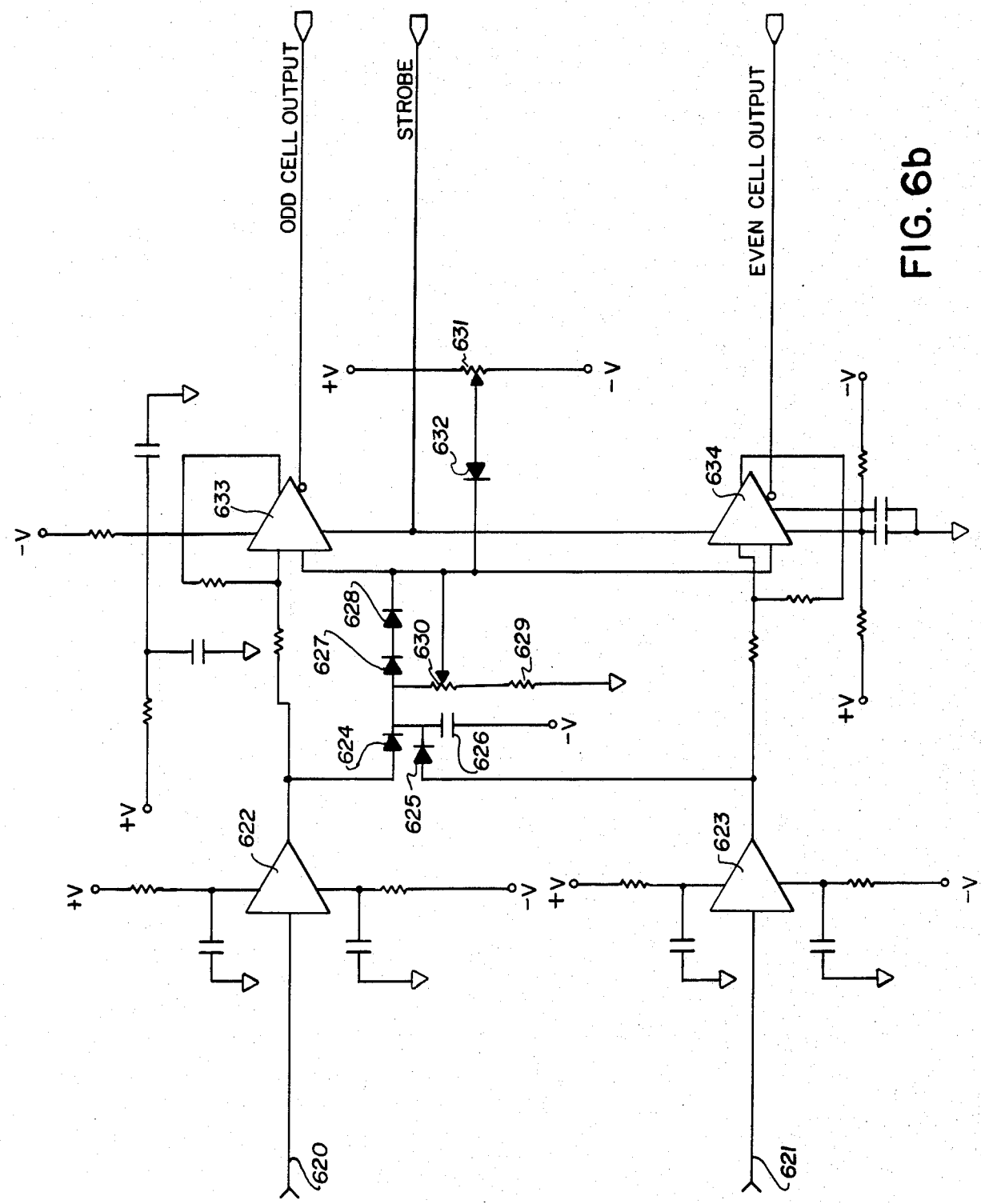

With reference now to FIG. 6b, the outputs of amplifiers 622 and 623 are each applied to two points within the dynamic threshold circuitry. Dynamic threshold adjustment is an important feature of the document processing system of the present invention and allows a single system to process multicolored documents without requiring individual level adjustments.

The output of amplifier 622, representing the amplified outputs of the odd numbered cells of line scanner 606 (See FIG. 6a) is applied to one input of comparator 633 and to diode 624. Similarly, the output of amplifier 623, representing the amplified outputs of the even numbered cells of line scanner 606, is applied to one input of comparator 634 and to diode 625.

Diodes 624 and 625 perform an OR function and apply the more positive of their individual inputs to capacitor 626. Capacitor 626 is, therefore, rapidly charged to the level of the highest signal applied through diodes 624 and 625. This level is the "white" threshold and represents a reference point for black/light decisions. The voltage level present on capacitor 626 is applied through diodes 627 and 628 to the second input of comparators 633 and 634. The voltage drop across diodes 627 and 628 assures that the signal creating charge on capacitor 626 will be greater than the resultant reference signal applied to comparators 633 and 634.

The charge present on capacitor 626 will eventually discharge slowly through resistors 629 and 630; however, a reference voltage applied through diode 632 will prevent total discharge and will apply a minimum level which a cell output must exceed in order to be considered "white." Additionally, the time constraints associated with capacitor 626 and resistors 629 and 630, while chosen to be "slow" with respect to individual cell sample times, are sufficiently "fast" to allow discharge of capacitor 626 between adjacent documents. Thus, a totally white background document, while in process, will result in a high reference signal being generated on capacitor 626, and result in any signal greater that two diode drops below that level being characterized as "black." However, during the gap between documents, capacitor 626 will discharge sufficiently so that a colored background document (blue, for example) will generate a lower reference level. This system of dynamic reference adjustments allows a single system to process an entire variety of multihued documents without system adjustment, and without the possibility of losing all data contained on a relatively dark background document.

For reasons of circuit design not important to the concept, an inverted output is selected from comparators 633 and 634. Therefore, a particular cell in line scanner 606 which detects a "black" area will result in a logic 1 or "high" output of the appropriate comparator, and a cell which detects a "white" area will result in a logic 0 or "low" output from the appropriate comparator.

Figure 6C:
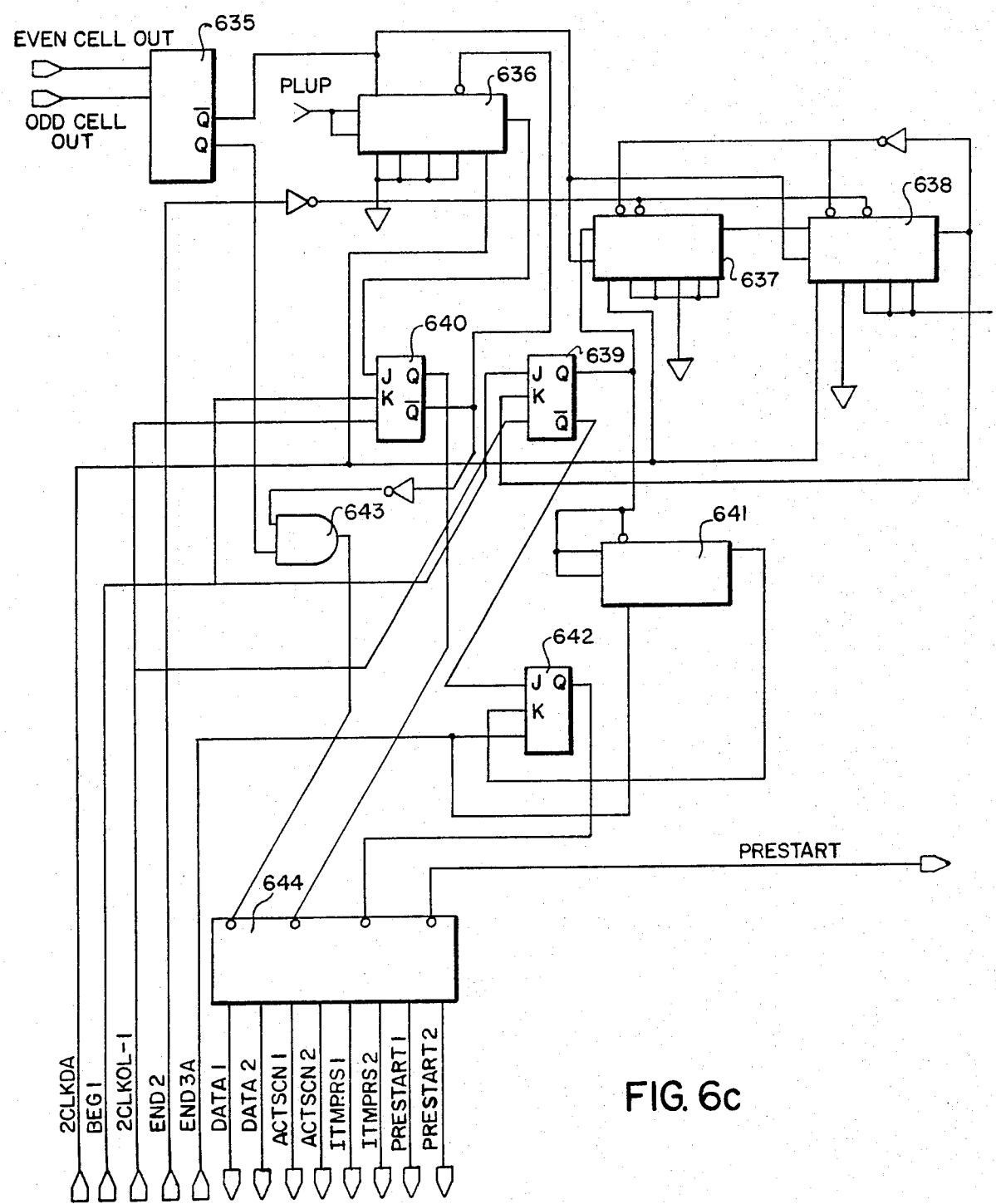

Referring now to FIG. 6c, the document detection circuitry of the document processor of the present invention is depicted. The odd and even numbered cell outputs from comparators 633 and 634 (See FIG. 6b) are applied to shift register 635. Shift register 635 multiplexes the dual three megahertz signals into a single six megahertz video signal. One output of shift register 635 is applied to shift register 636. Shift register 636 is loaded each time a "black" cell is detected and shifts each time a "white" cell is detected. After eight consecutive "white" cells have been detected, the output of shift register 636 is shifted out and sets latch 640. Latch 640 is a simple JK type latch and is utilized to generate the signal which indicates the scan is active (ACTSCN1).

The output of shift register 635 is also applied to counters 637 and 638. Counters 637 and 638 are the leading edge detectors and are reset at the end of each scan through line scanner 606. Counters 637 and 638 are utilized to count "white" cells in a single scan. If sixty-four "white" cells are detected in a single scan, counters 637 and 638 set latch 639. Latch 639 is also a simple JK latch and is utilized to set edge detection latch 642.

The ouput of edge detection latch 642 is utilized to generate the signal which indicates a document is present (ITMPRS1). The output of latch 639 is also applied to counter 641.

Counter 641 is the trailing edge detector. Counter 641 is utilized to count the number of complete scans in which less than sixty-four "white" cells are detected. If sixteen such scans are counted, the output of counter 641 is utilized to reset edge detection latch 642. Header 644 is merely a connection means to allow compatability between systems which utilize a single video camera and systems which utilize two video cameras.

Figure 6D:
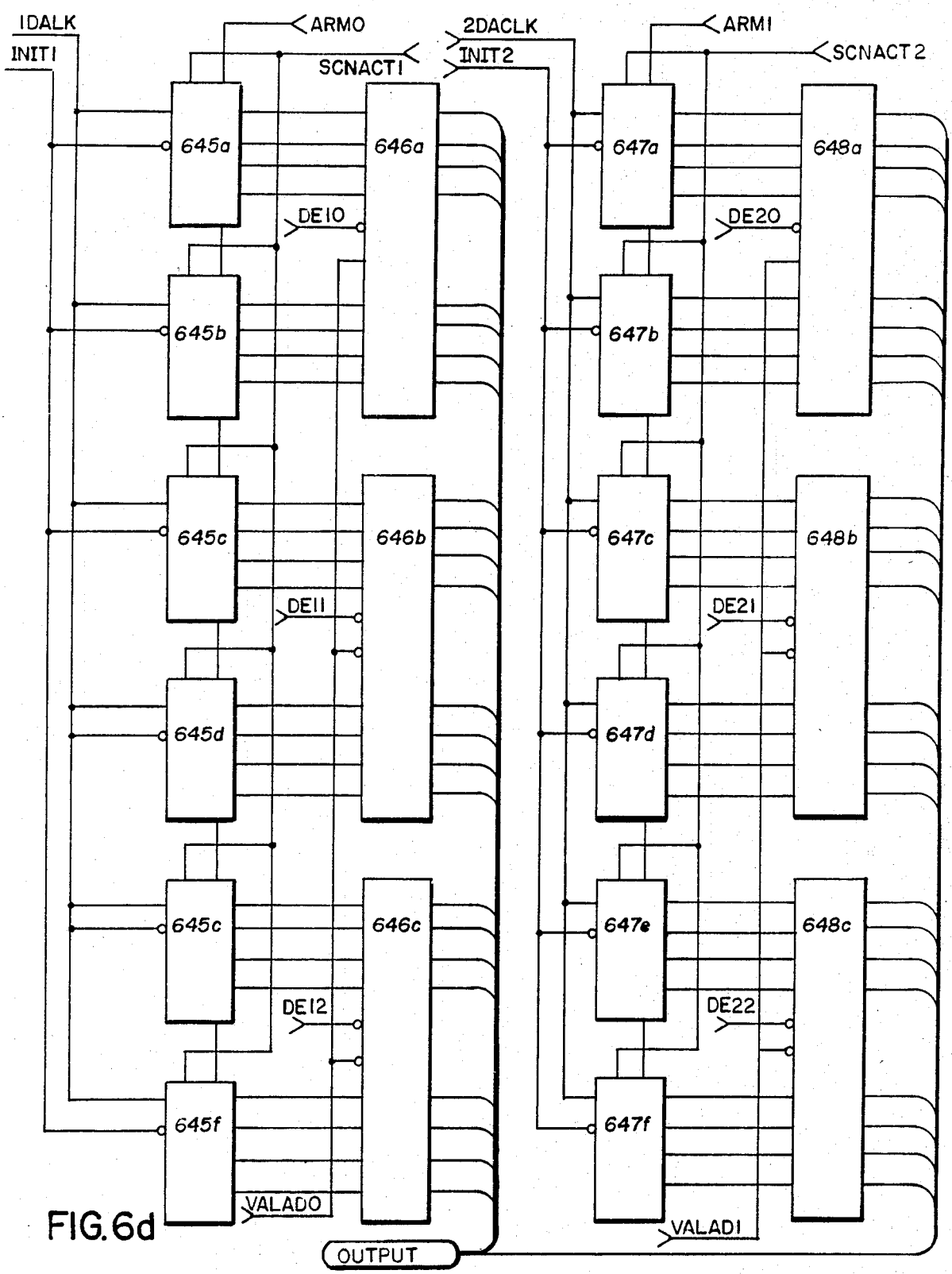

FIG. 6d depicts a series of counters and registers utilized to provide operating information to a controlling microprocessor type device. Counters 645a–645f are utilized to count the total number of active cells in a particular document. The number counted is latched into registers 646a–646c and is available upon query by the control device. Similarly, in applications utilizing two video cameras, counters 647a–647f are utilized to count the total number of active cells in the second side of a particular document and registers 648a–648c store the total count.

Figure 6E:
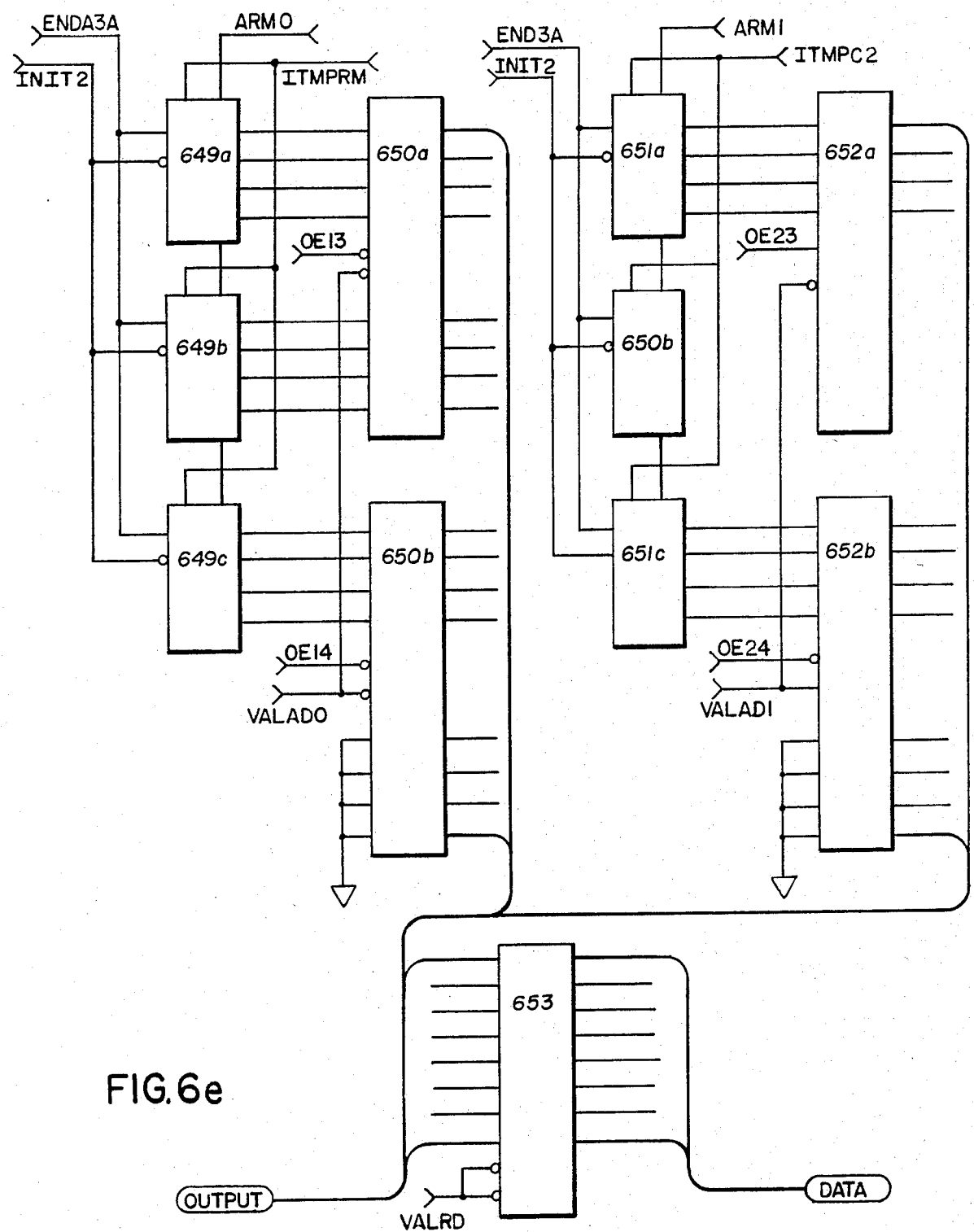

FIG. 6e depicts further counters and registers used to provide operating information. Counters 649a–649c count the total number of lines scanned in a particular document and latch that number into registers 650a and 650b. Similarly, counters 651a–651c are utilized to count the total number of lines scanned by the second camera and that number is latched into registers 652a and 652b. Thus, by knowing the total number of cells and the total number of scans, a control device may simply divide to calculate the exact dimensions of a particular document.

Also depicted in FIG. 6e is bus driver 653. Bus driver 653 is utilized to drive or amplify data being read from any of the interface registers to permit transmittal to a microprocessor type control device.

Figure 6F:
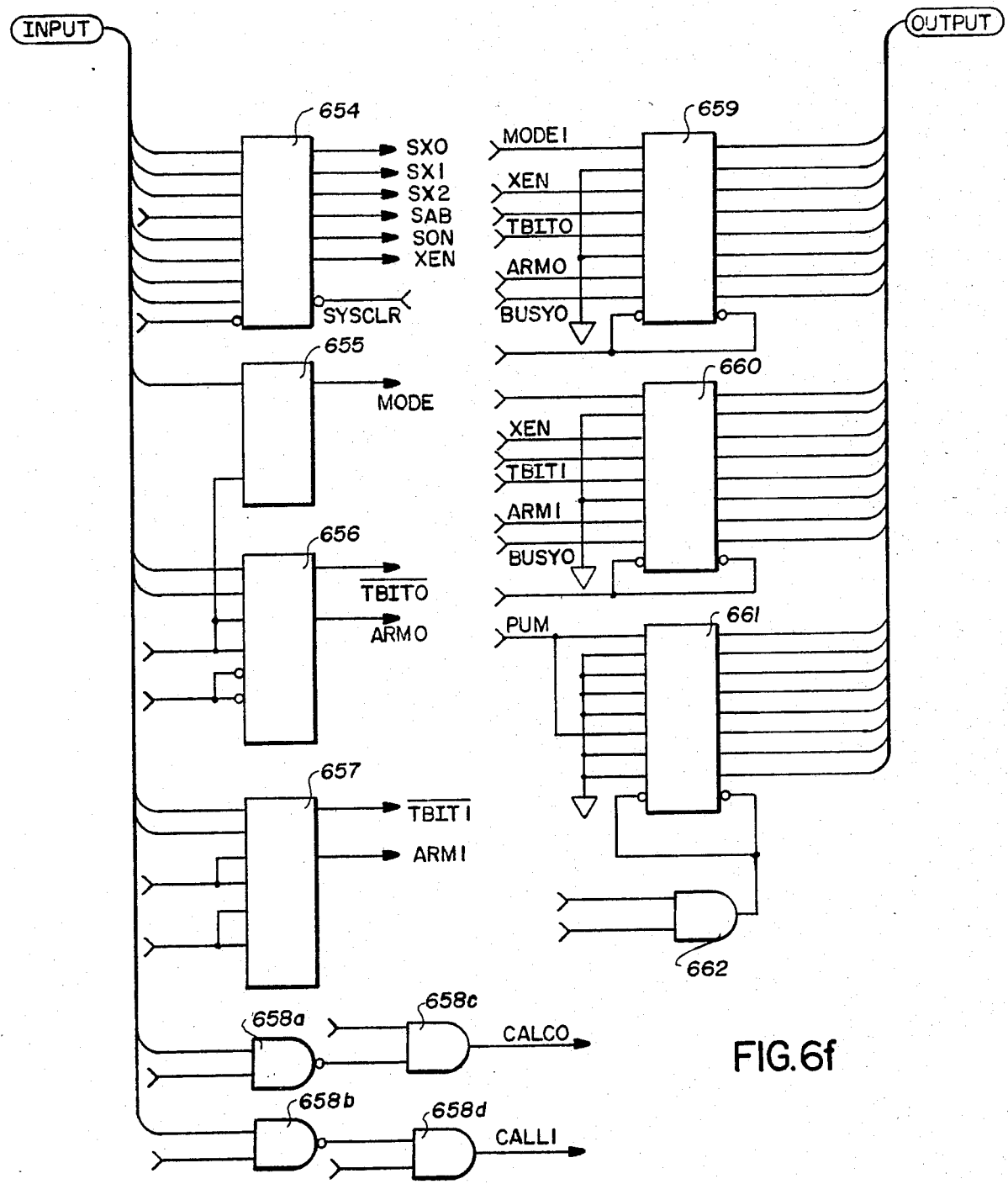

Referring now to FIG. 6f, there is depicted a series of input and output latches utilized to provide communications to and from a microprocessor type control device. Latches 654, 655, 656 and 657 are utilized to latch in information from the control device to the system. Information and/or commands that test, clear or arm the system are received and latched into the appropriate latch. Information received may be utilized to appropriate commands, such as depicted with logic gates 658a–658d.

Information, device identification, returning test data and busy indications may be latched into latches 659, 660, 661 or logic gate 662 for access by a control device.

Figure 6G:
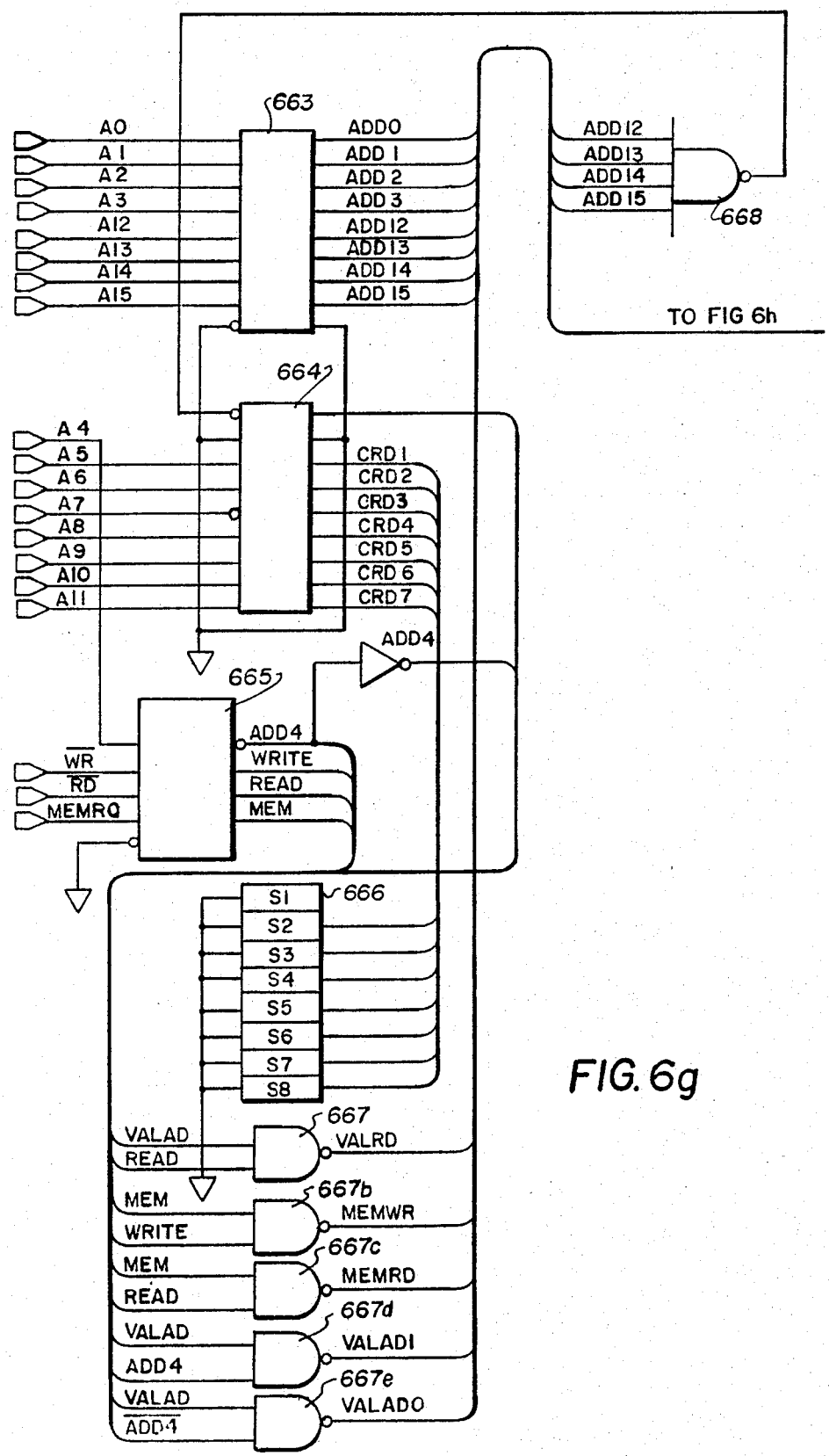

With reference now to FIG. 6g, there is depicted additional address and control circuitry. Switch 666 is a multiple position DIP switch which may be set in a unique pattern to specifically identify a particular transport and camera, recalling that a system may include additional transports as a matter of design choice. The positions of the various switches in switch 666 are coupled to comparator 664 for comparison with the eight address bits generated by the microprocessor type control device. Thus, it is possible for the control device to accurately address a single one of a plurality of devices. If comparator 664 indicates an address match, a valid address signal (VALAD) is generated.

Once a valid address has been detected, the first four bits of address, A0, A1, A2 and A3 are utilized to address up to a maximum of sixteen addressable registers on the addressed device. Bus driver 633 is utilized to couple these address bits to the addressable registers. Bus driver 665 is utilized to couple control commands and the A4 address bit. The A4 address bit is utilized in the illustrated embodiment, in conjunction with the valid address signal, to designate either of two video cameras, utilizing logic gates 667d and 667e. Logic gates 667a–667c are utilized in conjunction with other decoded commands to generate internal read and write commands.

Figure 6H:
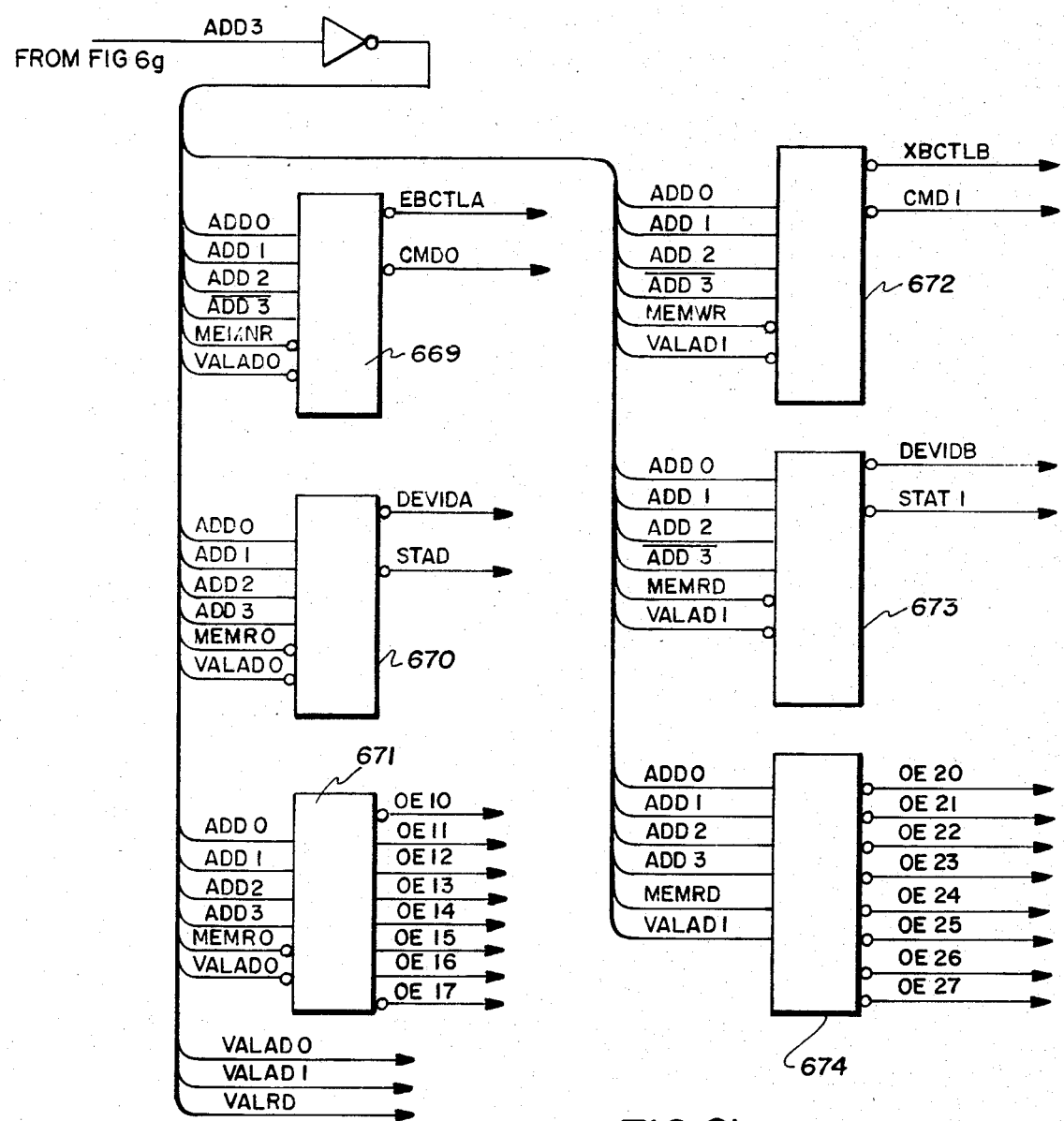

Referring now to FIG. 6h, there are depicted six decoders utilized to decode command and address information from the control device. Decoders 669 and 672 are utilized during a memory write command to either video camera. Decoders 670 and 673 are utilized when the control device issues a memory read to either camera. Decoders 671 and 674 decode the commands which access the total cell number and total scan number registers depicted in FIGS. 6d and 6e.

Figure 6I:
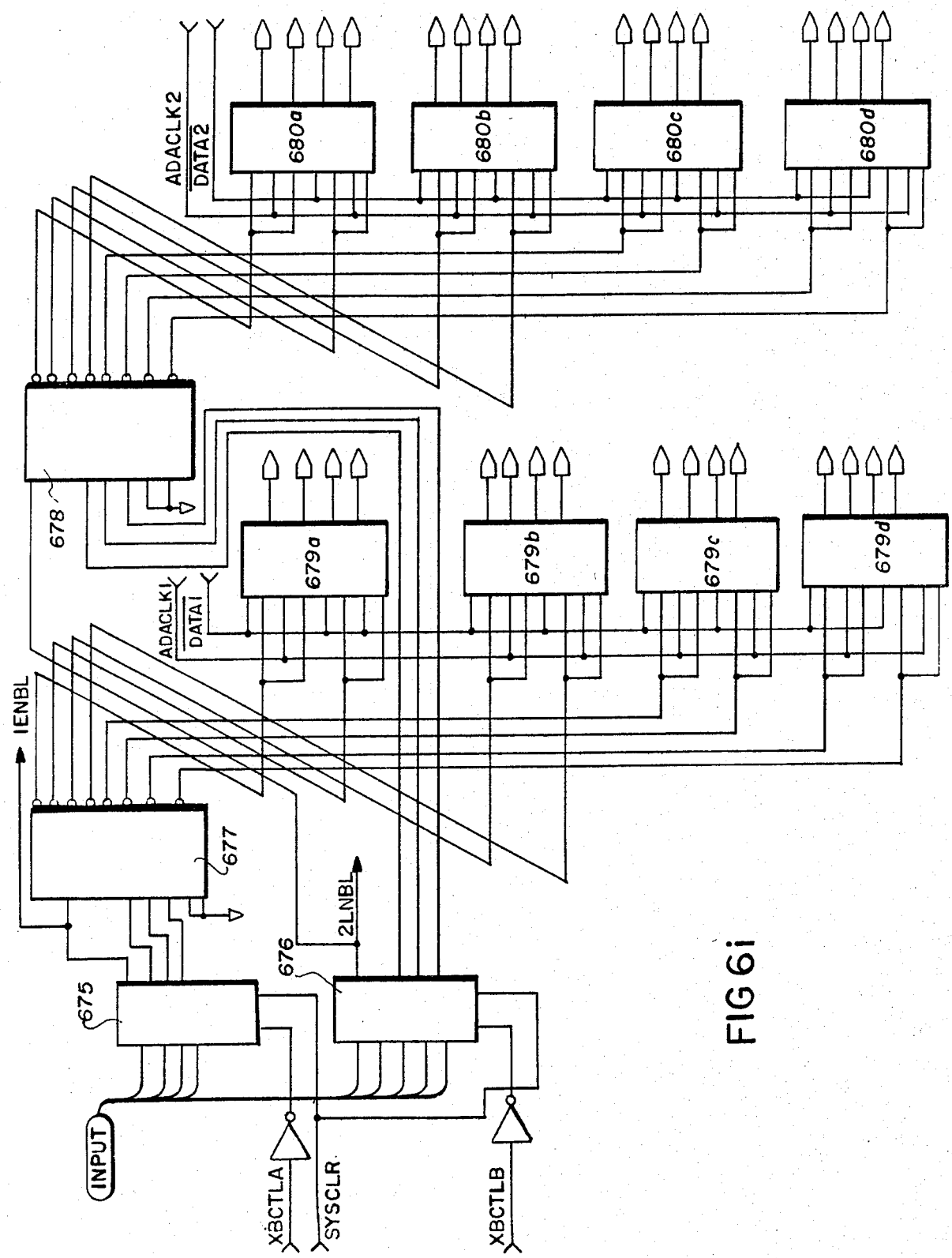

Finally now, with reference to FIG. 6i, there is depicted the output circuitry associated with the video camera of the present invention. The depicted embodiment of the present invention utilizes eight separate video buses to transmit video data between various components of the system. This group of buses is collectively referred to as the X bus, and any single bus may be selected for any single device to utilize.

Control signals from the control device are decoded utilizing decoders 675, 676, 677 and 678. Decoder 675, 676, 677 and 678 may be implemented, in a preferred embodiment, by an integrated circuit of the type 74LS138 manufactured by the Signetics Corporation of Sunnyvale, Calif. The outputs of decoders 677 and 678 are utilized to enable selected three state buffers. Three state buffers 679a–679d, in the illustrated embodiment, will couple the data from one camera to one of four video buses, while three state buffers 680a–680d will couple the data from a second camera to one of the four remaining video buses.

DATA COMPRESSION SYSTEM

With reference now to FIGS. 7 and 8, there is depicted a schematic representation of the circuitry of the data compression system.

Figure 7A:
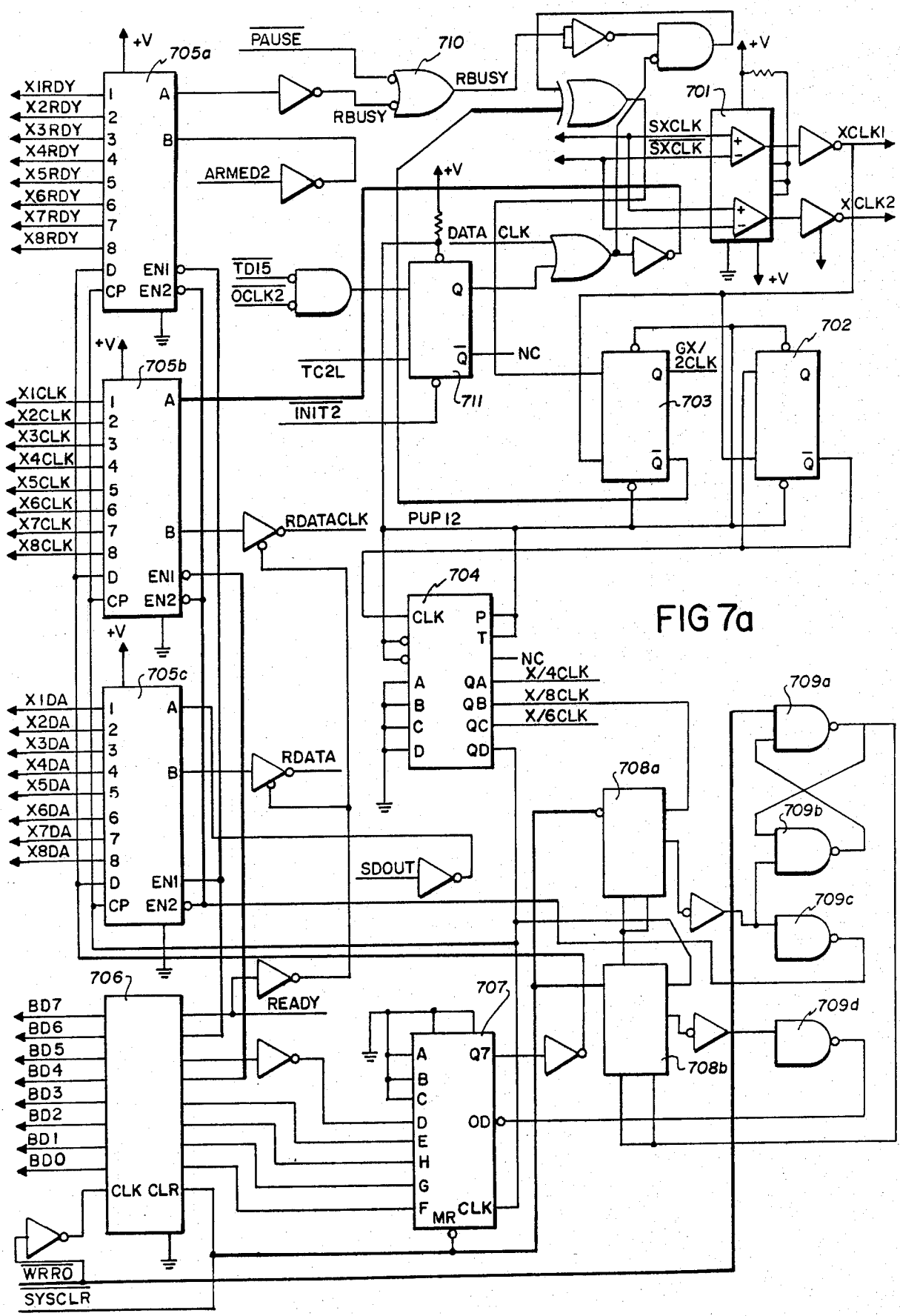
FIGS. 7a–7o and FIGS. 8a–8o depict a schematic view of the components of the data compression system of the document processor of the present invention.

Referring now to FIG. 7a, the system clock and its complements are applied to the inputs of high speed differential comparator 701, which acts as a high speed line receiver. In the disclosed embodiment, the system clock is a 30.5 megahertz signal generated utilizing a crystal controlled oscillator (not shown). The output of comparator 701 is applied to multivibrators 702 and 733, where the frequency is halved in a manner well known in the art.

The output of multivibrator 702 is applied to four bit binary counter 704, where the halved clock frequency is further divided into lower frequencies which are utilized throughout the system.

Cross point switches 705a, 705b and 705c are utilized by a microprocessor type control device to select one of eight bus lines to be coupled to the data compression system. The cross point switches utilized in a preferred embodiment of the present invention are Signetics type SD5301 switches. As previously mentioned, the eight line bus referred to as the X bus is comprised, in one embodiment of the present invention, of eight three wire bus lines. Each bus line has a ready line, a clock line and a data line. The particular bus selected by cross point switches 705a, 705b and 705c is controlled by bus control register 706, in response to commands from a microprocessor type control device.

Bus control register 706 is utilized to control cross point switches 705a, 705b and 705c in conjunction with shift register 707. Shift register 707 is a parallel inserial out (PISO) register which is utilized to serialize the command data from register 706 and couple that serialized command data to set up the cross point switches.

Shift registers 708a and 708b are utilized in conjunction with logic gates 709a, 709b, 709c and 709d to enable cross point switches 705a, 705b and 705c and to control register 706 when data is being written into register 706. By controlling data into register 706 and the clocking of that data out of shift register 707, the operation of the cross point switches is carefully sequenced.

In the event that the selected X bus line is occupied, or when a pause signal indicates that incoming data must temporarily stop, circuitry is present which will cease data input to the data compression system. A not ready condition out of cross point switch 705a or an internally generated pause signal at the input of NOR gate 710 will generate a signal (RBUSY) which will stop the operation of multivibrator 703, and thence the operation of the output section.

Also depicted in FIG. 7a is end of data clock 711. Clock 711 is a simple multivibrator which is utilized to generate the end of the output data signal.

Figure 7B:
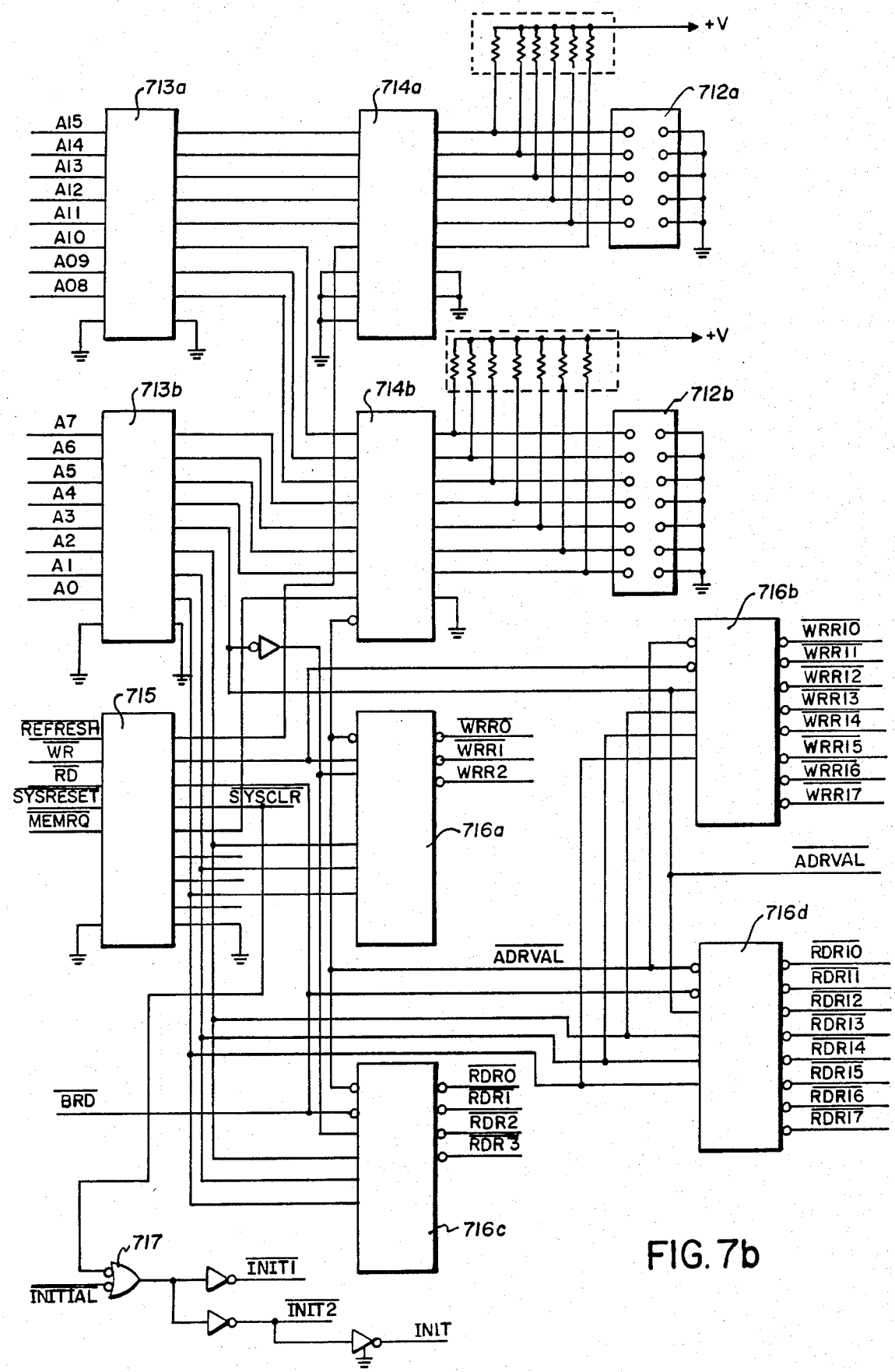

Referring now to FIG. 7b, there is depicted the circuitry by which the microprocessor type control device may accurately address the data compression system and various registers within the data compression system.

Jumper wire switches 712a and 712b are utilized with various jumper wires to provide a unique address for the data compression system. Buffers 713a and 713b are utilized to receive a board address and register address from the control device. Each board may contain up to sixteen separate addressable registers (or thirty-two including read only and write only registers) and therefore four bits of address A0-A3 are utilized to select a register.

The remaining address bits are coupled to comparators 714a and 714b where they are compared to the address of the data compression system board, as determined by the placement of jumper wires in jumper wire switches 712a and 712b.

Control signals from the control device are coupled to buffer 715 and one of eight decoders 716a-716d are utilized to decode the selected register address to determine which register will be read or written to by the current command.

Logic gate 717 is utilized to receive the INITIAL signal and is utilized to generate the signals which initialize various other portions of the data compression system.

Figure 7C:
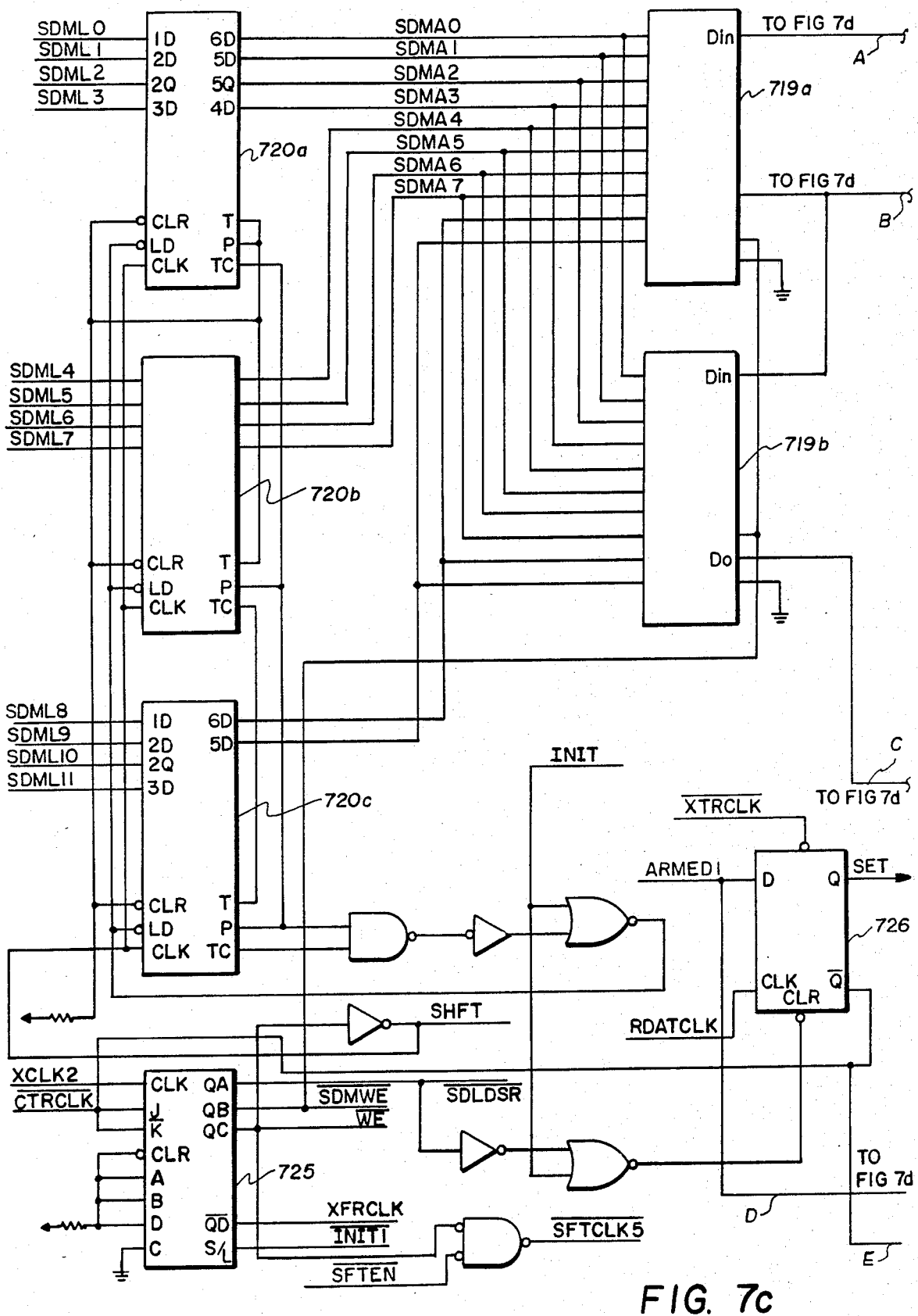
Figure 7D:
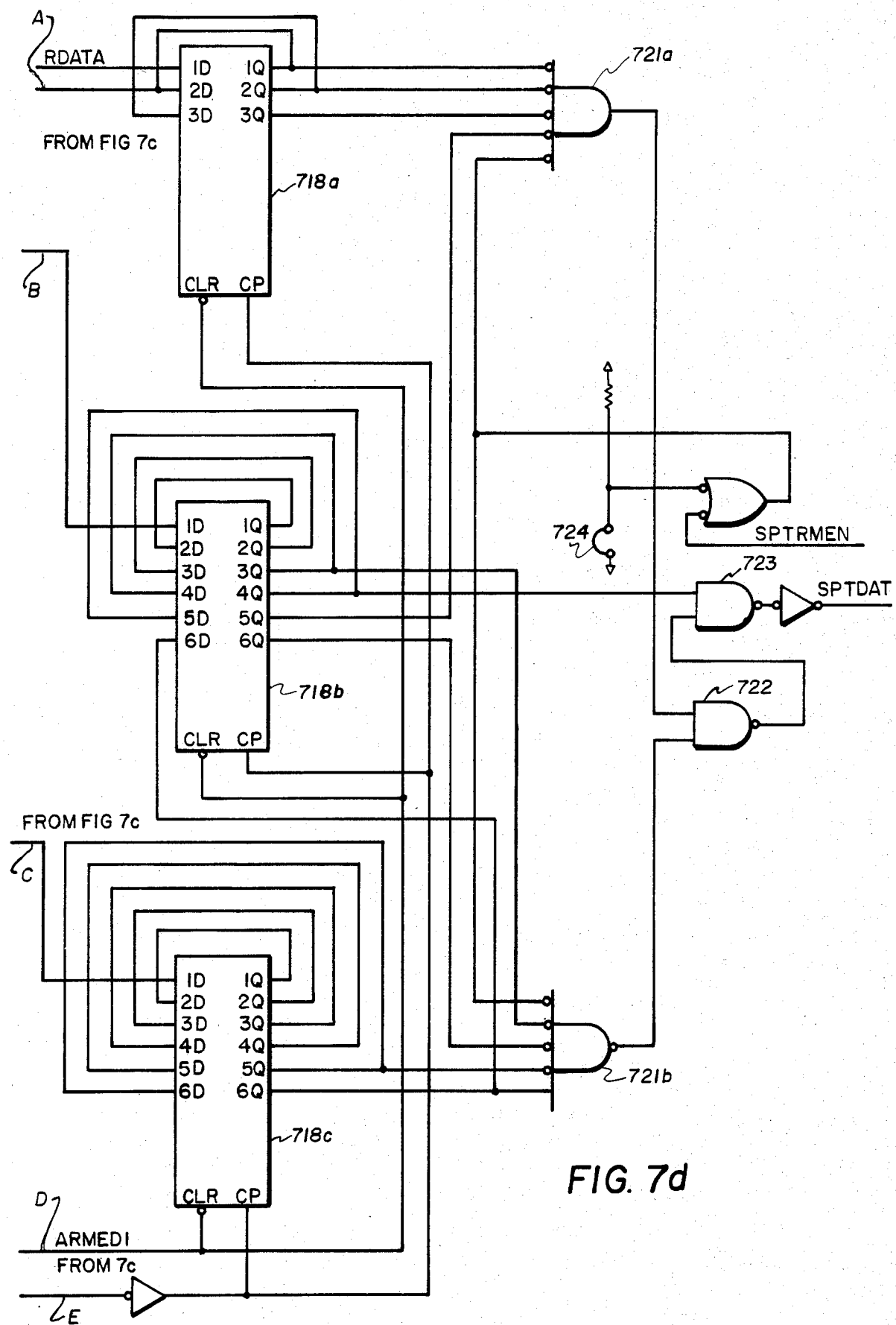

FIGS. 7c and 7d, when placed side by side in the manner indicated in those two figures, depict a schematic representation of the "spot remover" circuitry of the data compression system of the present invention. The spot remover circuitry is utilized to remove any single black "spot" from the data which corresponds to a particular image. A spot is defined for these purposes as a single black cell detected by line scanner 606 (see FIG. 6), that is surrounded by white cells.

Referring now to FIGS. 7c and 7d, the data stream representative of a scan through a document is coupled to an input of register 718a and then out of register 718a and into delay register 719a. Delay register 719a is, in a preferred embodiment, a 1024 bit random access memory that is utilized in the manner of a long shift register.

The data out of register 718a is written into delay register 719a at an address determined by address generators 720a-720c. Address generators 720a-720c are initially loaded to a number which correlates with the number of cells in each scan for a particular document or group of documents. Address generators 720a-720c are four bit counters which are utilized to control the addresses in delay registers 719a and 719b. Thus, the data from register 718a is written into an address of delay register 719a which will result in the leading edge of data exiting delay register 719a at the end of each scan.

The data exiting delay register 719a is coupled to register 718b and to the input of delay register 719b. As above, the data in delay register 719b is delayed for the length of a scan and is then coupled to register 718c. Those skilled in the art will appreciate that this configuration will result in a sample of the current scan being present in register 718a, a sample of the previous scan being present in register 718b, and a sample of the next previous scan being present in register 718c.

It is therefore a simple matter to examine the surrounding cells, utilizing logic gates 721a and 721b, and to determine whether or not a particular black cell is a "spot" that should be removed. Logic gate 723 compares the single cell with the surrounding cells and generates the signal which removes the spot. Wire jumper 724 is provided to allow the spot remover circuitry to be disabled, if that is desired in a particular embodiment.

Register 725 is a four bit, parallel access shift register which is utilized, in conjunction with flip-flop 726, to generate write enable signals and various system clock signals.

Figure 7E:
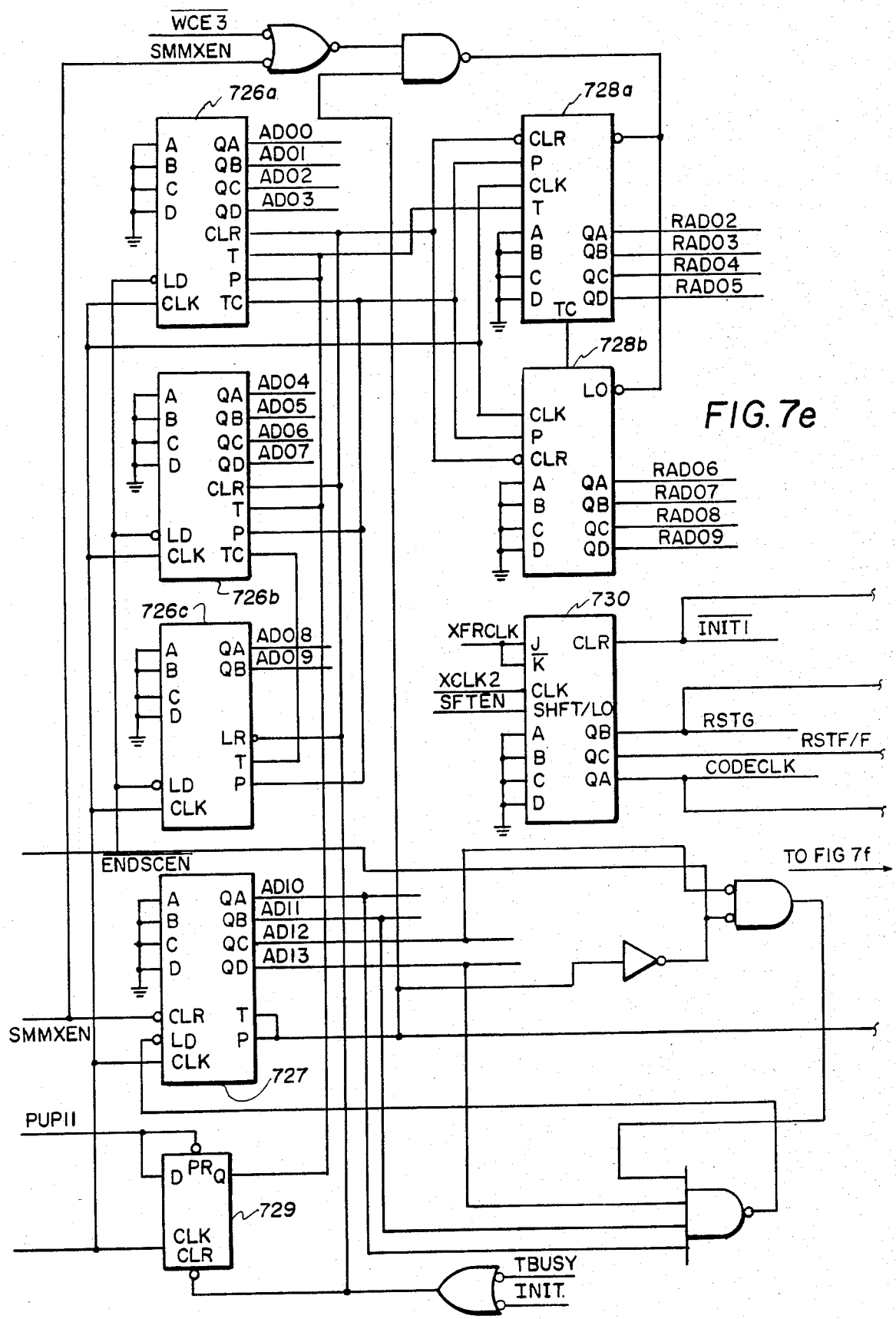
Figure 7F:
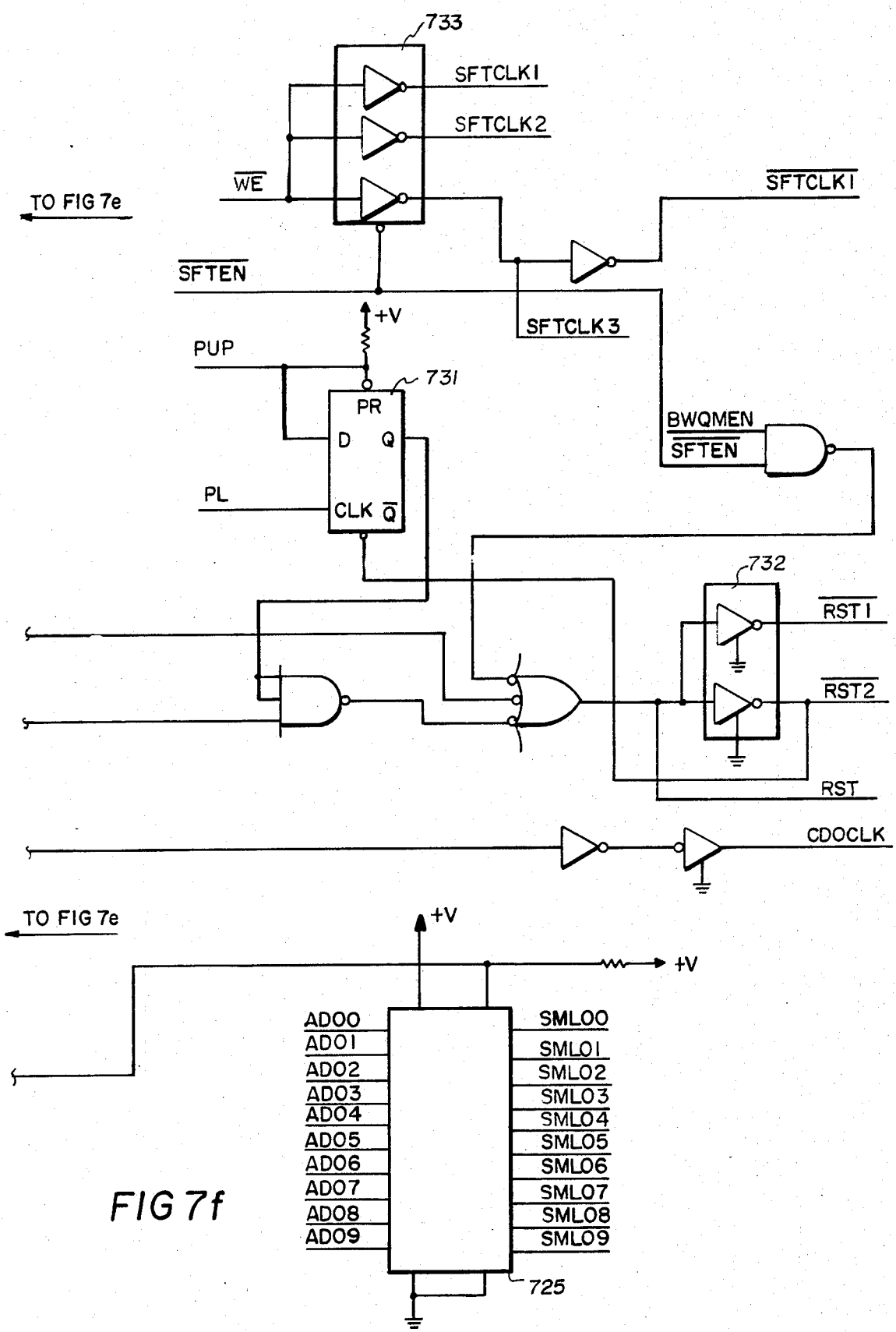

With reference now to FIGS. 7e and 7f, which when placed side by side in the manner indicated in the drawings, depict the scan memory address circuitry. The data associated with a plurality of adjacent scans through a document must be stored and examined to permit data compression, and such storage must be accomplished in a precise manner to permit later synthesis of a document image. In order to accomplish this storage in an orderly fashion, the number of scans and the number of cells in each scan must be carefully tracked.

Comparator 725 in FIG. 7f is utilized to compare the number of cells in each scan with an incremented address. The number of cells in each scan is loaded into the data ompression system, by a control device, through registers which are not shown. The incremented address which controls the storage location of incoming data is generated by scan memory address generators 726a, 726b and 726c. Address generators 726a, 726b and 726c are four bit binary counters which are initialized and then utilized to count to an address which corresponds to the number of cells in each scan as determined in comparator 725. When the address thus generated is equal to the number of cells in a scan, the process is repeated.

Each time comparator 725 detects the end of a scan, the output signal is coupled to scan counter 727. Scan counter 727 is utilized to keep track of the number of scans stored, because, as will be explained below, the data compression system of the present invention operates with twelve scans in temporary storage in scan memory.

Read address generators 728a and 728b are utilized to generate the addresses which will be utilized to read the scan data from temporary storage in the scan memory. A separate read address generator is necessary because as will be explained herein, the scan data in temporary storage is read out of the scan memory in a different order than the order in which it was stored.

Multivibrator 729 is utilized to initiate the address generators and read address generators at the beginning of operation. Parallel access shift register 730 and multivibrator 731 are utilized to develop various clocks and reset commands utilized to operate the data compression system of the present invention. Buffers 732 and 733 are utilized to buffer and isolate the clocks and reset signals so generated.

Figure 7G:
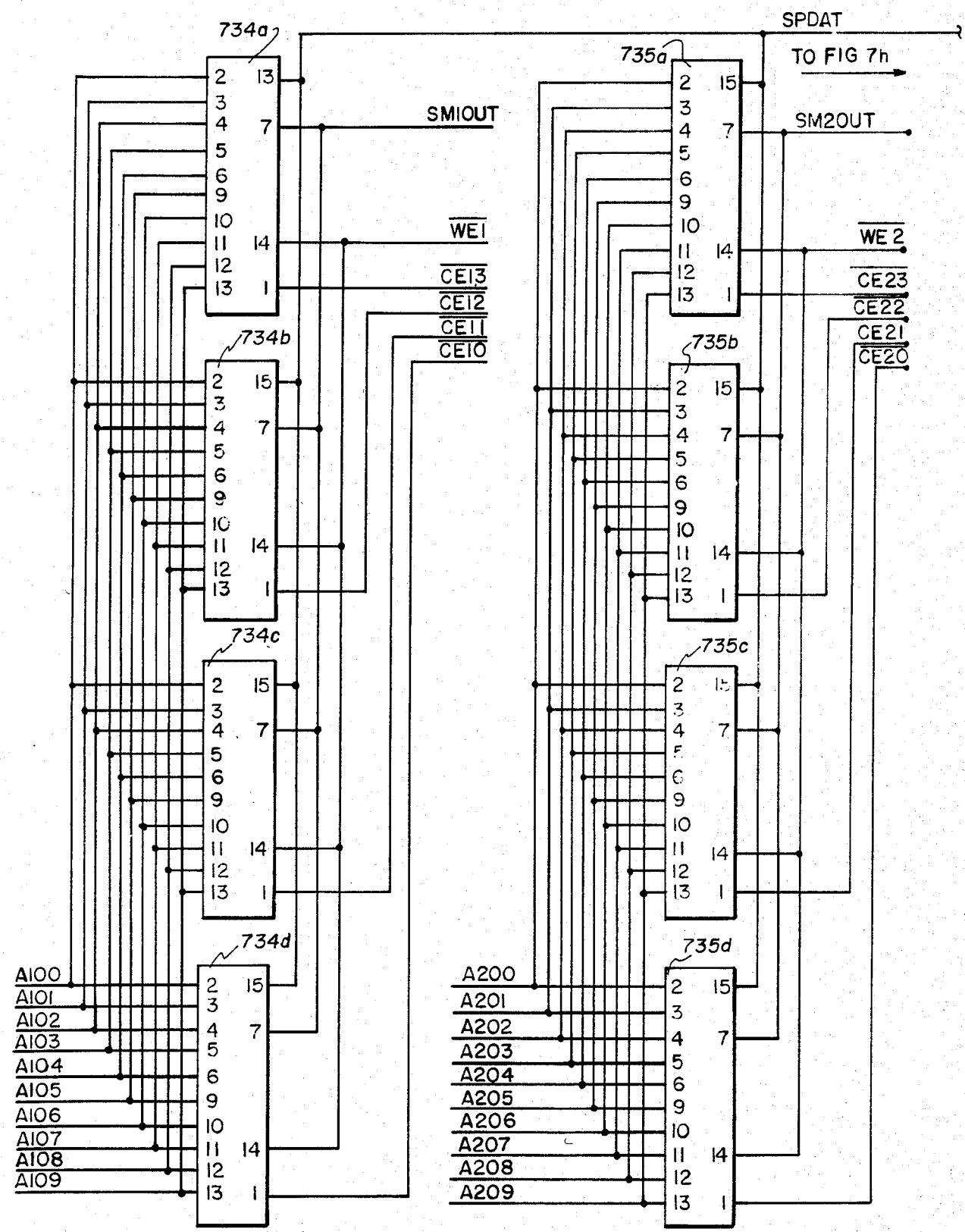
Figure 7H:
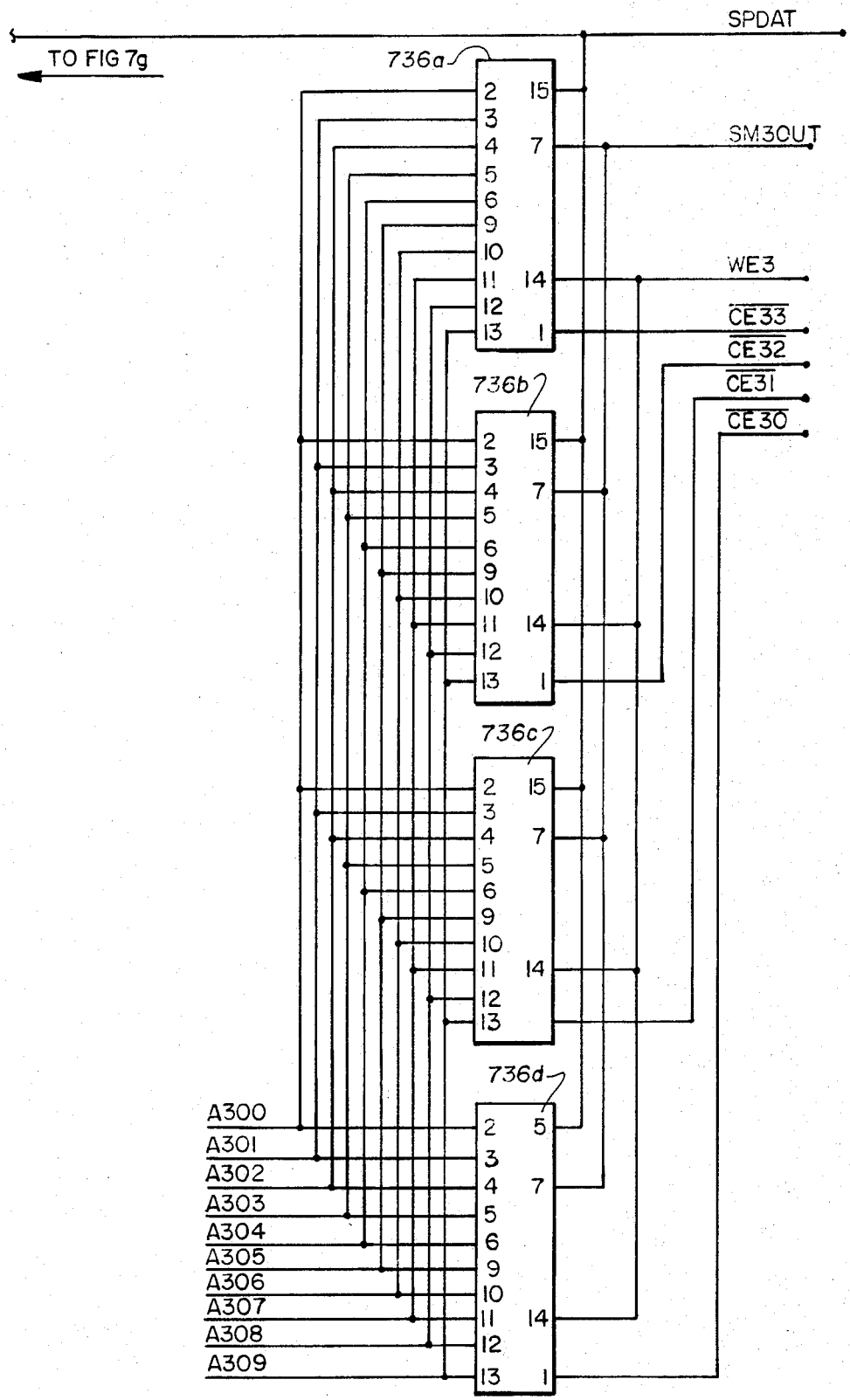

FIGS. 7g and 7h, when positioned side by side in the manner indicated in the figures, form a schematic diagram of the scan memory previously discussed. Each of the memory blocks depicted, 734a–734d, 735a–735d and 736a–736d are implemented utilizing a 1024 bit random access memory. Thus, each memory block may temporarily store one complete scan through a document, recalling that a scan may consist of up to seven hundred and sixty-eight separate cells of line scanner 606 of FIG. 6. Further, the scan memory formed by the combination of memory blocks 734a–734d, 735a–735d and 736a–736d may temporarily store twelve individual scans.

Figure 7I:
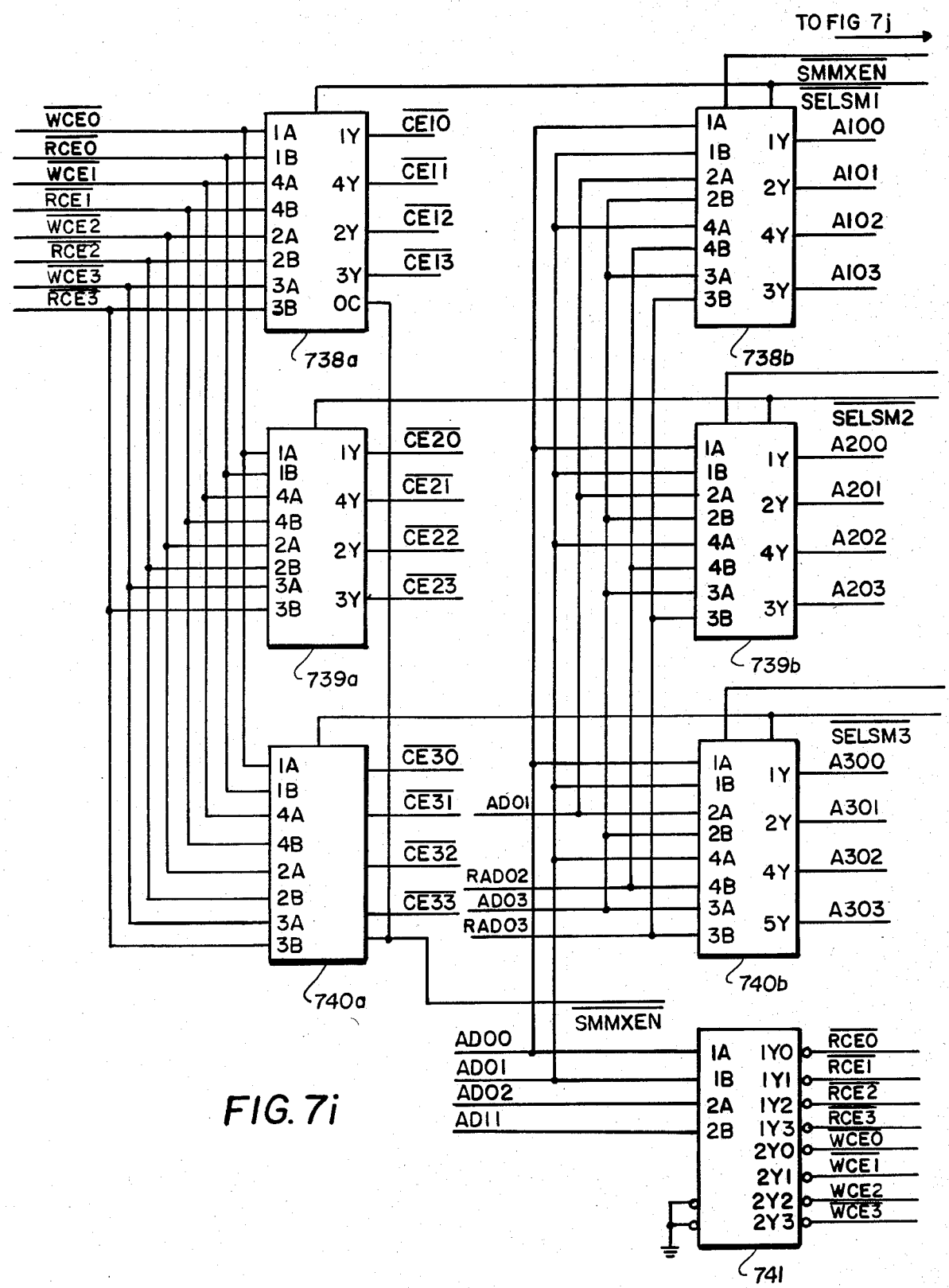
Figure 7J:
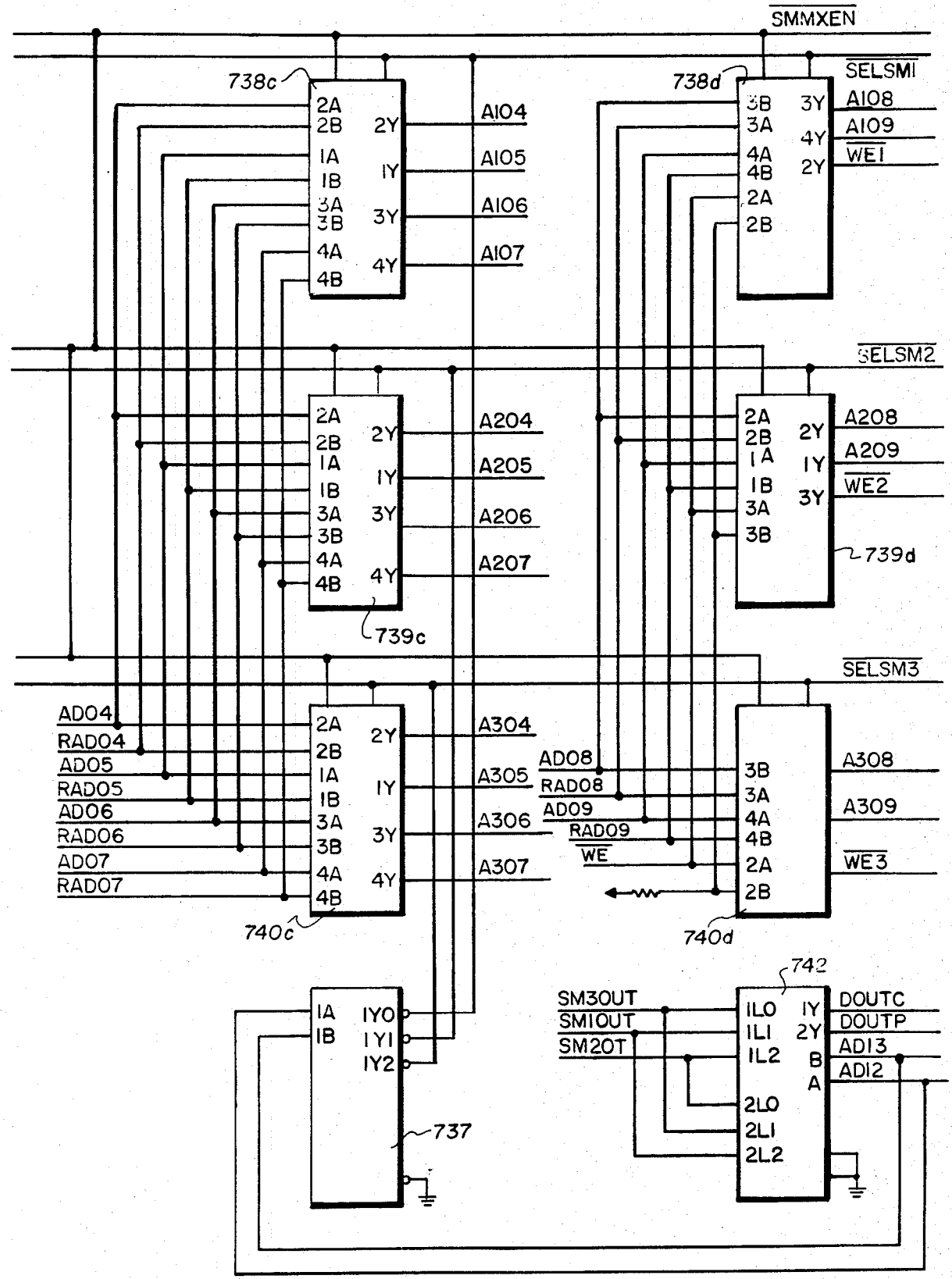
Figure 71:
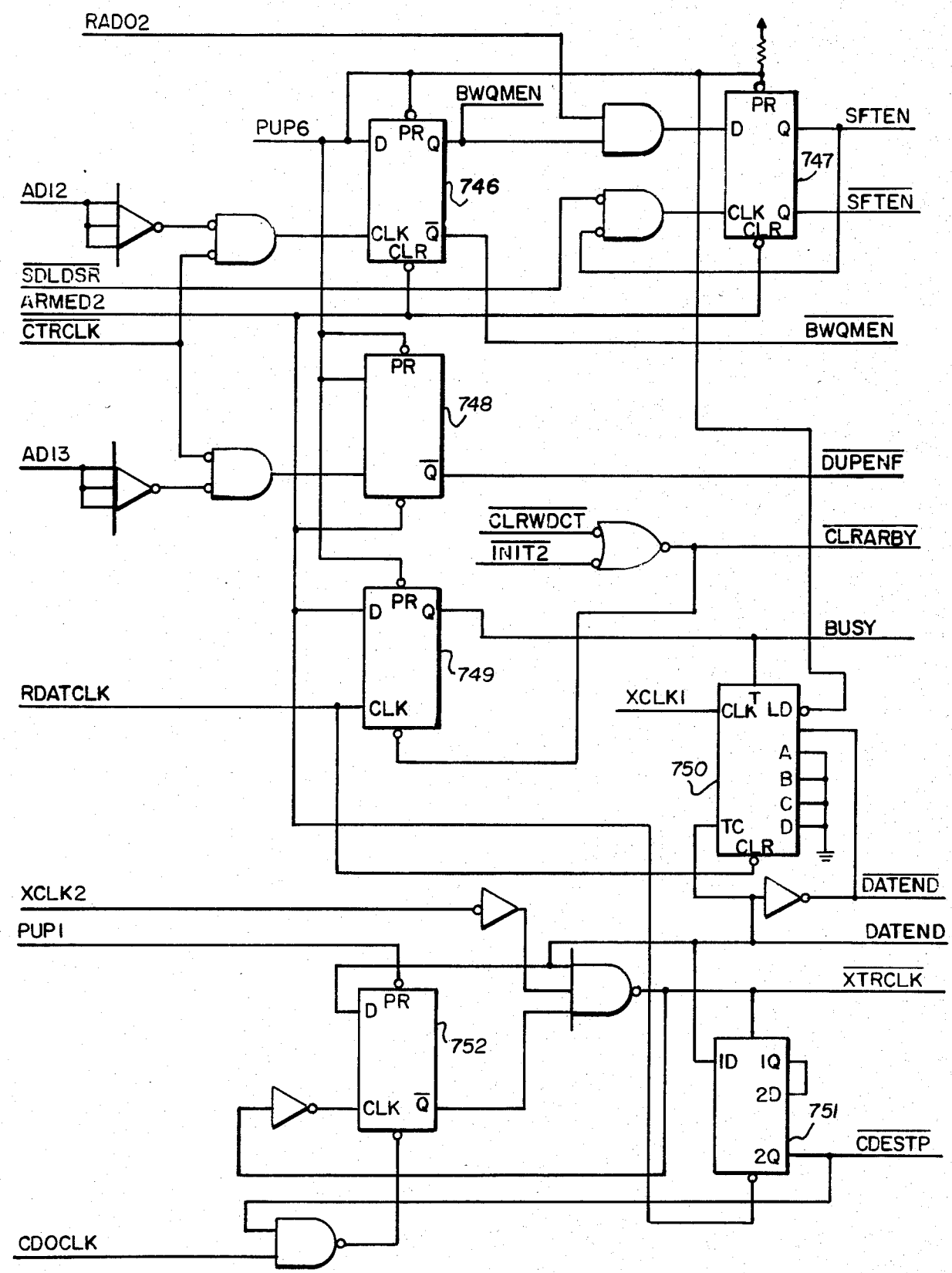

FIGS. 7i and 7j, when positioned as indicated in the figures, form a schematic diagram of the address multiplex circuitry of the scan memory of the present invention.

Address multiplex circuitry is necessary because, although the data obtained from line scanner 606 (FIG. 6) is obtained and written into temporary storage in the scan memory in a vertical format (with respect to the document image), experimentation has shown that maximum data compression will occur with analysis of that data in a horizontal format.

As previously discussed, the scan memory formed by memory blocks 734a–734d, 735a–735d and 736a–736d (FIGS. 7g and 7h) form temporary storage for twelve complete vertical scans. The data within the scan memory is analyzed horizontally in groups of four scans. Therefore, the twelve memory blocks are further broken down into three groups, two of which are being read while the third group is being written into.

The two groups being read are referred to as the current data and previous data. The previous data represents the previous four scans prior to the current four scans read into the system and is maintained in temporary storage to determine what, if any, relationship exists between that data and the current data. This examination is necessary to detect possible redundancies which may be removed and replaced with coded equivalents.

The described system of vertical writing and horizontal reading requires address multiplexing to insure proper operation. Consider the subgroup of four memory blocks into which data is being written. A memory block is enabled, an address is supplied from scan memory address generator 726a–726c (FIG. 7e), and the address is incremented until comparator 725 (FIG. 7f) indicates the address has reached the end of the number of cells in a scan. Next the memory block enable signal is incremented, the address generators are initialized and the process is repeated until four scans are written into the scan memory.

When a subgroup of the memory blocks is being read, an address is generated by read address generators 728a and 728b (FIG. 7e) and the memory block enable signal is incremented through a four count. Next, the address is incremented and the memory block enable signal is incremented through the four memory blocks in the subgroup.

Decoder 737 acts as a one of three decoder which enables one of the three subgroups of the scan memory at a time. A subgroup of memory is enabled utilizing address multiplexers. The first subgroup utilizes address multiplexers 738a–738d. Each address multiplexer is a quad two line to one line multiplexer. Address multiplexer 738a is utilized to provide the chip enable signal (CE) which determines which of the four memory blocks within the subgroup is enabled. Address multiplexers 738b–d are utilized to provide the address within the enabled memory block, and the signal which determines whether data is being read from or written to the selected address. Address multiplexers 739a–d and 740a–d operate identically with respect to the second and third scan memory subgroups.

Decoder 741 is a dual one of four decoder which is utilized to provide the read and write enable signals which serve as the inputs to address multiplexers 738a, 739a and 740a. Multiplexer 742 is a dual four line to one line multiplexer which is utilized to select the output of a particular subgroup of the scan memory to be output as the current data, and the output of a second subgroup to be output as the previous scan data.

With reference now to FIG. 7k, there is depicted the shift registers which allow examination of the scan data temporarily stored in the scan memory. Current scan data is shifted into the sixteen bit shift register formed by eight bit shift registers 743a and 743b. Data from the previous scan is simultaneously shifted into the sixteen bit shift register formed by eight bit shift registers 744a and 744b. In this manner, current data may be compared to previous data and redundancies in current data may be examined in a bit by bit manner, as the data shifts through the shift registers.

Multivibrator 745 is utilized to enable scan memory address multiplexer 738a, 739a and 740a (FIG. 7i) after the completion of the first scan.

Referring now to FIG. 7l, multivibrators 746 and 747 are utilized to develop the shift enable signals (SFTEN and $\overline{\text{SFTEN}}$) which are utilized throughout the system to enable various shift clocks and reset signals. Multivibrator 748 is utilized to develop the duplicate enable signal ($\overline{\text{DUPENF}}$) which is utilized during those periods when the scan data is duplicating previous values and the redundancy may be removed. Multivibrator 749 is utilized to generate the BUSY signal in response to the signal indicating the system is armed and that data is being clocked into the system.

Four bit binary counter 750 is utilized as a time out counter. After a signal is received indicating the end of scan data, counter 750 is utilized to provide the signal shuts down the system. Flip-flop 751 and multivibrator 752 are utilized to provide additional clock signals after the end of data has been detected, to ensure that data within the system is completely processed prior to system shutdown.

Figure 7M:
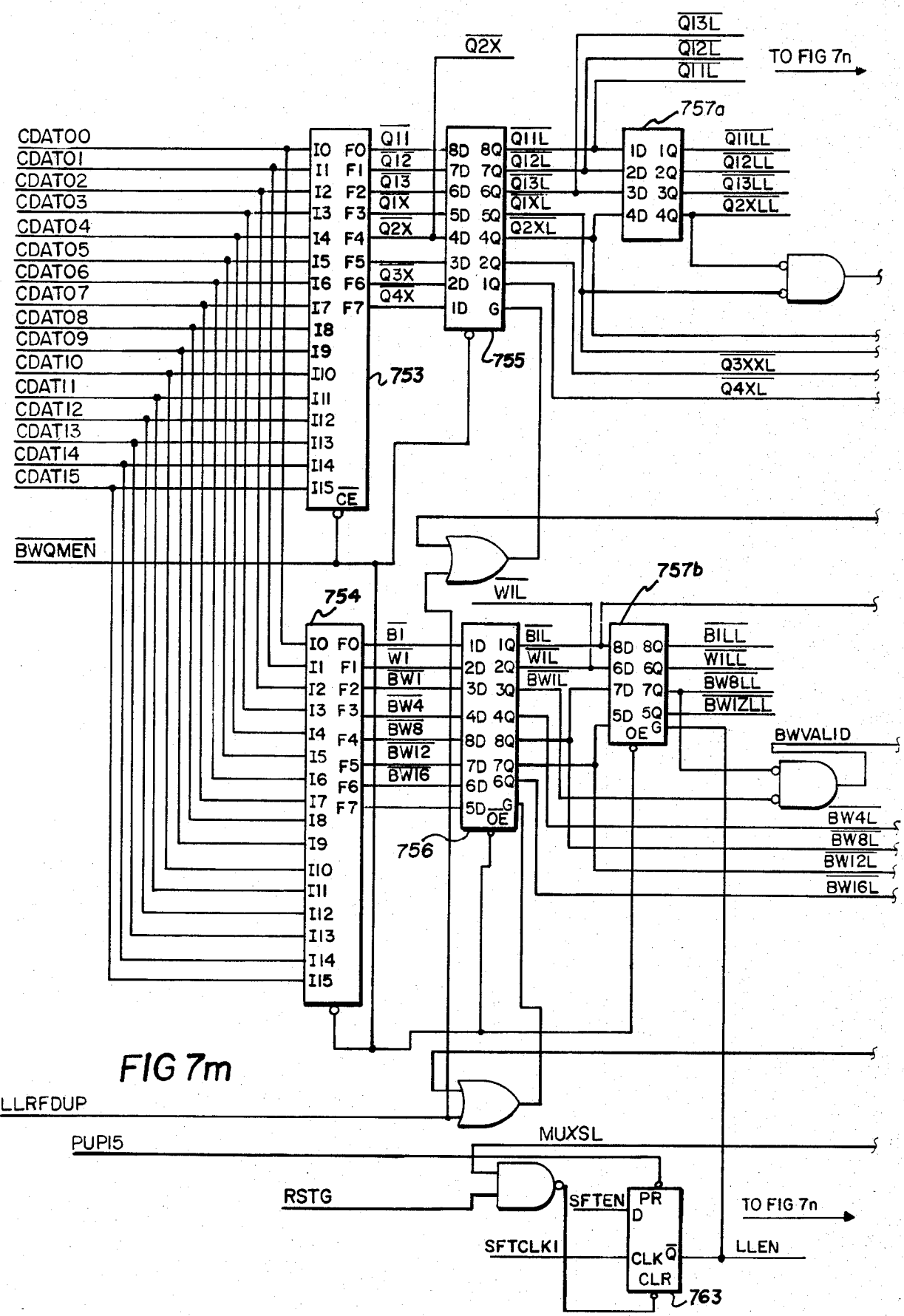
Figure 7N:
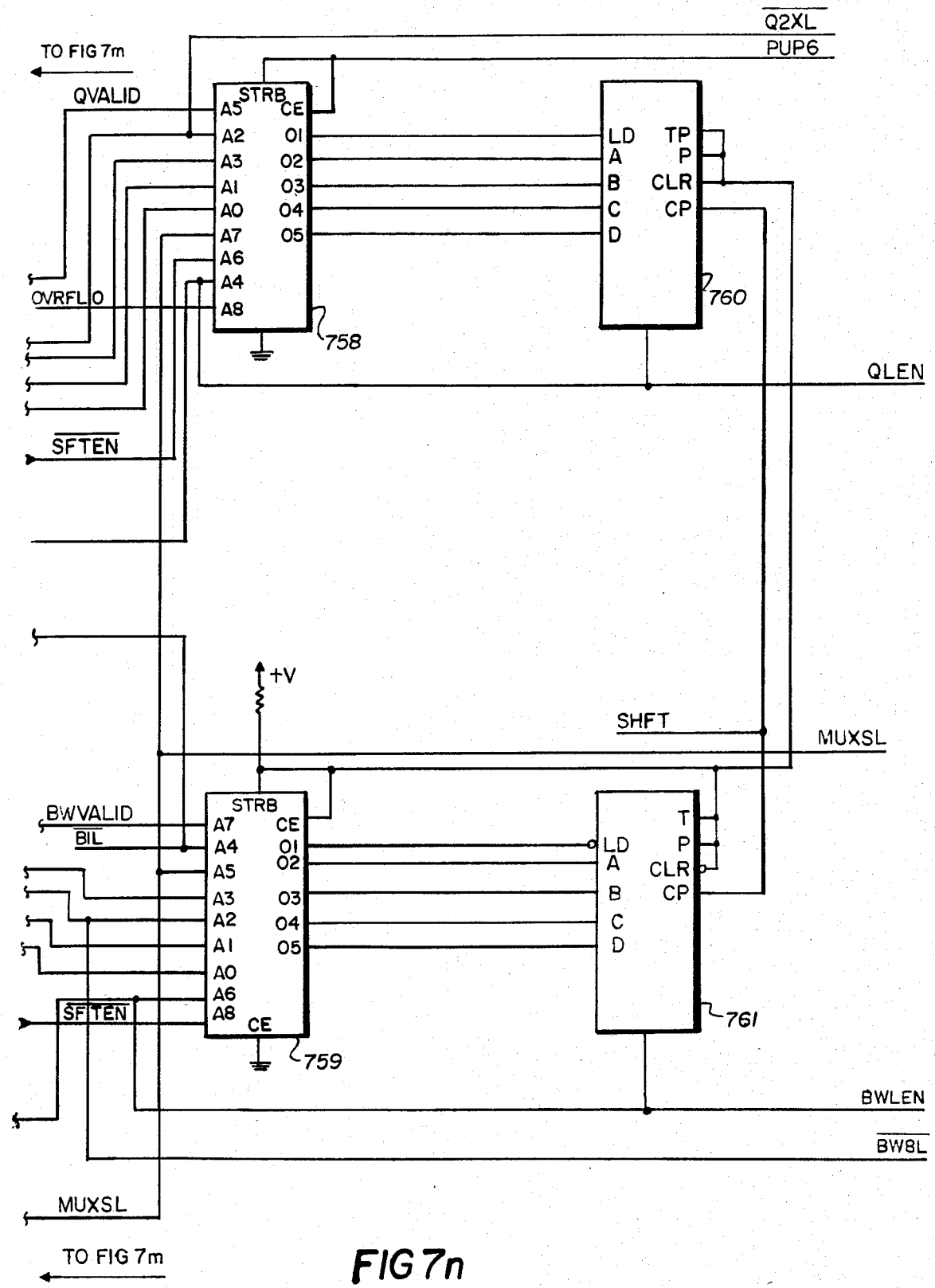
Figure 70:
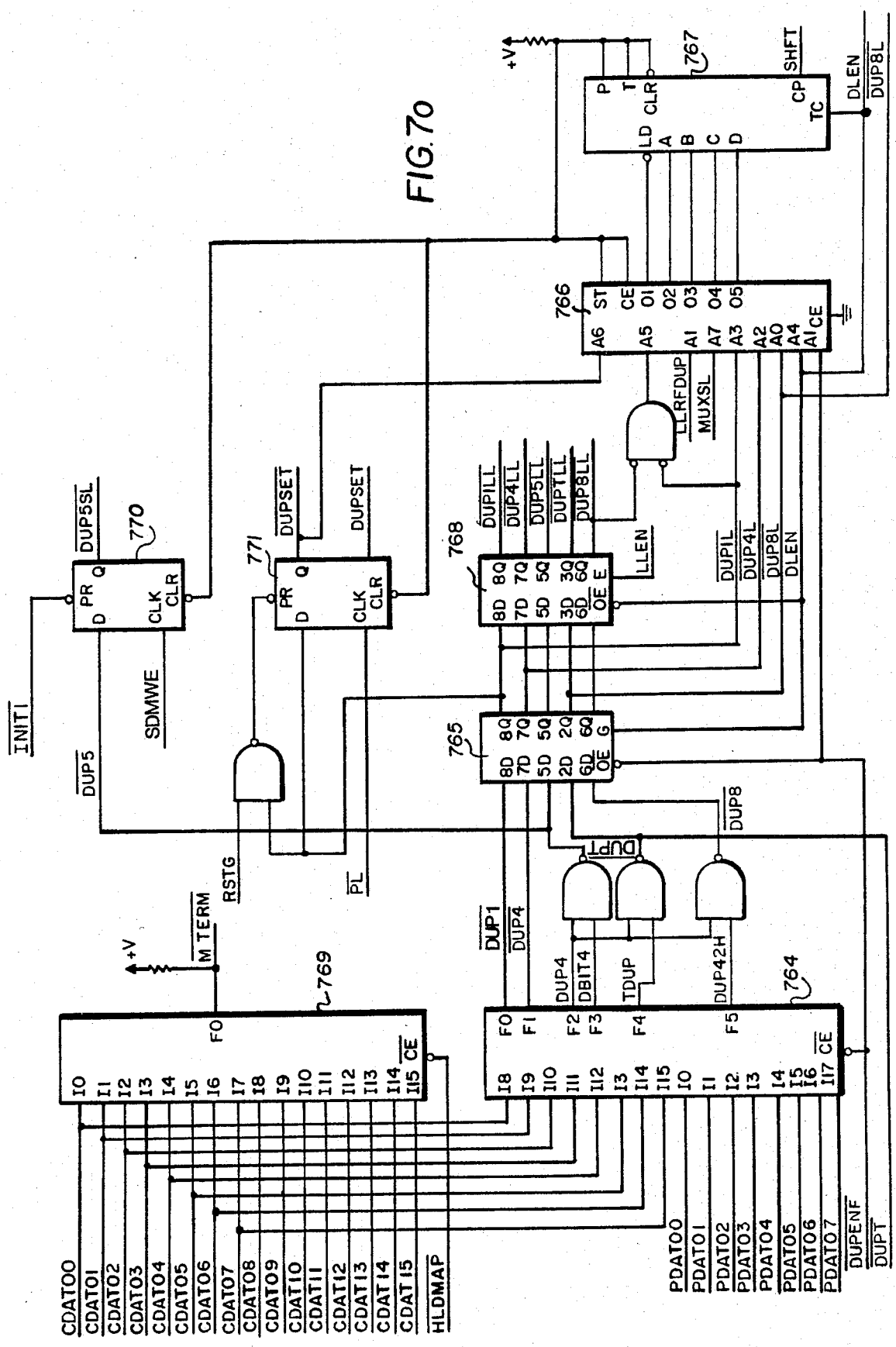

FIGS. 7m and 7n, when joined in the manner indicated in the figures, form a schematic diagram of a section of the redundancy removal circuitry of the data compression system of the present invention.

Experimentation in the field of video image data compression has proven that while examining horizontal sections of four scan cells, there exist certain predominant repetitive patterns. These patterns are referred to herein as "Q" codes, and the most common three codes are: a black cell followed by three white cells (1000 in binary representation); two black cells followed by two white cells (1100 in binary representation); and, three black cells followed by a single white cell (1110 in binary representation).

In view of the above, it will prove beneficial to examine the scan data to determine if a series of these Q codes are present. To that end, current data present in shift registers 743a and 743b (FIG. 7k) is coupled to Q code logic array 753. Logic array 753 is a field programmable logic array such as the 82S100, manufactured by Signetics of Sunnyvale, Calif. Logic array 753 is utilized to determine first, whether or not one of the aforementioned three Q codes is present in the first four positions of the sixteen bit logic array, and second, how many repetitions of that code are present. It will be apparent to those skilled in the art that up to four consecutive four bit Q codes may be present at a single time in logic array 753.

The current data present in shift registers 743a and 743b is also simultaneously coupled to black/white logic array 754. In a manner similar to the operation of logic array 753, logic array 754 examines the first bit present to determine whether it is black or white, and secondly how many consecutive blacks or whites follow the first bit.

In the preferred embodiment, logic arrays 753 and 754 are utilized to detect the state of the data coupled thereto and to ensure that the redundancy present is at least eight bits in length. This requirement is a design choice; however, since the redundancy to be removed must be replaced with an identifying code and an indication of the length of the redundancy (count), eight bits seems to be a practical minimum length.

The state of the data in logic array 753 and 754 is coupled to transparent latches 755 and 756 respectively. The output of latches 755 and 756 are coupled to latches 757a and 757b, each of said latches formed by one half of a single twenty pin latch circuit, and to the address pins of count memories 758 and 759. Count memories 758 and 759 are utilized, in conjunction with four bit binary counters 760 and 761, to disable transparent latches 755 and 756 for a selected period of time. Disabling circuitry is necessary to avoid various problems present during data shifting. Those skilled in the art will appreciate that a Q code, as previously defined, loses its identity if shifted one bit. Therefore, if four Q codes are detected in logic array 753, it will be necessary to disable latch 755 until sixteen bits have been clocked through, to determine if additional Q codes are present. To this end, the output of latch 755 will address a value in count memory 758. Counter 760 will disable latch 755 and continue to do so until the selected count in count memory 758 is achieved.

Similarly the output of latch 756 will be utilized to address a value in count memory 759 and counter 761 will disable latch 756 to allow the identified data to be shifted out of logic array 754. A slight difference in operation is utilized if logic array 754 contains data which indicates a series of black cells in the scan. In this case, the latch will be disabled until the last three black cells in the previous group have been shifted to the first three positions in logic array 754. At this point, the data will be examined to determine whether or not the last three black cells comprise the beginning of a Q code. This operation repeats until the last black cell is shifted out.

Multivibrators 762 and 763 are utilized to enable latches 757a and 757b. Each time a particular redundancy has been finally coded and output by the data compression system, latches 757a and 757b are enabled to latch in the outputs of latches 755 and 756.

Referring now to FIG. 7o, two other possible states of scan data may be determined. First, in the event that the stream of data examined by the data compression system is not wholly black or white, or comprised of a group of consecutive Q codes, it is still possible that redundancy exists in that data. The most easily detected redundancy will exist when the data from the current scan, while varying in no discernible pattern, may entirely duplicate the data from a previous scan. One such example may be an intricate but repetitive border or edge design on a check or other document.

Such cases are identified using logic array 764. Logic array 764 can simultaneously examine eight bits of current data and eight bits of previous data to determine whether or not the data is duplicative. In a manner similar to that explained above with respect to black or white data, the output of logic array 764 is coupled to transparent latch 765. The output of transparent latch 765 is coupled to count memory 766 and is utilized to address a value which is coupled to four bit binary counter 767.

Binary counter 767 is utilized to disable latch 765 while data is being shifted through logic array 764. In the disclosed embodiment, as a matter of design choice, if the data changes from one code to another and the duplicate code was available at the beginning of the current code, the code will be changed to a duplicate code if the data being duplicated also changes and duplicates for at least five additional bits.

If the duplication of previous data does not duplicate for at least five additional bits of scan data, then the data compression system will code out the old code and change to the new code and begin to encode the new values of scan data.

After a previous redundancy has been identified, coded and output from the data compression system of the present invention, latch 768 is enabled, latching in the next type of redundancy to be coded.

Multivibrators 770 and 771 are utilized to latch in the duplicate data mode throughout the data compression system of the present invention and to continue the duplicate data mode beyond a change in state of data if the duplication continues for at least five additional bits of scan data.

As a last resort, if a series of Q codes, black cells, white cells or duplications are not present, the data compression system of the present invention will store actual data, without compression. To overcome such a determination (referred to herein as "mapping" or a "map" function) a minimal amount of redundancy is required before the data compression system will begin encoding data. As a matter of design choice, the disclosed embodiments will cease mapping and begin to encode data if at least eleven black or white cells are detected, at least three consecutive Q codes are detected, or any combination of codes which exceeds eleven bits. Logic array 769 is the mapping termination logic array and is utilized to examine the scan data for the previously enumerated situations which will overcome the mapping function.

Figure 8A:
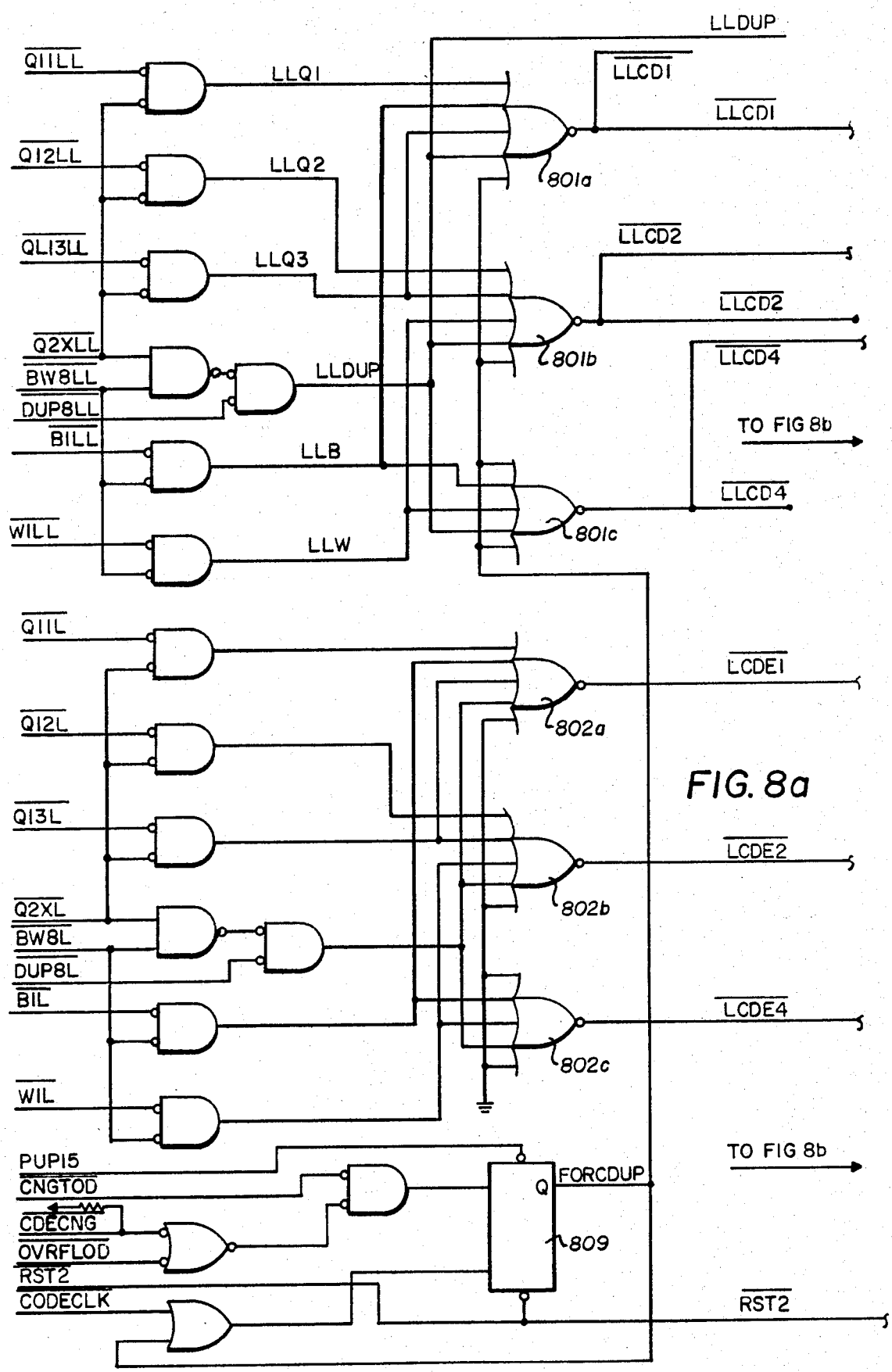
Figure 8B:
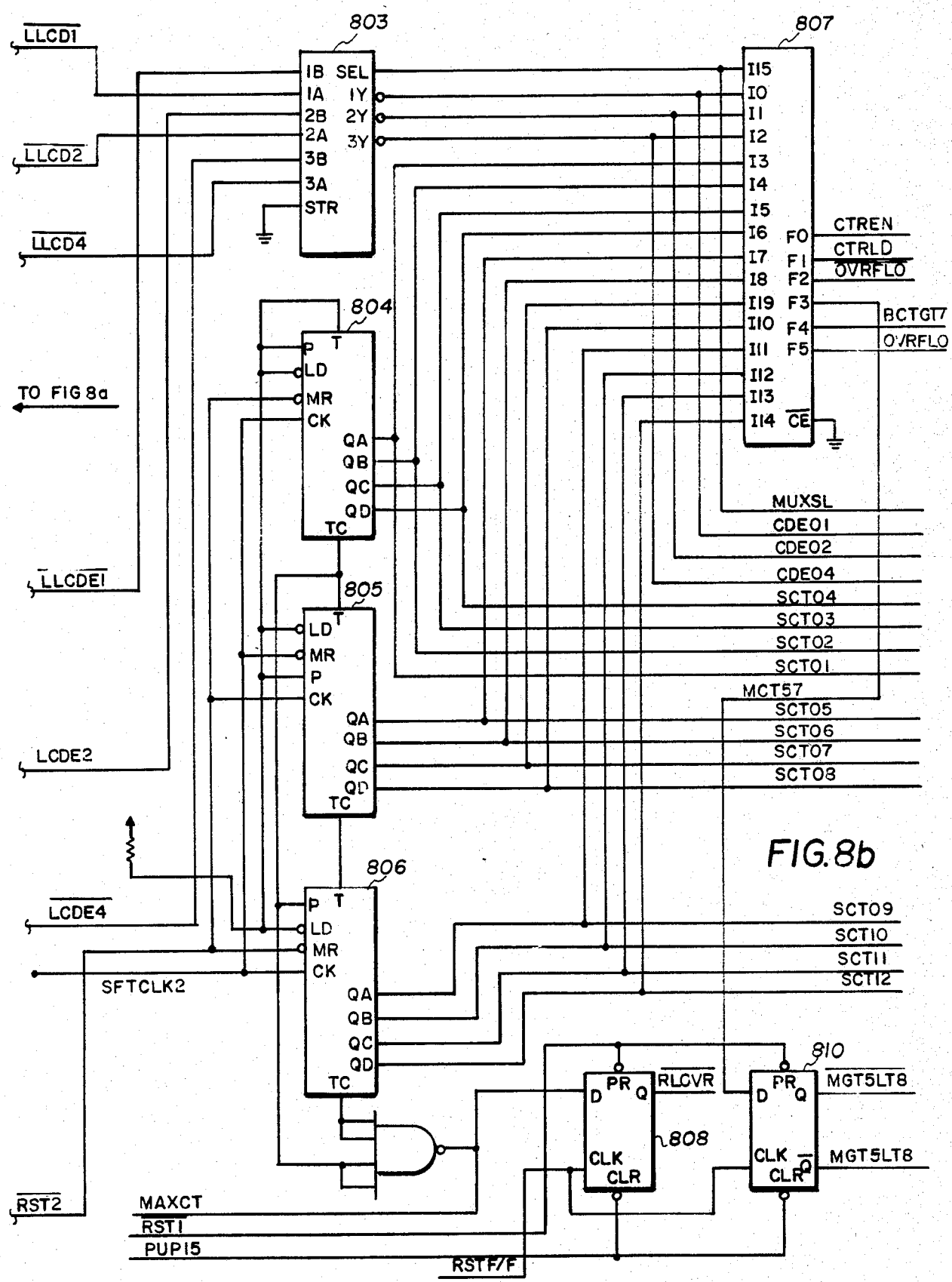

Referring now to FIGS. 8a and 8b, which when joined in the manner indicated in the figures, form a schematic diagram of the count and code out circuitry of the data compression system of the present invention.

Logic gates 801a, 801b and 801c are utilized in conjunction with the logic gates associated therewith, to encode the output of latches 757a and 757b of FIG. 7m, and couple that data to quad two input multiplex 803. It should be recalled that the data in registers 757a and 757b represent the code currently being utilized in the data compression system.

Similarly, logic gates 802a, 802b and 802c are utilized, in conjunction with the logic gates associated therewith, to encode the outputs of latches 755 and 756 of FIG. 7m. Latches 755 and 756 are the transparent latches utilized to hold the data which represents the next data to be utilized in the data compression system.

Thus, when a section of data is output by the system, the next data to be coded out is switched through multiplex 803.

Those skilled in the art will appreciate that in addition to the type of redundancy being removed from the data stream, it will be necessary to include the length of the redundancy in order to allow eventual reconstruction of the redundancy. To this end, counters 804, 805 and 806 form a twelve bit binary counter. The counter thus formed provides inputs to the field programmable logic array 807 which controls the coded count counters. Again, as a matter of design choice, the data compression system of the present invention includes certain maximum data counts in each type of redundancy (see Table I). The selection of a particular maximum count is based upon requirements of the code selected and the physical liklihood that certain redundancies occur with greater length than other redundancies. The longest count acceptable in the disclosed embodiment of the present invention is 4096 bits in either the white cell mode or the duplicate mode. Each of the other modes has a lower maximum count, as indicated in Table I.

When the counter formed by four bit counters 804, 805 and 806 reaches the maximum count of 4095, rollover multivibrator 808 is set on the next clock, and the output of multivibrator 808 is utilized to ensure various actions.

The lower maximum counts available for black cell mode or Q code mode make it advisable from a data compression viewpoint, to operate in duplicate mode or white cell mode if possible. Multivibrator 809 is utilized, to force the data compression system into the duplicate mode, if a code length overflow condition is reached by counters 804, 805 and 806 in other than the white cell mode (white cell mode maximum count being equal to duplicate mode maximum count), and the duplicate mode is set. The forced duplicate mode will also occur if a code change occurs (black to white, for example) and the duplicate mode could have been utilized. Multivibrator 810 is utilized, for similar purposes, to keep track of the cell count in a mapping mode of operation. If a map count occurs which is greater than five cells and less than eight, and the duplicate mode could have been utilized at the beginning of the count, the duplicate mode will be forced, rather than allow a map code.

Figure 8C:
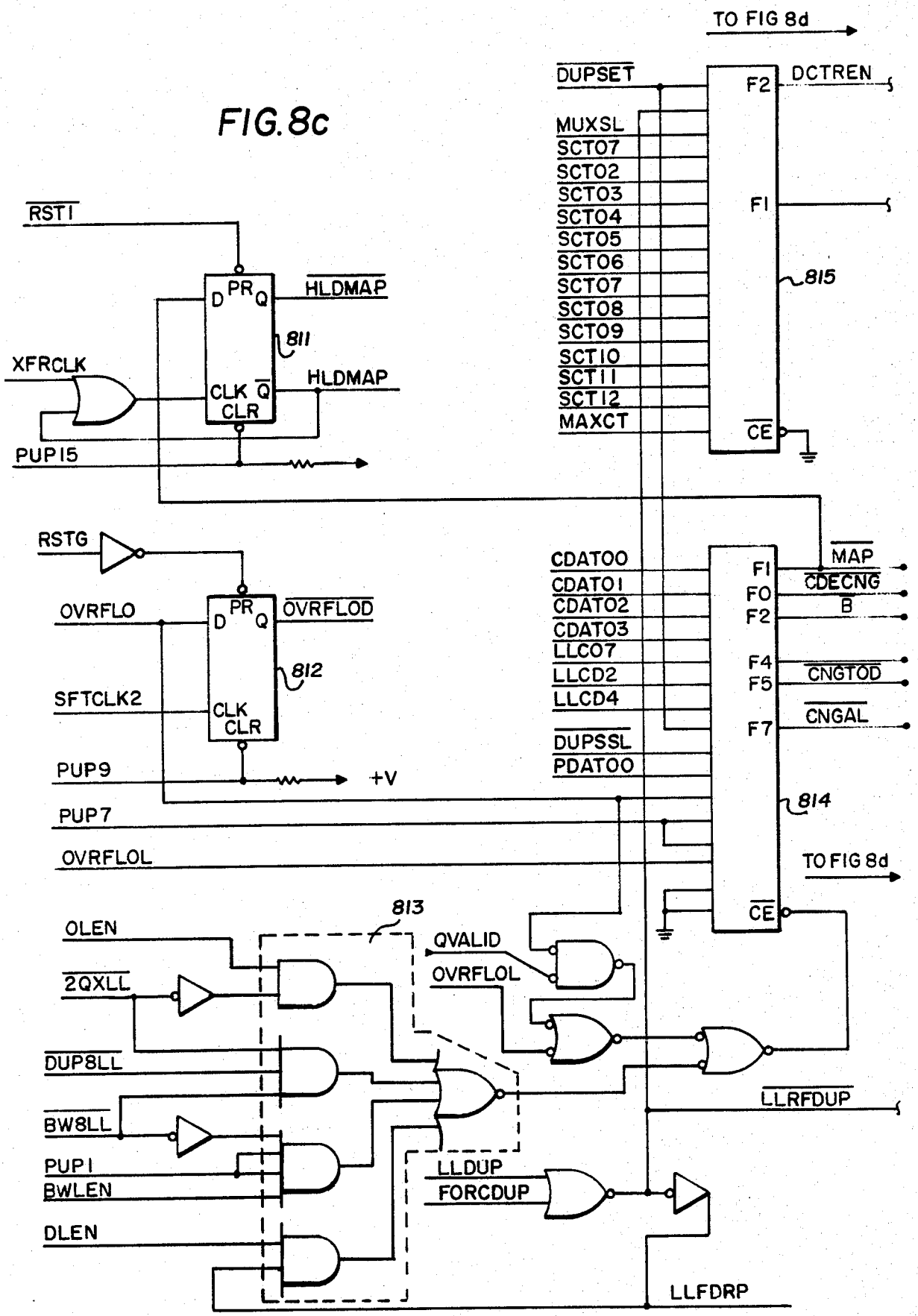
Figure 8D:
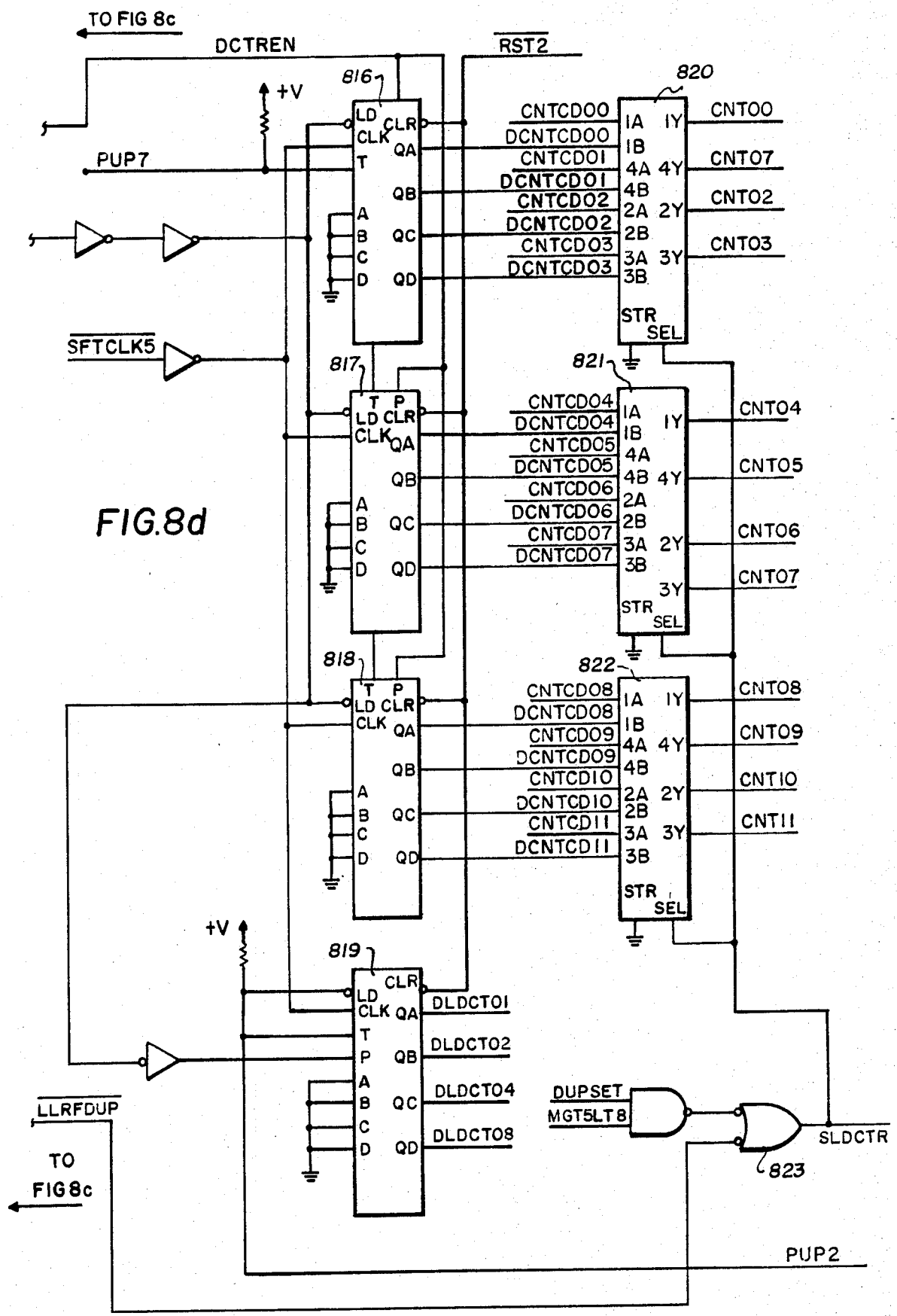

Referring now to the figure formed by joining FIGS. 8c and 8d in the manner indicated, there is depicted a schematic diagram of additional circuitry including the duplicate mode circuitry of the data compression system of the present invention.

Multivibrator 811 is the circuit element utilized to keep the data compression system in the mapping mode of operation, until one of the aforementioned special map termination conditions occurs. Multivibrator 812 is the circuit element utilized to enable a change to duplicate code when the maximum data count occurs for a redundancy type other than white cell (white cell maximum count being equal to duplicate cell maximum count).

The group of logic gates labeled 813, and the inputs associated therewith, are utilized to enable logic array 814 after a sufficient time period has elapsed to allow the previously identified data to be clocked through. The output of logic gates 813 is then utilized to enable logic array 814, the decision logic array. Logic array 814 is utilized to determine whether or not the code present should be coded out.

Logic array 815 is utilized to control four bit counters 816, 817 and 818, which are utilized to generate the coded count of the section of data. Counter 819 is the duplicate mode load counter and is utilized to count the number of times the duplicate counter has been loaded.

Quad multiplexers 820, 821 and 822 are utilized to output the duplicate mode cell coded count or the coded count of the number of cells in a black or white cell count, a Q code count or a mapping count, as selected by logic gate 823.

Figure 8E:
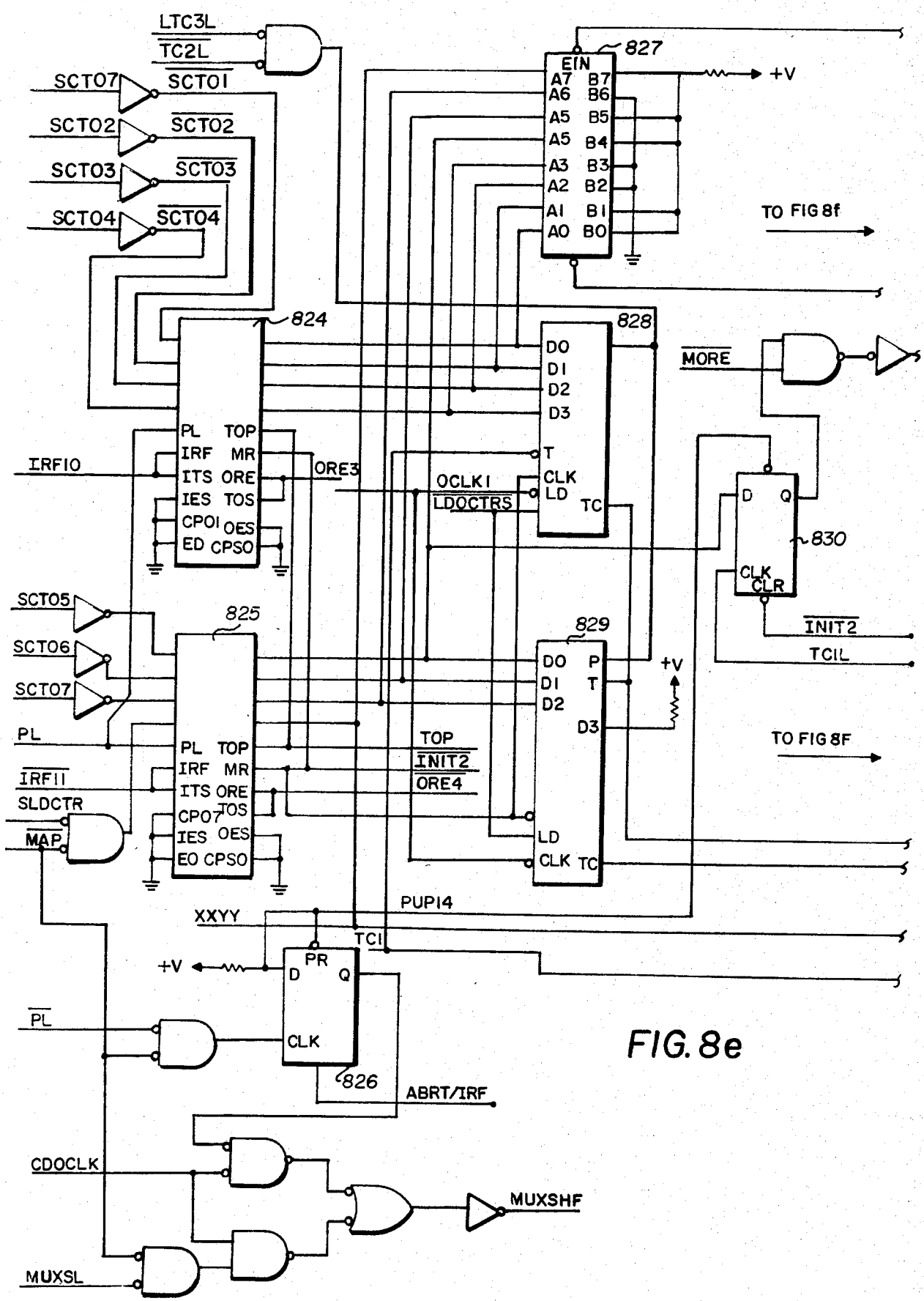

With reference now to the figure formed by joining FIGS. 8e and 8f in the manner indicated, there is depicted buffers 824 and 825. Buffers 824 and 825 are first in-first out (FIFO) buffers that are utilized to control the cell count during a mapping function, to determine how many cells are utilized during a particular mapping function.

Multivibrator 826 is utilized to provide additional bits to fill up a four bit word in the FIFO data buffers in order to permit transfer of the cells stored therein. Output control counters 828 and 829 are four bit counters which are utilized to count the number of cells output from the buffers during the mapping mode of operation. Comparator 827 checks the output of buffers 824 and 825 against a reference signal to determine if the maximum map count was coded. Comparator 827 is then utilized to prevent multivibrators 831 and 832 from flushing out the remaining data stored in the map data buffer, if the mapping function has been coded out due to a maximum count. If the mapping function has been terminated due to other than a maximum count (a forced duplicate mode, or a code change) multivibrators 831 and 832 are utilized to flush out a single four bit byte in the data buffer to indicate the end of a mapping function data stream.

Logic gates 833 and multiple multivibrator 834 are utilized to generate and latch out a terminal count at the end of transmitted data. This artificial count is referred to as a terminal count and is utilized to allow completion of the compression of the final bits of data.

Figure 8G:
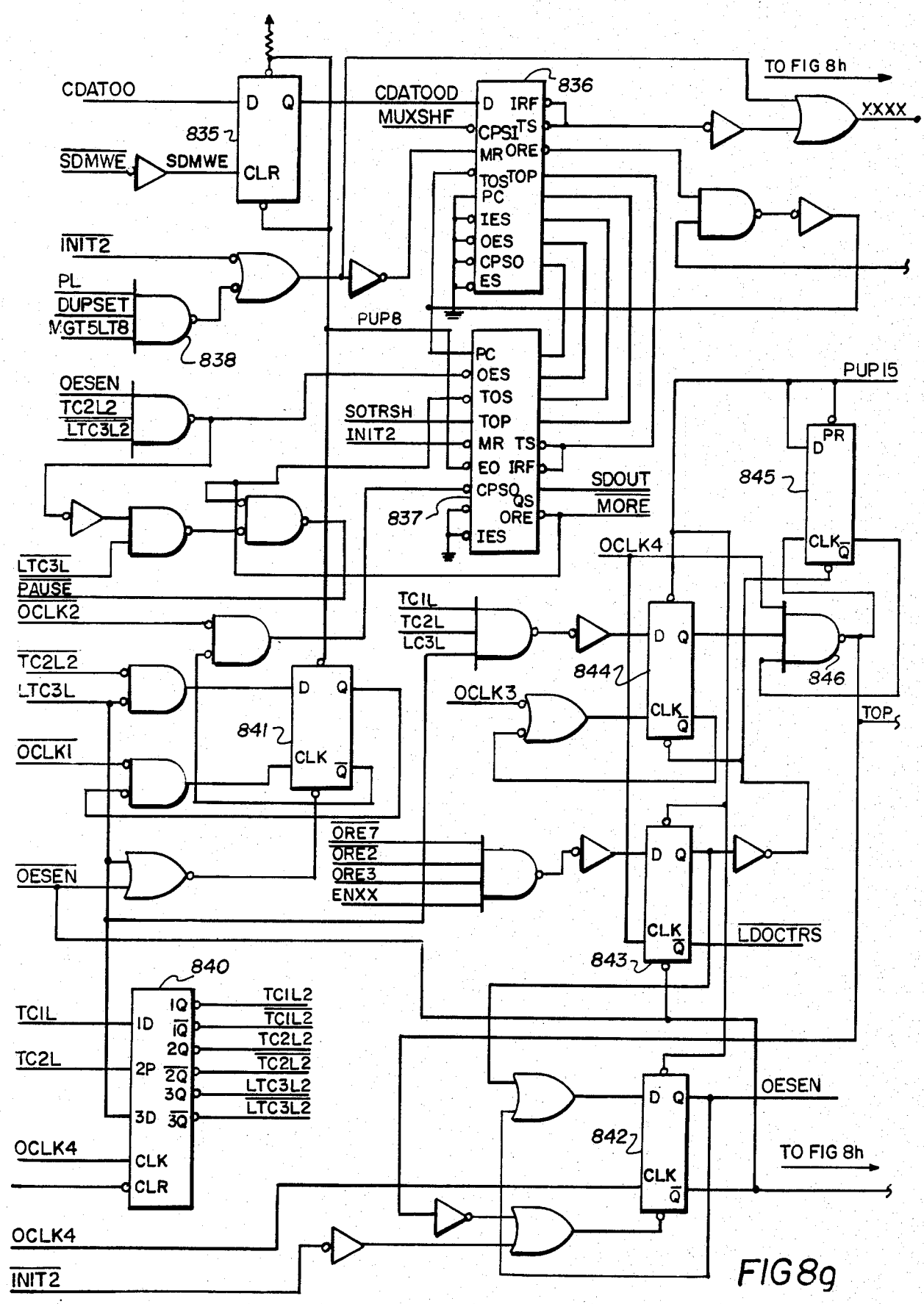
Figure 8H:
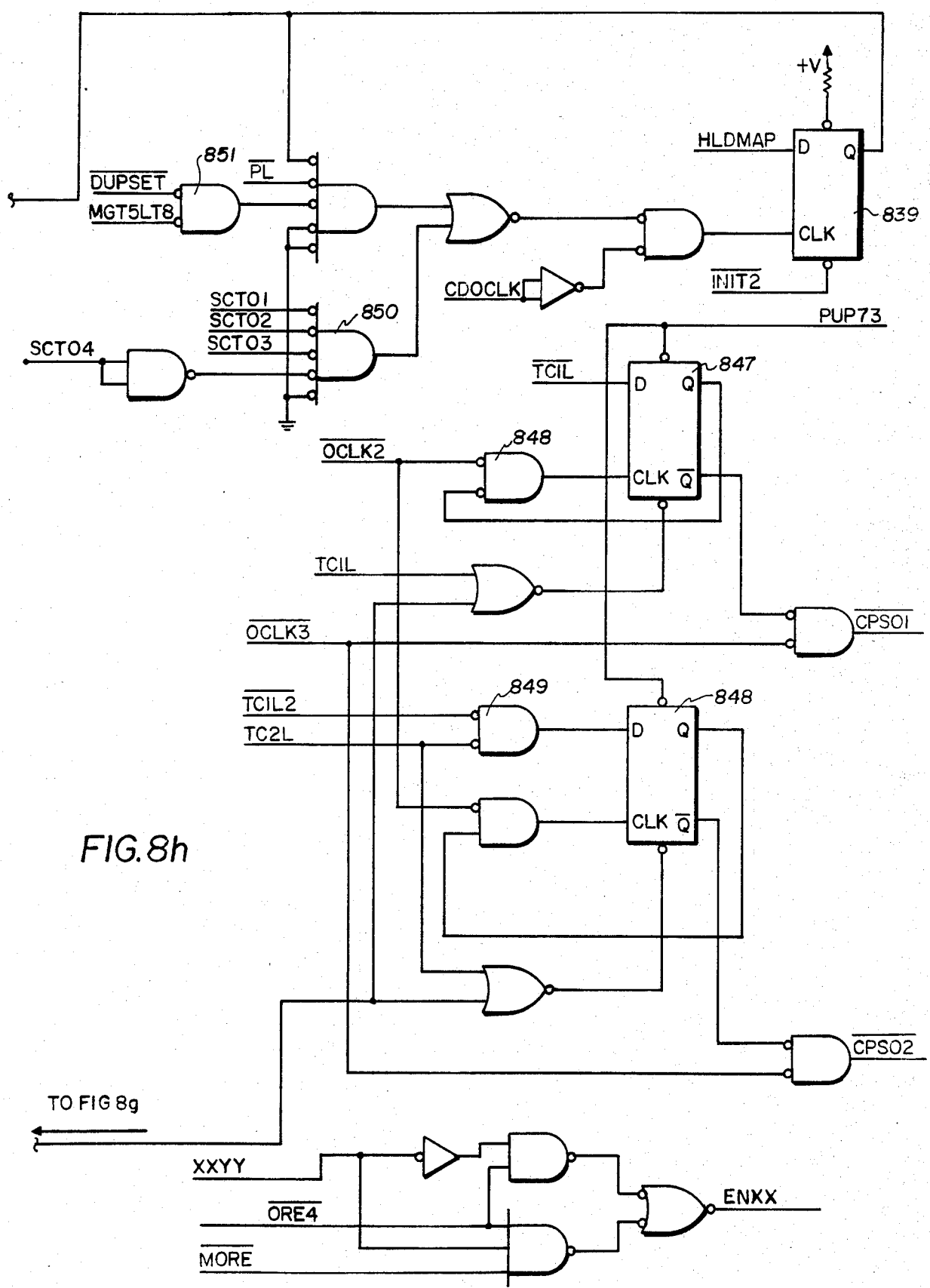

Referring now to FIGS. 8g and 8h, when joined in the manner indicated in the figures, there is detected multivibrator 835, which is utilized to delay the data entering buffer 836. Buffer 836 is a four by sixteen bit FIFO buffer that is utilized to temporarily store data during a mapping function. Recalling that a mapping cell count of greater than five cells and less than eight cells may result in a forced duplicate mode, if duplication is possible, it should be apparent to those skilled in the art that at least eight cells in a mapping function mode must be examined before a map code is possible. Thus, buffer 836 is utilized to provide temporary storage until such a decision is made. Logic gate 838 is utilized to reset buffer 836 if a forced duplicate mode occurs.

In the event that eight mapping function mode cells are encountered, and the forced duplicate mode is not utilized, multivibrator 839 is utilized to dump the data from buffer 836 into four by sixty-four buffer 837. Buffer 837 is utilized as a first in-first out buffer which stores the data utilized during a map mode of operation. Multivibrator 839 will also cause the data in buffer 836 to dump into buffer 837 if the data terminates prior to eight bits and is coded out as a map code.

Quad multivibrator 840 is utilized in conjunction with multivibrator 834 (see FIG. 8f) to provide additional delayed terminal count signals in the manner explained above. Multivibrator 841 is the serial out clock enable circuit and is utilized to enable the output of buffer 837 when it is desired to output the map data.

Multivibrator 842 is the master serial output enable latch which enables the various code, count and map buffer outputs. Multivibrator 843 is the load output counter latch which is utilized to detect the fact that data is present at the various counter control buffers, such as buffers 824 and 825 (see FIG. 8e) and to load the counters. Multivibrator 844 is the transfer out parallel latch which is utilized to detect the terminal count signals which indicate that each counter has reached the end of the count desired. After all terminal counts are detected, the data in storage is transferred out in parallel, and latch 843 is then utilized to latch in new counter control data. Multivibrator 845 is utilized to disable the output of multivibrator 844, at logic gate 846, after the data has been transferred out, to ensure that only one set of data is transferred out.

Multivibrator 847 is utilized to generate the serial output clock to the code buffer and multivibrator 848 is utilized to generate the serial output clock to the count buffer. These two multivibrators are then responsible for serially outputting both the specific code and the count of cells within that code.

Figure 8I:
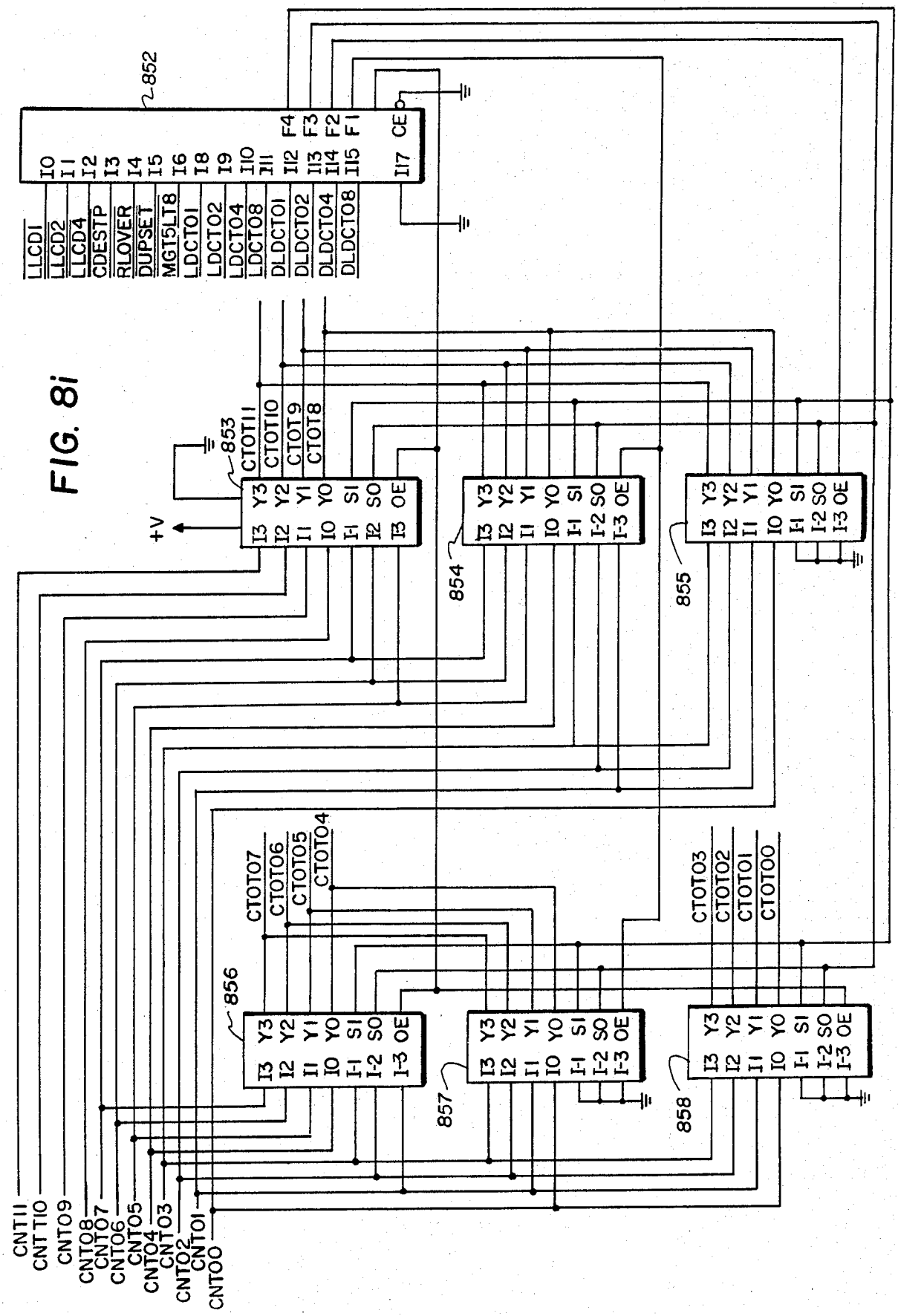

With reference now to FIG. 8i, there is depicted a schematic representation of the count bit shifter circuitry of the present invention. Referring again to Table I, it can be seen that the number of bits in a particular count may vary from a maximum of eleven bits to a minimum of two bits. In order to accurately keep track of the count in a particular code, it is necessary to keep track of the most significant bit of the count. The least significant bit of the count is fixed and relatively easy to obtain, however, the most significant bit must be ascertained.

Logic array 852 is utilized to determine how many bits are present in a particular code. The inputs to logic array 852 include the particular code encountered and the number of times the count has been loaded. Utilizing this input data, logic array 852 is coupled to bit shifters 853–858, to control the position of the most significant bit of the count.

Bit shifters 853–858 are four bit shifters with three state outputs that shift each four bit word from zero to three places. Thus, under the control of logic array 852, it is possible to shift the most significant bit of the count to a desired position. In the preferred embodiment, the most significant bit of the output count is shifted into the first bit to be serially output.

Figure 8J:
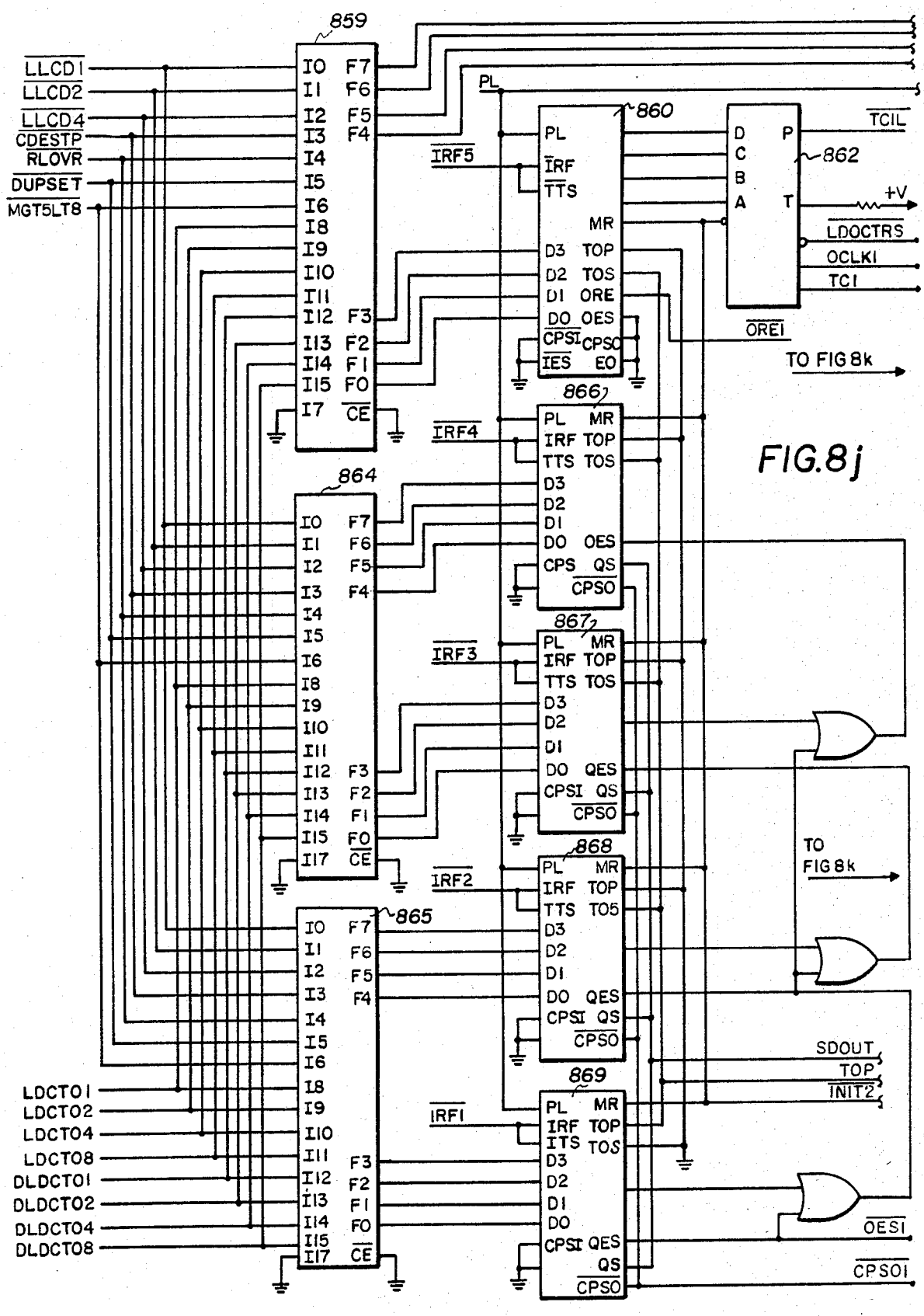
Figure 8K:
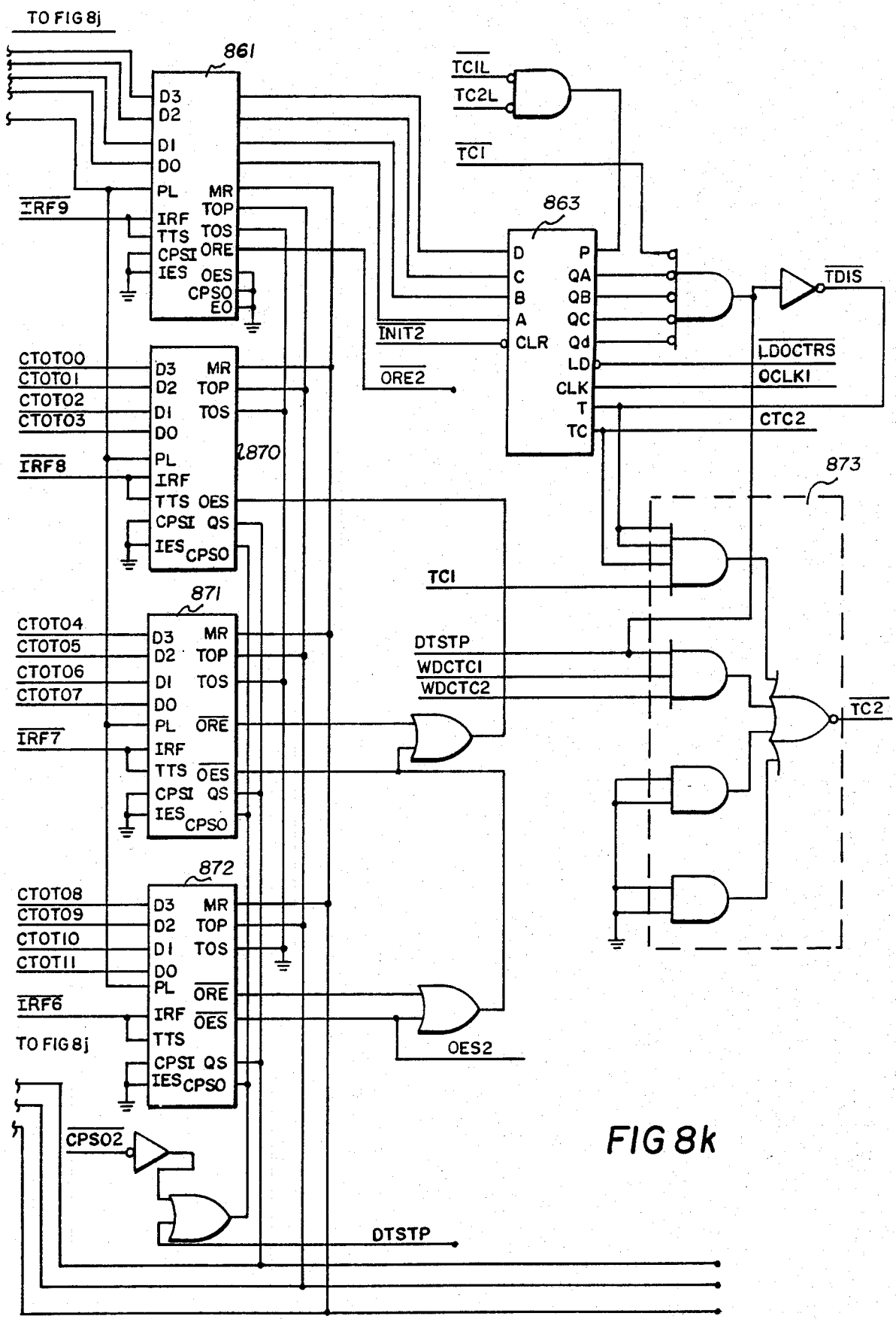
Figure 81:
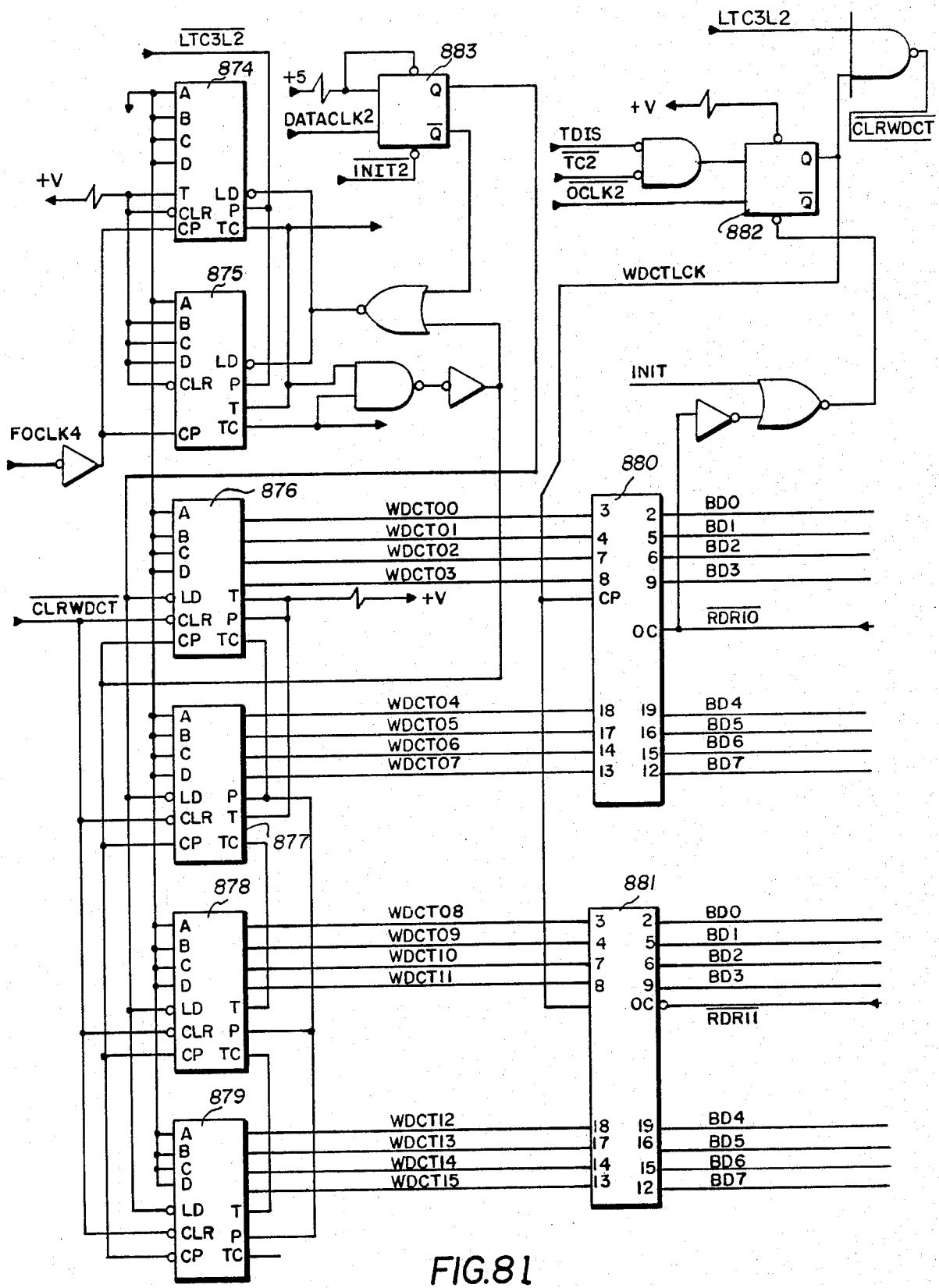

Referring now to FIGS. 8j and 8k, when joined in the manner indicated in the figures form a schematic diagram of a section of the output circuitry of the data compression system of the present invention. Logic array 859 generates the control information for the code and count logic arrays. The outputs of logic array 859 are coupled to four by sixteen bit buffers 860 and 861. The data thus stored in buffers 860 and 861 is utilized to control four bit counters 862 and 863 respectively. Counters 862 and 863 are utilized to generate selected terminal count signals.

Logic arrays 864 and 865 are also coupled to the code and load count signals and are utilized to generate the actual code to be serially output (see Table I). The actual code is loaded into buffers 866–869 for serial outputting. Buffers 866–869 are all four by sixteen bit first in-first out buffer memories. Buffers 866–869 give the system the capability of utilizing up to sixteen bits of code; however, in the disclosed embodiment not all bits are utilized.

Buffers 870–872 are the count buffers. The count data output from bit shifters 853–858 (FIG. 8i) is coupled to buffers 870–872 to be serially output from the system. As above, buffers 870–872 are four by sixteen bit first in-first out buffer memories. Logic gates 873 are utilized, in conjunction with certain outputs of counter 863 to generate an additional terminal count signal.

Referring now to FIG. 8l, there is depicted a schematic representation of the section of the data compression system that is utilized to determine the size of the document image. Four bit counters 874 and 875 are utilized to divide the coded output of the data compression system by thirty-two. Each time counters 874 and 875 reach thirty-two, the total in four bit counters 876–879 is incremented. Thus, the data in counters 876–879 represents how many thirty-two bit words are present in each image.

The outputs of counters 876–879 are coupled to registers 880 and 881 where the control device may access the data. Multivibrator 882 is utilized to store the count at the end of an image. Multivibrator 882 is reset when its contents are read. Multivibrator 883 is utilized to initialize the counters by forcing the counters to a load condition until receipt of a first data clock.

Figure 8M:
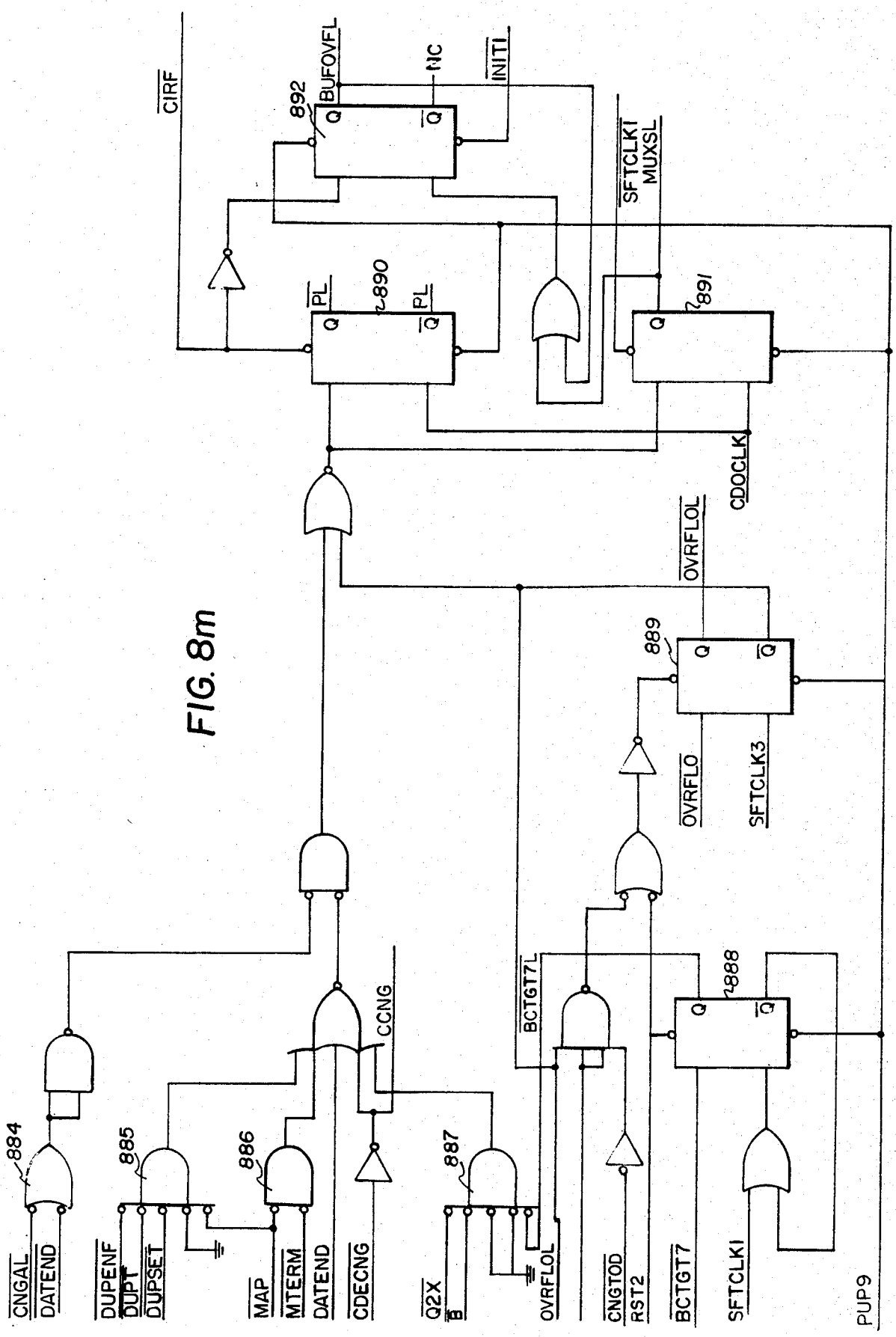

Referring now to FIG. 8m, there is depicted a schematic representation of the logic circuitry which allows a coded representation to be output from the data compression system. Logic gate 884 will allow a code out whenever a code change is allowed (CNGAL) or the end of data has been reached. Logic gate 885 will allow a code out during a map function if the code is changed to a duplicate mode.

Logic gate 886 will allow a code out if one of these special map mode termination sequences is encountered, as previously discussed. Logic gate 887 is the logic gate which allows black cell codes to be terminated early to begin Q code mode of operation, as discussed herein. In conjunction with logic gate 887, multivibrator 888 is utilized to ensure that greater than seven black cells have been detected prior to allowing an early termination of black cell mode of operation to code Q codes.

Multivibrator 889 is utilized to detect the overflow condition which will result when the bit counters exceed the maximum count for a particular mode of operation. In such event, the code in question is output and the system begins counting anew.

Each of the previously discussed code out signals are applied to multivibrator 890, which is utilized to generate the parallel load signal which is utilized to load out the current code and count. Multivibrator 891 is triggered along with multivibrator 890 and is utilized to select certain multiplexers which allow a look ahead function for the various logic arrays. Multivibrator 892 is utilized to generate a buffer overflow error signal if the data compression system of the present invention attempts to load additional data into the output buffers while these buffers are full.

Figure 8N:
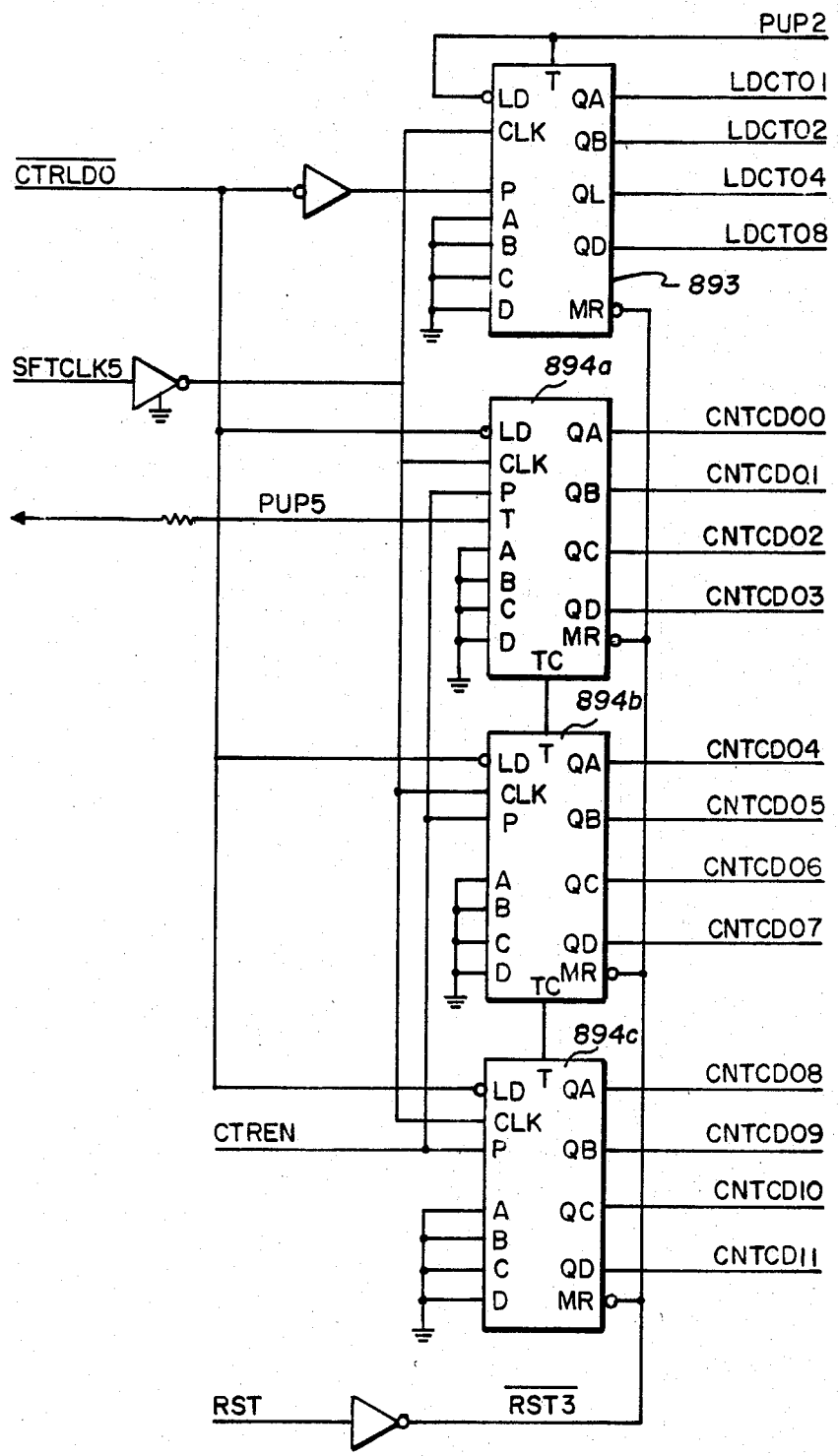
Figure 80:
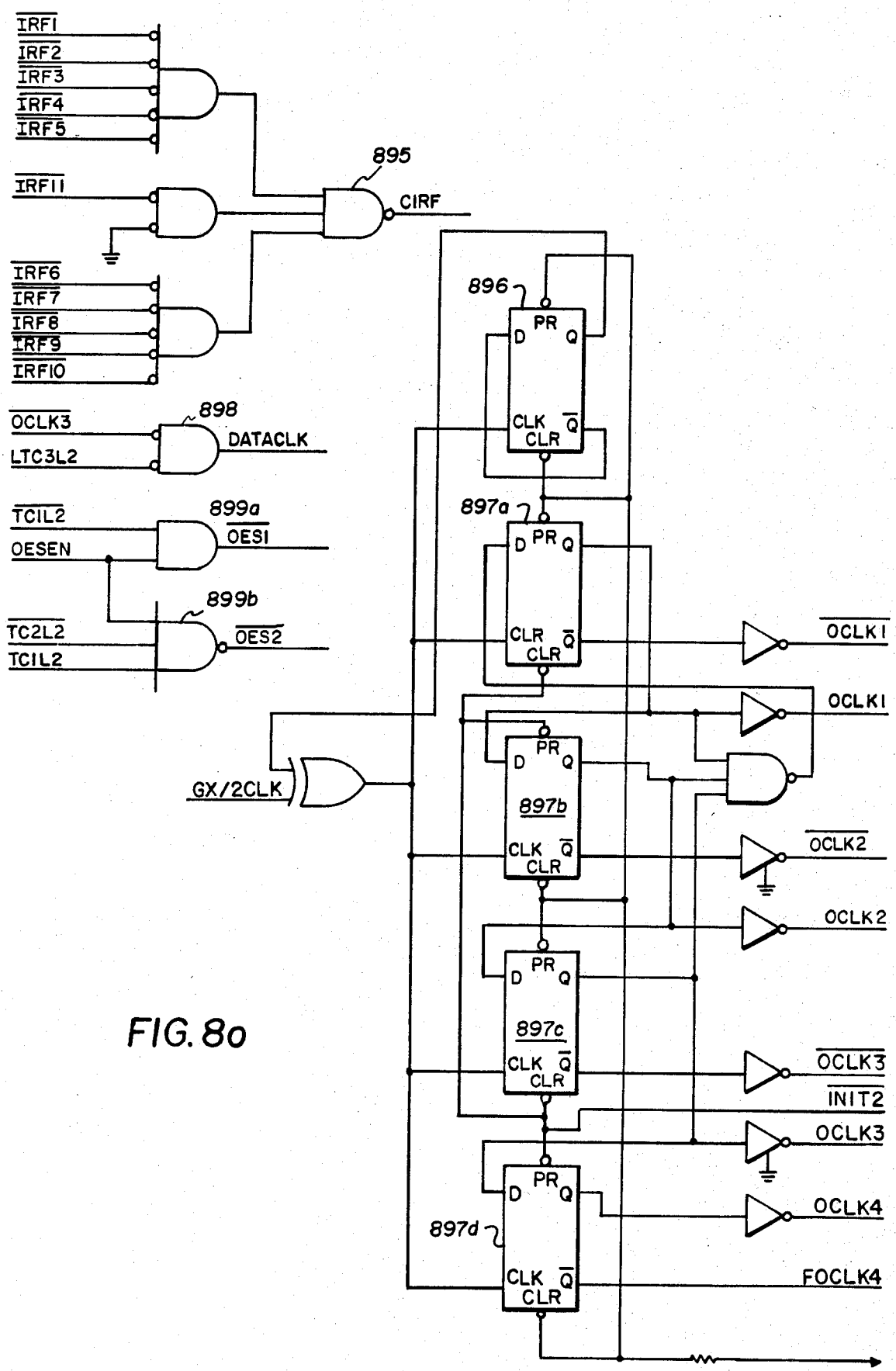

Referring now to FIG. 8n, there is depicted the coded counters for the data compression system of the present invention. Counter 893 is the load counter which is utilized to determine how many times counters 894a–894c have been loaded. Counters 894a–894c are utilized to generate the coded count of the number of cells in a current black, white, Q code or mapping mode of operation. Referring finally to FIG. 8o, logic gate 895 and the logic gates associated therewith are utilized to generate an internal register full signal in the event that any one of the first in-first out buffers is full. The internal register full signal is utilized to generate an error signal if additional data is loaded into a full register.

Multivibrators 896 and 897a-897d are utilized to generate a four phase clock signal for utilization in the operation of the data compression system. Multivibrator 896 is utilized to double the GX/2 clock from multivibrators 702 and 733 (FIG. 7a) from 15.25 megahertz back up to 30.5 megahertz. In turn, multivibrators 897a-897d are then utilized to divide the 30.5 megahertz clock down into a four phase clock in a manner well known in the art.

MICROFILM SYSTEM

The document processor of the present invention incorporates a microfilm recorder 238 (See FIG. 2) which allows selective microfilming of documents during the same pass in which several other processing functions occur. Thus, a particular document may be read, encoded, endorsed, image captured, sorted and filmed during a single pass through the document processor.

The microfilm system utilized within the present invention is based upon the SMR-200B Scannermate microfilm recorder, manufactured by the Terminal Data Corporation of Woodland Hills, Calif. It will be appreciated by those ordinarily skilled in the art that other microfilm recorders will find use in the present system, as a matter of design choice.

Microfilm recorder 238 films both sides of a document, at a speed of up to one hundred inches per second. The film motion is synchronized with the document transport and a document detector, stopping between documents so that interimage spacing is independent of other processing, thereby ensuring maximum film usage and format continuity.

Microfilm recorder 238, in a preferred embodiment, also records a program controlled sequence number and an image count mark (commonly known as a "blip") above each recorded image. Approximately 14,000 documents may be microfilmed on one hundred feet of 16 mm. film, assuming an average document length of seven inches. The sequence numbers and image count marks allow rapid addressing and accessing of individual documents. The microfilmed copies of the documents being processed may provide either a backup system for the digital image system, or may be utilized as hard copy archival storage for the documents in question.

DATA EXPANSION SYSTEM

Figure 9A:
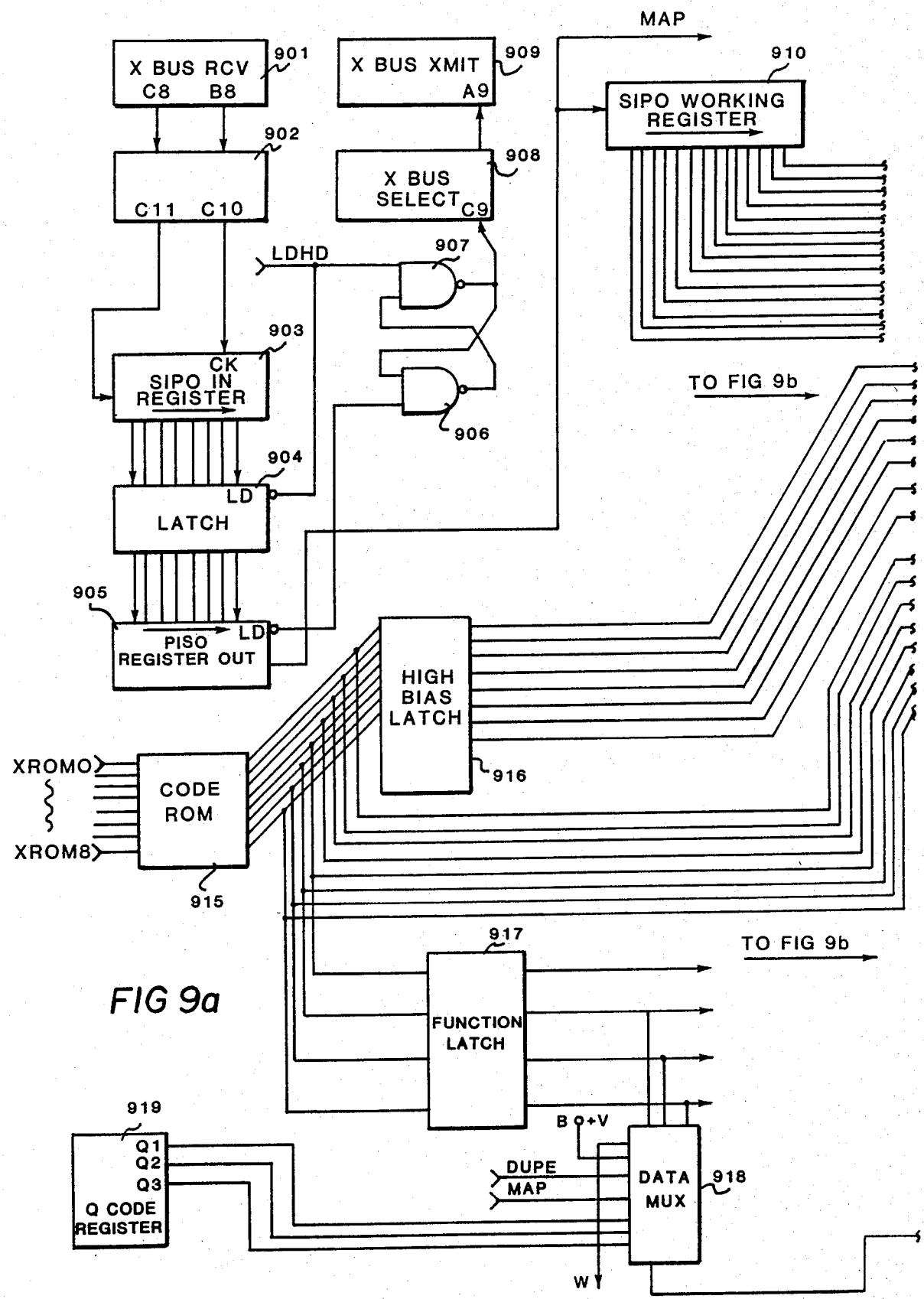
FIGS. 9a–9b depict a block diagram of the major components of the data expansion system of the document processor of the present invention.
Figure 9B:
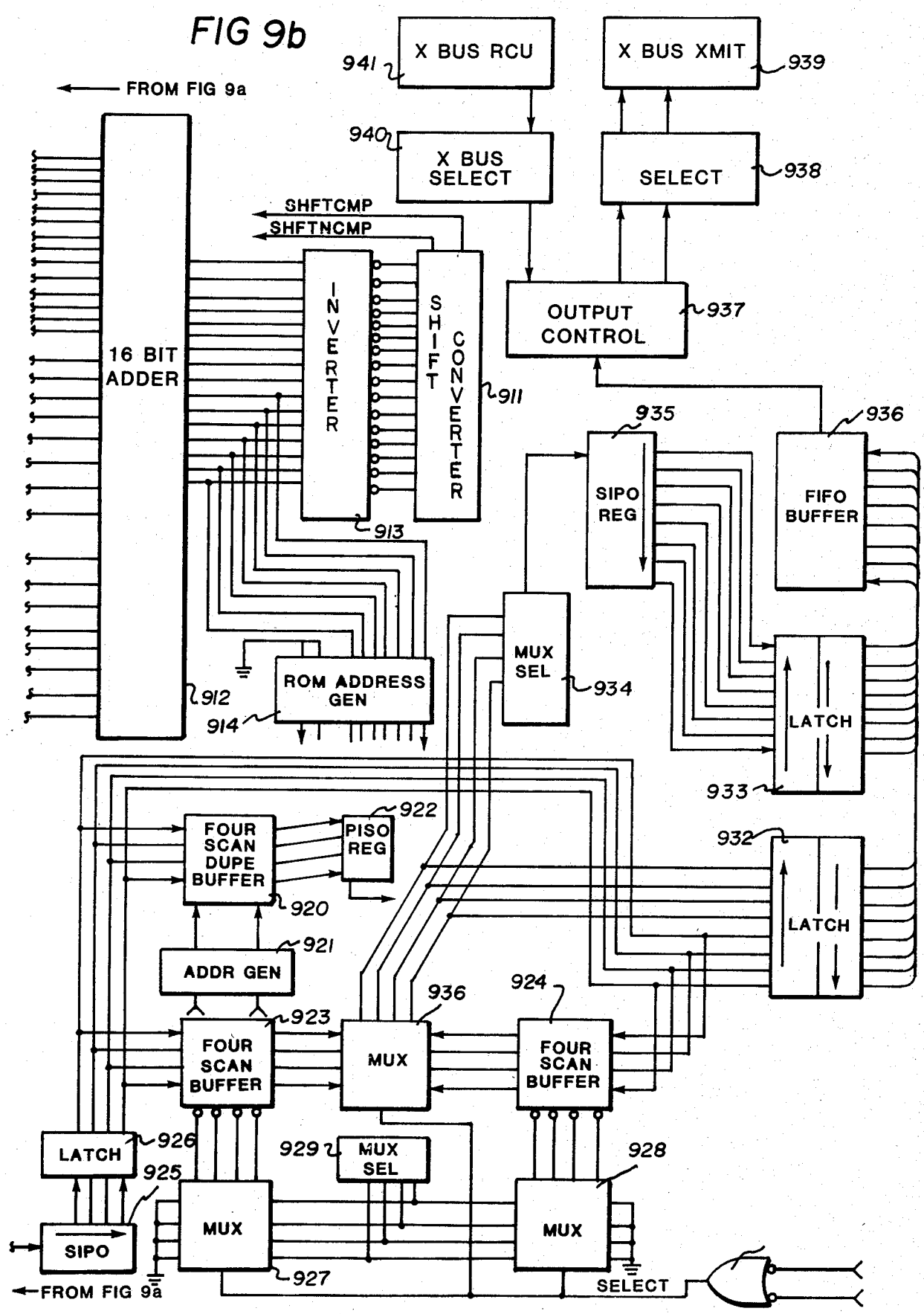

Referring now to FIGS. 9a and 9b, and the joint figure formed thereby, there is depicted a block diagram of the major components of the data expansion system of the present invention.

X bus receiver 901 is utilized to receive data from the specific X bus channel selected by X bus select 902. The data thus received is coupled to serial in-parallel out register 903, and then latched into latch 904 and parallel in-serial out register 905. The additional latch and register circuitry is required to allow the receipt of up to eight more bits of data after the input register of the data expansion system is full. Logic gates 906 and 907 are coupled to latch 904 and register 905 and are utilized in conjunction with X bus select 908 and X bus transmitter 909 to stop data flow during periods when the aforementioned latch and register are full.

The data in register 905 is coupled to a sixteen bit, serial in-parallel out working register 910. The number of bits shifted into register 910 is controlled by shift counter 911. Shift counter 911 operates based upon the content of sixteen bit adder 912. The initial count in sixteen bit adder 912 is applied to ROM address generator 914 which is utilized to address data within code ROM 915.

Code ROM 915 outputs additional data which is applied to sixteen bit adder 912. The new content of sixteen bit adder 912 is utilized to control shift counter 911, and thus control the number of bits shifted into working register 910.

Examining the contents of Table I, it can be seen that in the disclosed embodiment, the minimum number of bits in a code is three. Therefore, it should be apparent to those skilled in the art, that if adder 912 is empty, that condition should cause ROM generator 914 to select a code within code ROM 915 that will cause three bits to be shifted into register 910.

As the contents of adder 912 are recognized as an identifiable code, code ROM 915 will generate data which will allow the correct number of bits to be clocked into register 910, and provide the bias necessary for the correct count. By way of example, when the system recognizes the 1110111 code, code ROM 915 will provide data to adder 912 to allow eleven additional bits of data to enter register 910. (see Table I, White Cell Mode) As eleven bits of count are coupled to adder 912, a bias of 1024 is coupled into adder 912 to be summed with the eleven bit number. The bias value may be coupled directly to adder 912, or, should the value be higher than eight bits, by means of high bias latch 916.

Code ROM 915 also generates a function code based upon the translation of the code initially entered into adder 912. The function code is applied to function latch 917, where it is applied to data multiplex 918. Data multiplex 918 is utilized to select a voltage potential (black cells in this embodiment), a ground potential (white cells) a duplicate function pin, a mapping function pin, or Q code register 919. Q code register 919 is a recirculating register which contains each of the three Q codes previously discussed, and may be accessed repeatedly to provide a stream of repetitive Q codes.

During a mapping function, no data compression was possible and the actual data has been stored. When data multiplex 918 selects the mapping function pin, data multiplex 918 is coupled to the input of register 910, and receives actual data received from the X bus. During a duplicate function data multiplex 918 is coupled to the output of duplicate buffer 920, the operation of which will be explained below.

The output of data multiplex 918, representing expanded image data, is coupled through serial in-parallel out latch 925 and 926 onto a four bit wide data bus. The image data is then coupled simultaneously to four scan buffers 923 and 924, and four scan dupe buffer 920. Up to eight complete scans of data are selectively stored in buffers 923 and 924, as sequenced by the operation of multiplexes 927 and 928. Four scan dupe buffer 920 stores the most current four previous scans of data and thus permits duplication. The output of buffer 920 is coupled back to data multiplex 918 by means of register 922.

The data contained in buffers 923 and 924 may now be selectively accessed by multiplex 930 to provide at least two formats of data. The data stored in buffers 923 and 924 may be output in the "scan" mode, that is, in the manner in which the data was captured by the digital scanning circuitry. This method of data output is obtained by accessing buffer 923 and reading out an entire scan, then incrementing the scan number.

In other applications, it is more advantageous to output image data in the "ladder" mode. In the ladder mode, data is obtained from the first address in each scan and the scan number is then incremented. After the first cell or address has been read out of each of the four scans in buffer 923, buffer 924 is accessed in a similar manner. Thus, the ladder mode provides eight bits of data, each bit from a different scan of the digital scanning circuitry. The next eight bits provided are from the next address in each scan. The process of restoring eight scans of data, at one cell per scan resembles the structure of a ladder, and therefore is described as the "ladder" mode.

As a final variation and possible image data manipulation, latches 932 and 933 may be utilized to reverse the order of each byte of eight bits. This technique may be utilized to provide mirror imaging. In systems which utilized two digital cameras to capture the image of each side of a document, one side will invariably be mirrored from the other. Latches 932 and 933 are utilized to correct the situation when restoring the mirrored image.

The data out of latches 932 and 933 is coupled through buffer 936 to output control circuitry 937. Output control circuitry 937 is utilized to select an appropriate X bus channel and transmit the data. Output control circuitry 937 is also utilized to control the receipt of signals from the X bus to indicate the availability of a particular channel.

VIDEO TERMINAL SUBSYSTEM

Figure 10:
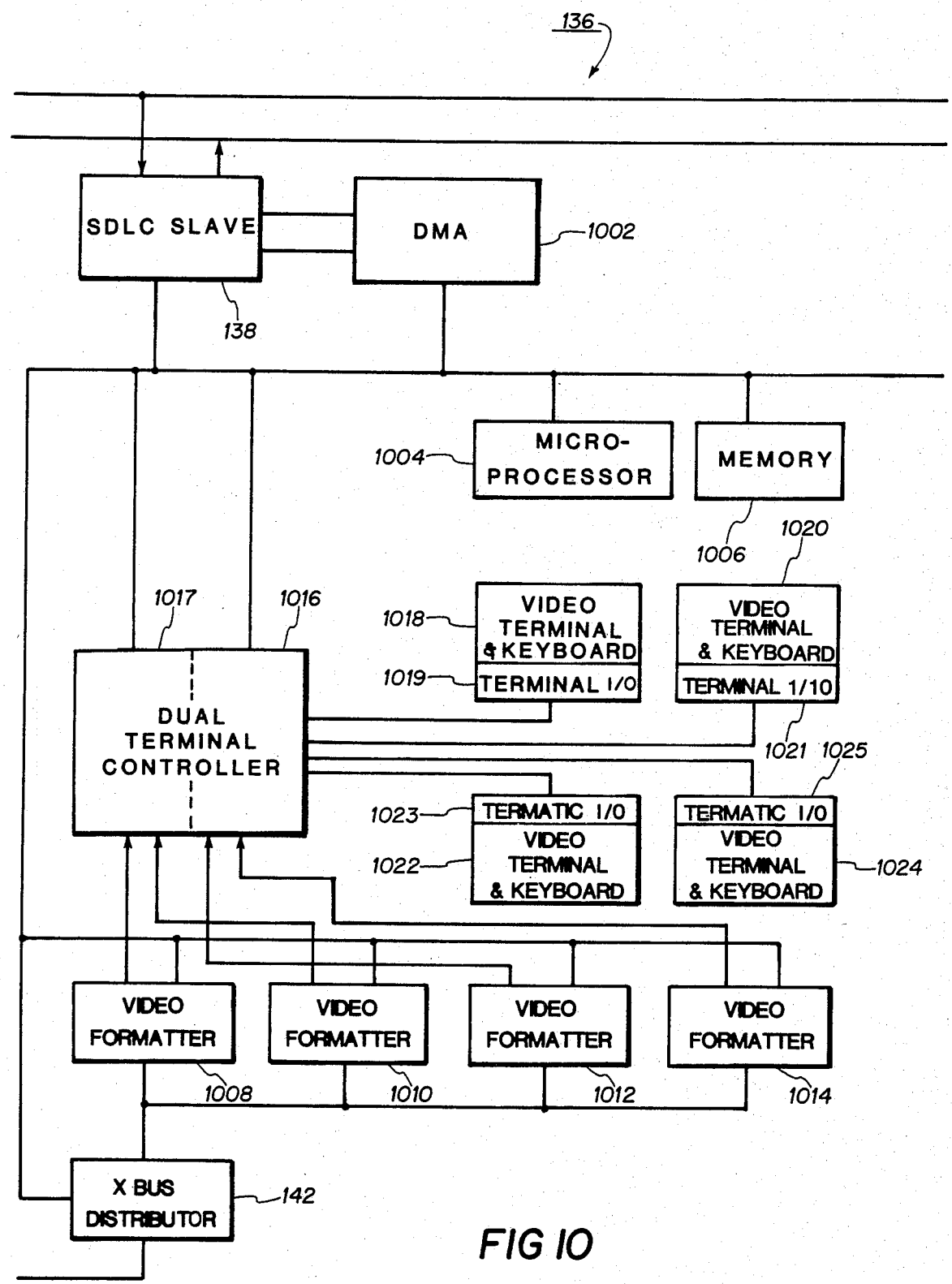
FIG. 10 depicts a detailed block diagram of the video terminal subsystem of the document processor of the present invention.

Referring now to FIG. 10, there is depicted a more detailed block diagram of video terminal subsystem 136 (see FIG. 1*b*). Video terminal subsystem 136 is utilized, in the document processing system of the present invention, to provide video images of selected documents along with alphanumeric information. Video terminal subsystem 136 provides the selected video images by means of digital image data captured by the digital camera, in one embodiment, and is utilized to allow processing of data present on documents which is not in machine readable format. For example, video images may be utilized to examine signatures, to compare two signatures or to examine handwritten amount fields on documents such as checks. Video terminal subsystem 136 will also find broad application in other areas wherein it is desired to present a video image generated by digital data, with or without the additional of alphanumeric characters. Digital facsimile transmission, digital document storage and word processing are a few of the many uses such a system may find.

Video image data is transferred to video terminal subsystem 136 by means of X bus distributor 142. Control or program information is transferred to video terminal subsystem 136 via synchronous data link control slave 138 and is mapped by way of direct memory access 1002 into microprocessor 1004 and memory 1006. In a preferred embodiment of the present invention, microprocessor 1004 is a high level device capable of addressing external memory 1006 for program instructions.

The video image data transferred via X bus distributor 142 is coupled to an appropriate video formatter. In the embodiment disclosed, up to four video formatters are utilized with each video terminal subsystem; however, additional subsystems may be utilized and/or the number of terminal controllers may be modified as a matter of design choice. Each video formatter contains a substantial amount of memory and is capable of storing sufficient digital data to support an entire image for the appropriate video terminal. The detailed description of the circuitry and capability of the video formatters will be explained in greater depth with reference to FIGS. 11*a*–11*o* and 12*a*–12*o*. Video formatters 1008, 1010, 1012 and 1014 each correspond to a single video terminal, namely, video terminals 1018, 1020, 1022 and 1024.

Each video terminal is coupled to an appropriate video formatter and keyboard by means of dual terminal controller I/O devices 1016 and 1017 and terminal I/O devices 1019, 1021, 1023 and 1025. Dual terminal controller I/O devices 1016 and 1017 each differentially drive video to two terminals and provide differential receivers and serial to parallel conversion for inputs from two keyboards. Terminal I/O devices 1019, 1021, 1023 and 1025 each receive differentially driven video for one terminal and provide parallel to serial conversion and differential drive for data from one terminal keyboard to the appropriate dual terminal controller I/O port.

VIDEO FORMATTER

With reference now to FIGS. 11*a*–11*o* and 12*a*–12*q*, there is depicted a schematic diagram of the circuit components of the video formatter of the present invention. The video formatter of the present invention is utilized to provide image data and control to the video terminals of video terminal subsystem 136 and image data to the laser printer of laser printer subsystem 124. In alternate embodiments, the video formatter of the present invention will find wide application in various areas wherein images are required to be stored or manipulated in digital format. Applications such as digital facsimile transmission/reception and word processing equipment are but a few of the many applications such a device will find.

Figure 11A:
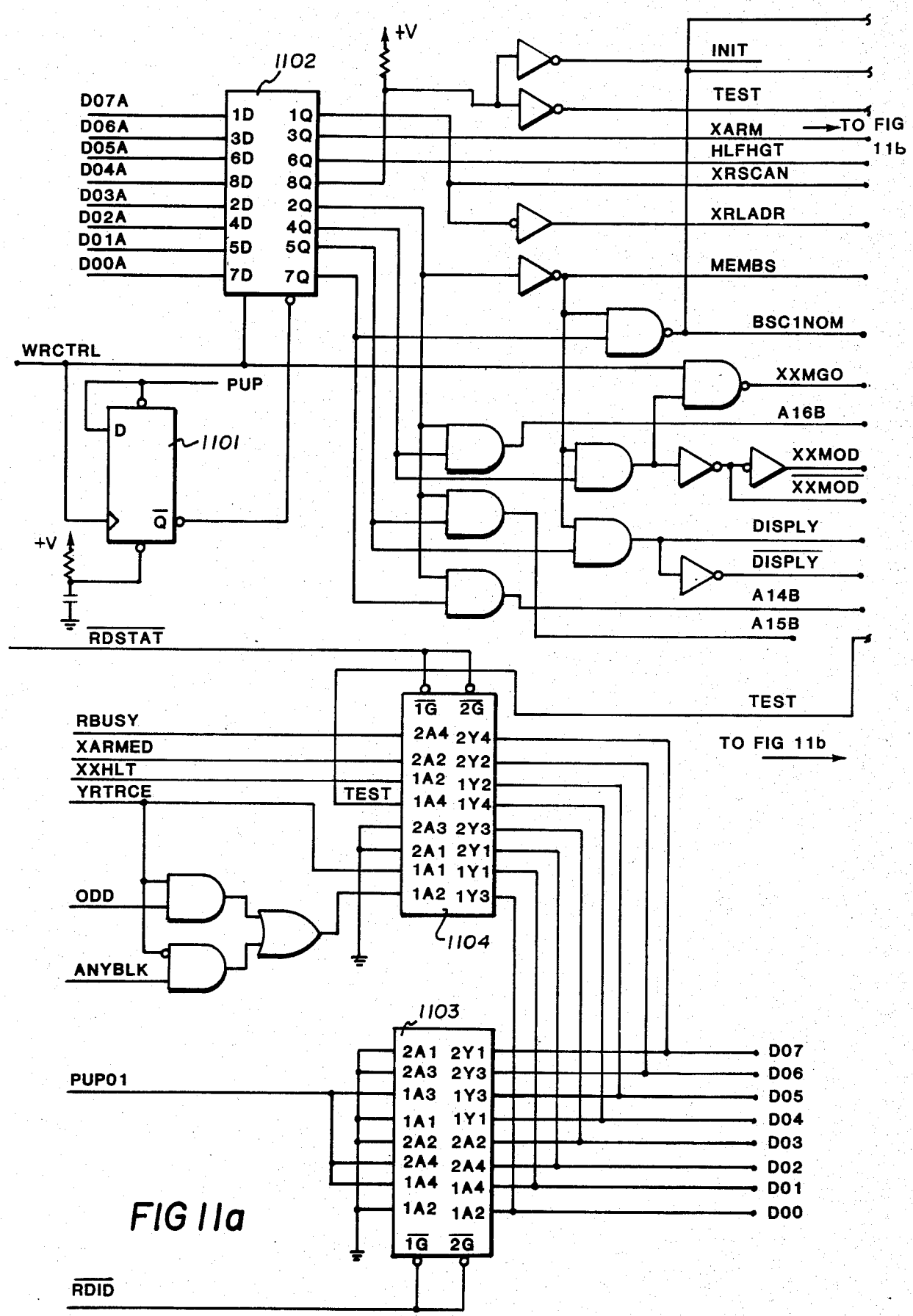
FIGS. 11a–11o and FIGS. 12a–12q depict a schematic view of the video formatter of the document processor of the present invention.
Figure 11B:
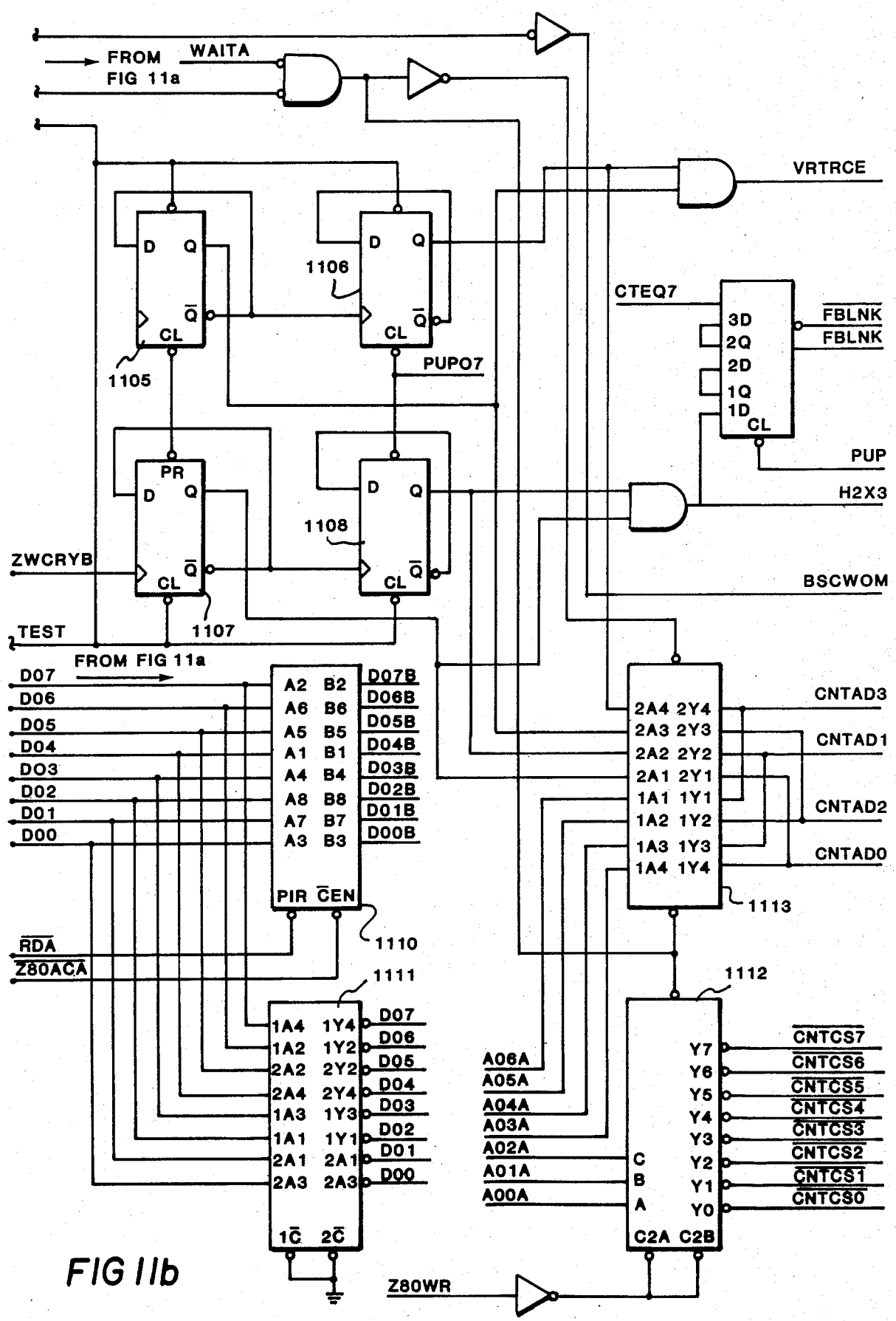

Referring now particularly to FIG. 11*a* and 11*b*, which, when joined in the manner indicated in the figures, depict a schematic diagram of the device control registers and memory address generation circuitry of the video formatter of the present invention. Multivibrator 1101 is utilized to provide a power up master clear signal to initialize the video formatter. Control register 1102 is utilized to receive control signals from an appropriately programmed external control device. The outputs of control register 1102 are coupled to the logic gates associated therewith and are utilized to generate various internal control signals. The control signals thus generated are utilized throughout the system to ready the bus, select a bank of internal memory for access by the control device, determine in what sequence data will be transferred and to generate an interlace synchronized signal for image display.

Buffer 1103 is the device identification buffer and is utilized by the external control device to determine what type of device is coupled to the bus. Similarly, buffer 1104 is utilized by the control device to test the status of the video formatter during and before operation.

In the discussion of the video subsystem it was stated that the video formatter could subdivide the display into up to nine separate display zones. Multivibrators 1105 through 1108 are utilized to address these zones. Multivibrators 1105 and 1106 form the band counter, which is utilized to determine a horizontal band across the display. Multivibrators 1107 and 1108 form the zone counters which are utilized to determine the address of the section within a particular band. Those skilled in the art will recognize that by utilizing two bit binary numbers to characterize both the band and zone address the system will have the capability of defining up to sixteen separate zones. Indeed, although only nine zones are visible in the disclosed embodiment, the remaining seven zones are utilized for horizontal and vertical retrace. In alternate embodiments, utilizing laser printers or other non-display devices, all sixteen zones may be utilized to provide visible image.

Quad multivibrator 1109 is utilized simply to provide a shift delay in order to coordinate with a video attribute circuit which will be discussed below.

Octal transceiver 1110 is utilized to couple data to and from the internal memory bus and inverter buffer 1111 acts as a bus receiver to the internal control memory of the video formatter.

One of eight decoder 1112 is utilized to select a particular integrated circuit memory chip in the internal control memory and buffer 1113 is utilized to couple the appropriate memory address to the selected integrated circuit control memory chip.

Figure 11C:
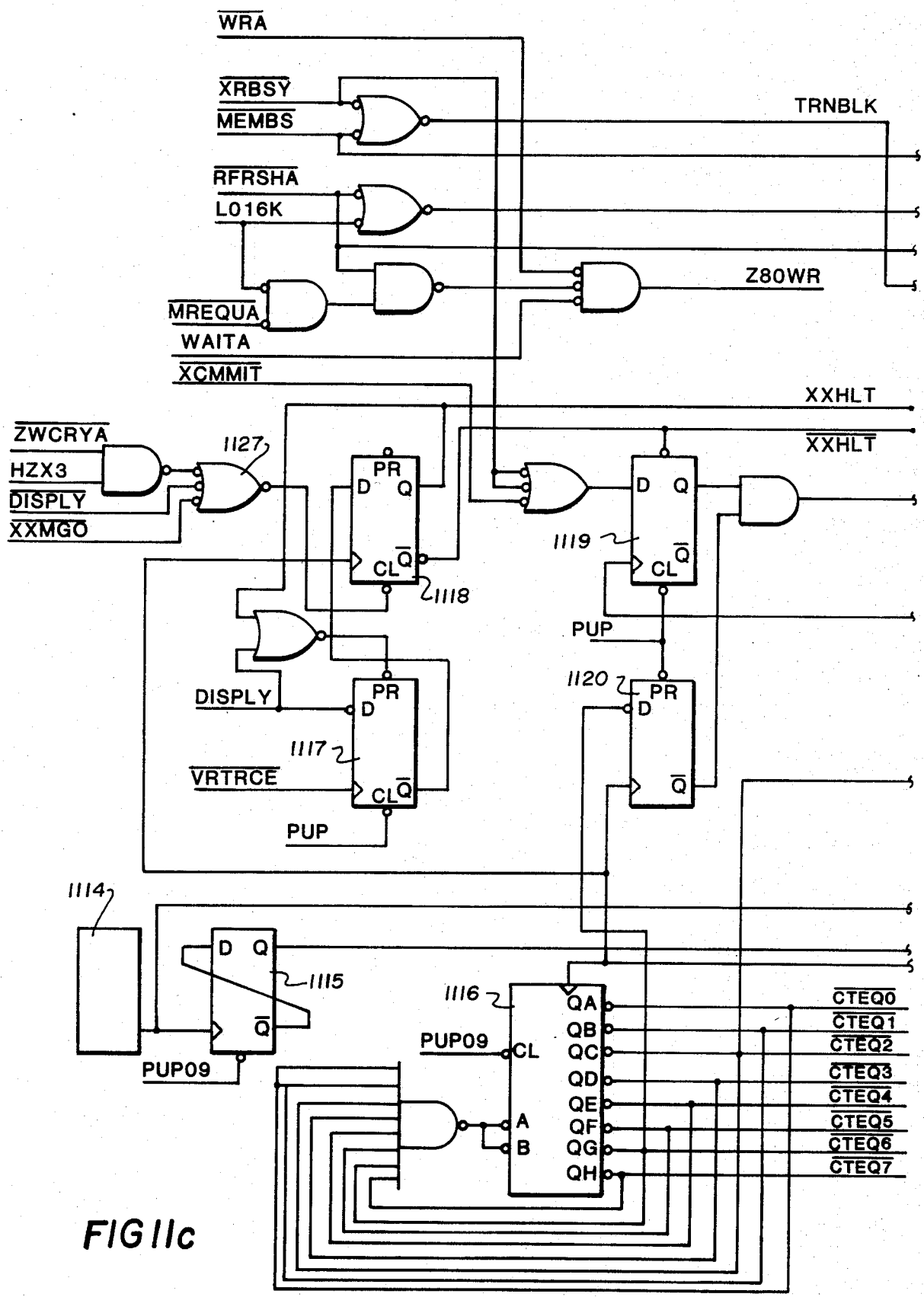
Figure 11D:
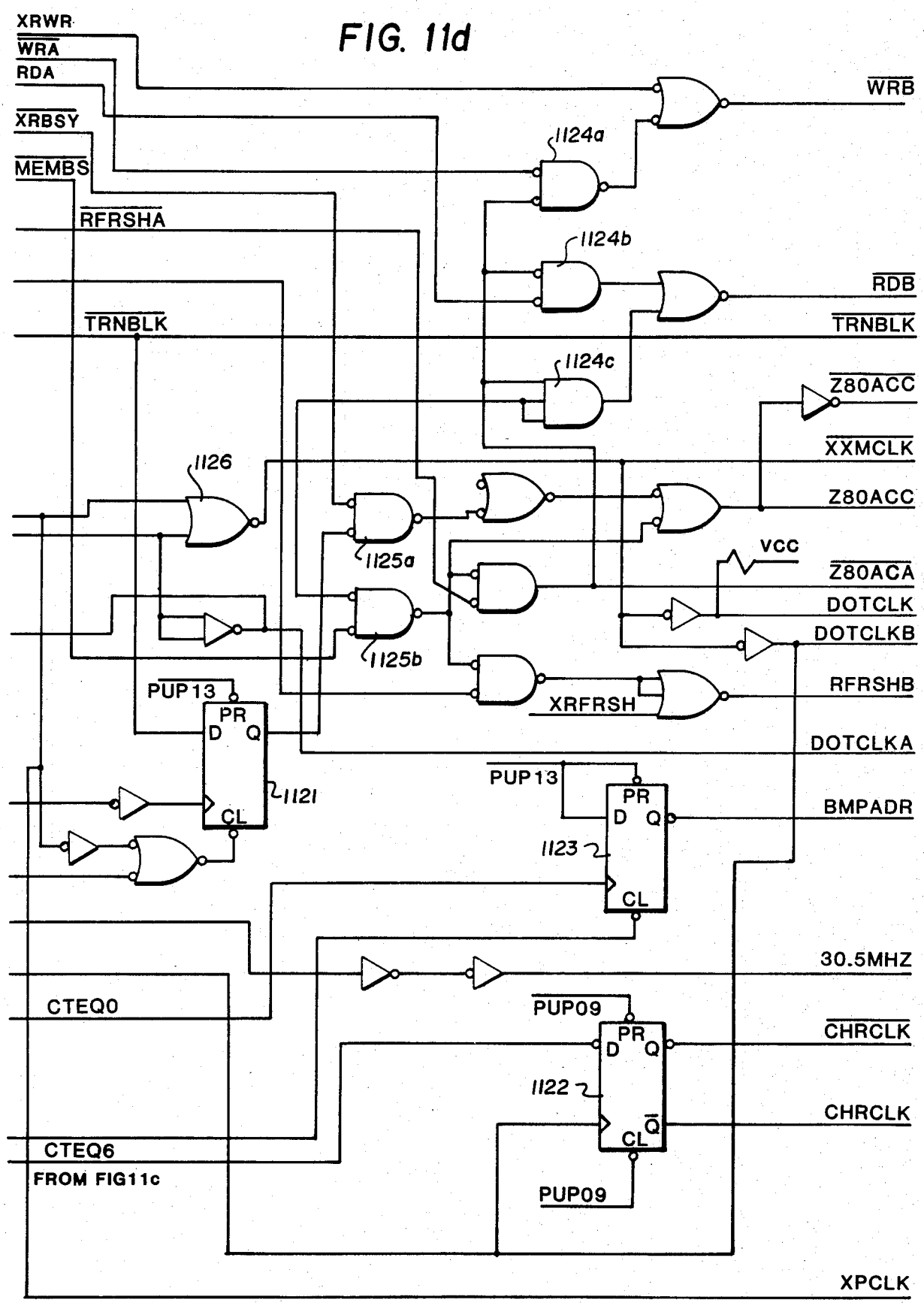

Referring now to the joint figure formed by FIGS. 11c and 11d there is depicted a schematic representation of the main timing circuitry and display memory timing circuitry of the video formatter of the present invention.

The main timing signal is generated by crystal oscillator 1114 which provides an extremely stable 30.5 megahertz clock signal. The main clock signal is then divided by two utilizing multivibrator 1115. Serial in-parallel out register 1116 is utilized to provide the individual bit timing signal. Register 1116 is operated in the manner of a counter, propagating a pulse through the register.

The video formatter of the present invention may be utilized to supply formatted video to a display terminal or other device such as a laser printer. In those applications in which it is desired to supply video to a remote device, it will be necessary to provide the image data over a bus, such as the aforementioned X bus. In such applications, it is imperative that the data transmission begin at a known point, such as the upper left corner of the image in the disclosed embodiment. To that end, multivibrators 1117 and 1118 are utilized to ensure data transmission begins at the appropriate point. Multivibrator 1117 is utilized to enable the transmit pause as the appropriate portion of the data approaches. Multivibrator 1118 is then utilized to establish the synchronization of data transmission at that point.

Similarly, multivibrators 1119 and 1120 are utilized to temporarily pause during transmission of image data if the image memory must be refreshed or the device receiving the image data is not ready to receive additional data. Multivibrator 1119 is utilized to enable the clock pause which will eventually stop transmission of the image data. Multivibrator 1120 then synchronizes the paused data transmission with fetches of data from image memory.

Multivibrator 1121 is the memory timing multivibrator and generates the timing signals utilized to retrieve data from the image memory to be displayed or transmitted to a remote device. Multibrator 1122 is a slightly faster reacting multivibrator which is utilized to signal the end of a byte of image data to the video display controller circuit, thus triggering the reading and displaying of that byte of data. Multivibrator 1123 is the address advance vibrator, which is utilized to load or increment the address counters which are utilized to access image data.

Figure 11E:
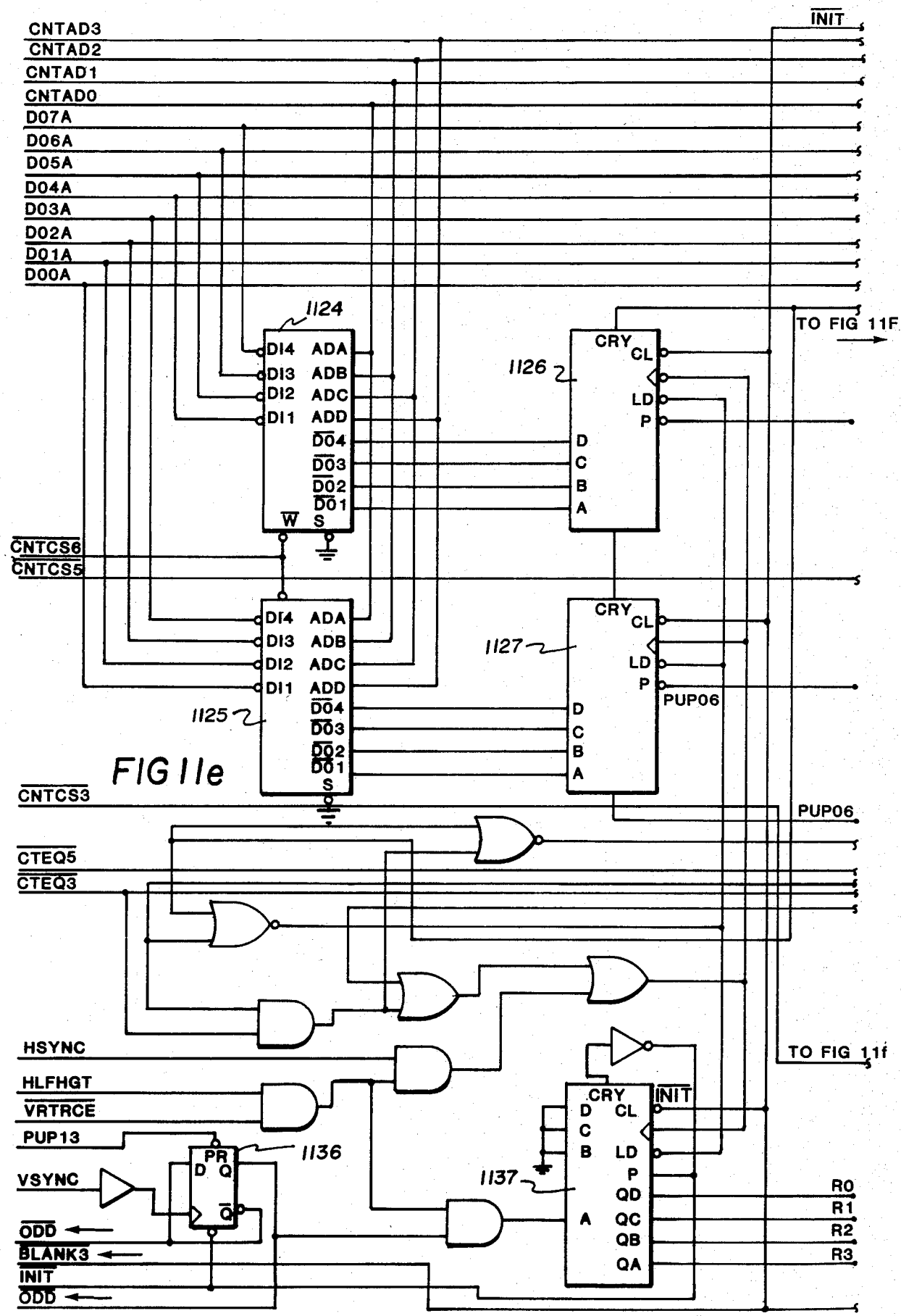
Figure 11F:
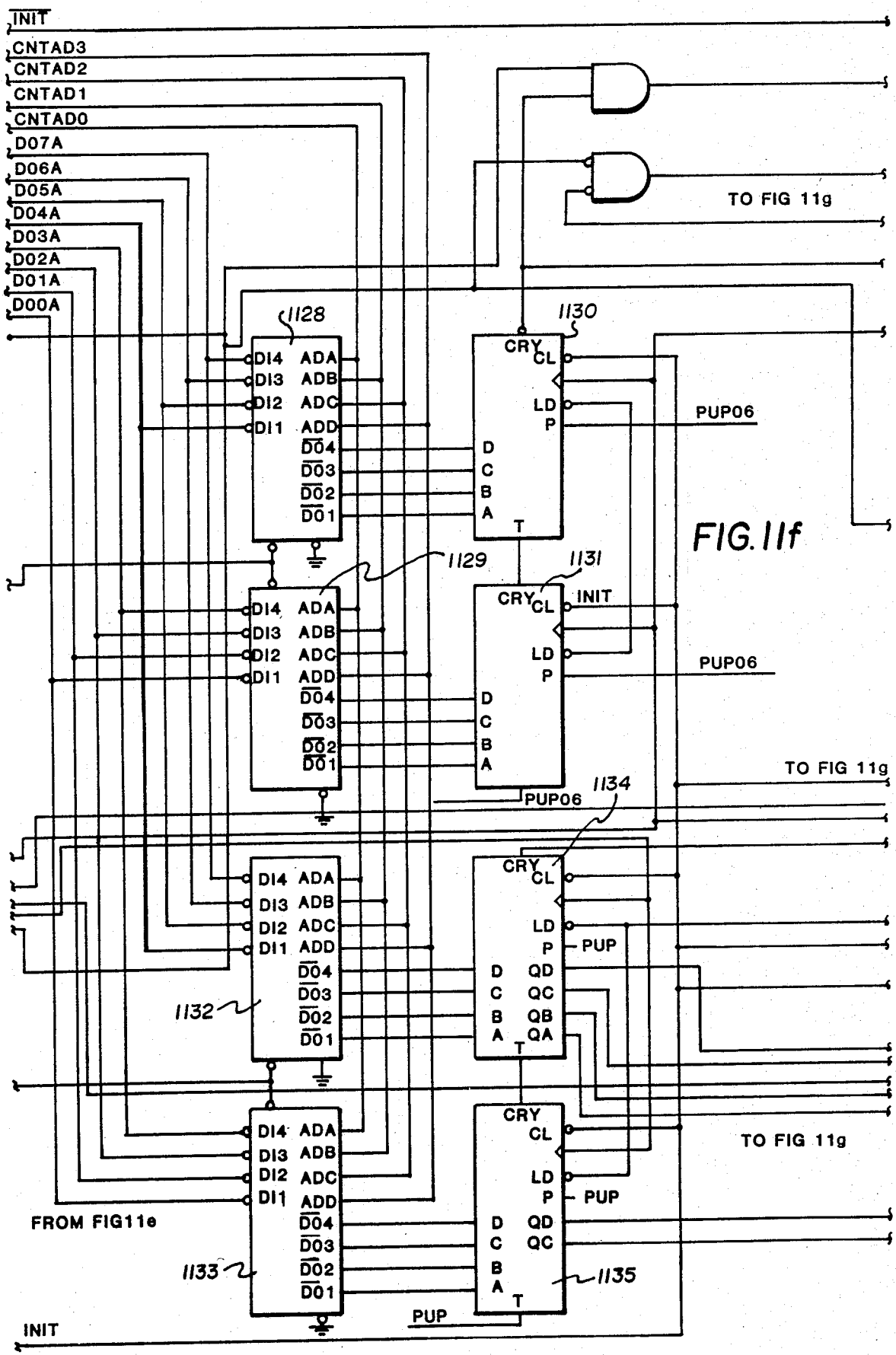
Figure 11G:
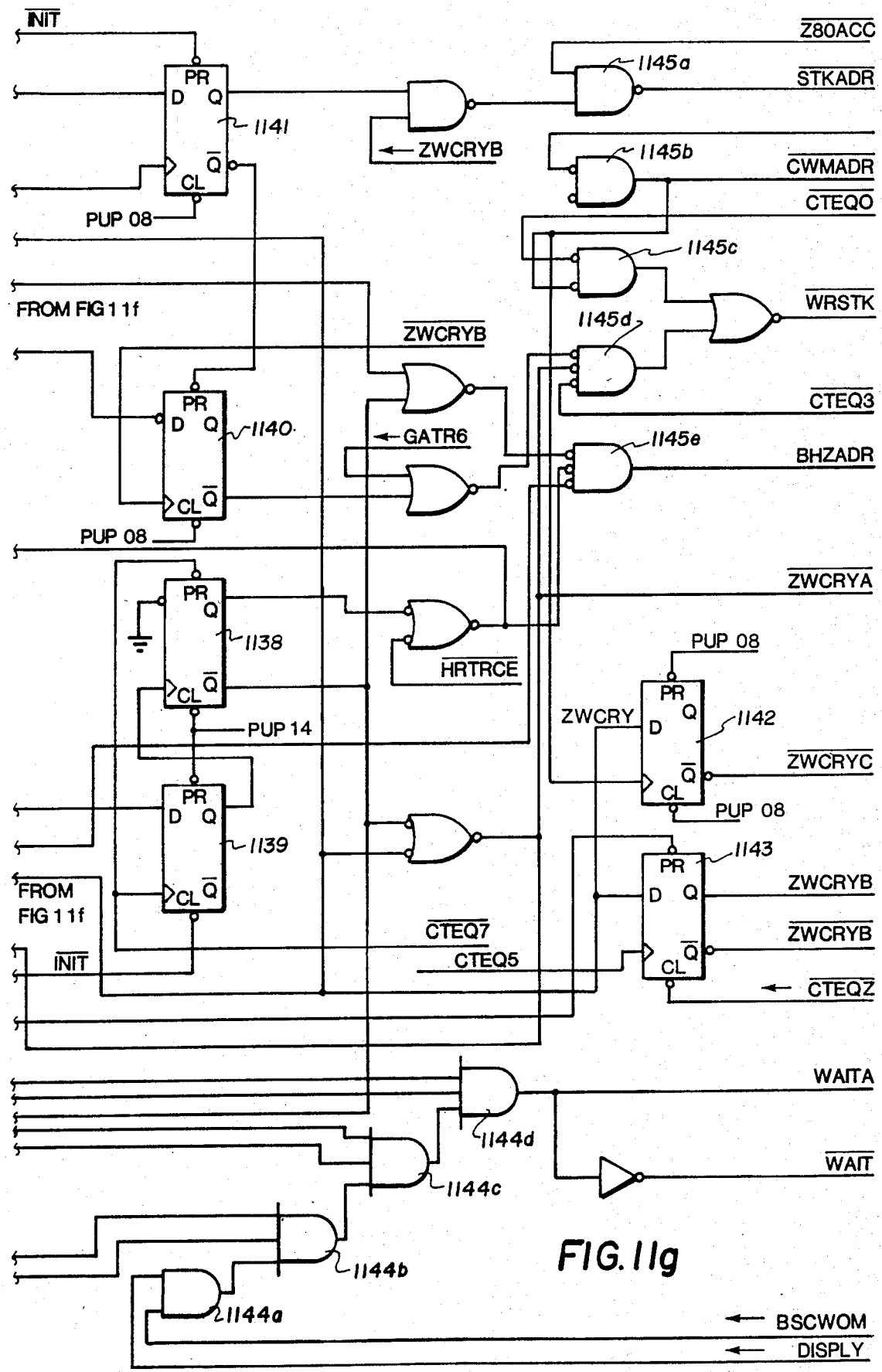

Referring now to FIGS. 11e, 11f and 11g, which, when joined in the manner indicated in the figures, form a schematic diagram of the video screen format timing circuitry of the video formatter of the present invention. The circuitry thus depicted is that circuitry which allows the definition of the discrete display areas previously discussed. Each of the display areas or zones is defined by an operator in terms of certain parameters. These parameters include the zone width and height. The zone height is defined by an arbitrary dimension called "rows" and each "row" is further defined as a particular number of scans by the control device.

Recalling that although nine discrete display areas are possible in the disclosed embodiment, an additional seven areas are also defined and are utilized for horizontal and vertical retrace in the video terminal application. The data defining these 16 zones is stored in counter control memories which serve to control associated counters. Each of the counter control memories is comprised of a sixty-four bit random access memory, organized into sixteen four bit words.

Thus, counter control memories 1124 and 1125 are loaded with data specifying the number of scans of the display system per row of height. In actual practice, the data loaded into counter control memories 1124 and 1125 represents the two's complement of the desired number. The two's complement is utilized to permit simplified operation of four bit counters 1126 and 1127, which are loaded with the two's complement number and allowed to count to a carry condition.

In similar fashion, counter control memories 1128 and 1129 are loaded with data specifying the zone height in rows, and serve to control four bit counters 1130 and 1131. Additionally, counter control memories 1132 and 1133 are loaded with data specifying the width of the zone and serve to control four bit counters 1134 and 1135. Those skilled in the art will appreciate that the sixteen four bit words stored in each counter control memory will serve to define sixteen separate zones.

Multivibrator 1136 is utilized to keep track of whether the current frame is odd or even in number, to permit control of the interlace circuitry utilized to increase image resolution. Four bit counter 1137 is utilized in conjunction with the video display controller circuitry when alphanumeric characters are being generated. A particular code specifying a selected alphanumeric character is utilized to enable the video display controller circuitry to generate the selected character; however, it is still necessary to keep track of what scan through the display device the system is currently displaying. Individual characters, in the disclosed embodiment of the present invention, are typically twelve scans in height and the image generated to perform a particular character will vary with each scan. Four bit counter 1137 is thus utilized to count the number of scans during character generation. Those skilled in the art will appreciate this as being standard dot-matrix character generation.

Multivibrators 1138 and 1139 are utilized to cause the initial loading of counters 1126, 1127, 1130, 1131, 1134, 1135 and 1137 from their respective control memories, during startup. Once operating, the aforementioned counters are reloaded during each carry condition, however, initially this load must be forced as no carry exists. Multivibrator 1140 is utilized during alphanumeric character generation to ensure that an address bump by delta (explained below) does not occur until after twelve scans are complete, thus ensuring continuity of alphanumeric characters. Multivibrator 1141 is utilized to enable the address control memories during the first scan in each band of the display. Multivibrators 1142 and 1143 are coupled to the carry outputs of counters 1134 and 1135 and are utilized to generate various zone width carry signals (ZWCRY) for utilization throughout the video formatter.

Logic gates 1144a-1144d are coupled to the outputs of zone width counters 1134 and 1135 and the mode select signal and are utilized to generate wait signals to a control device.

Figure 11H:
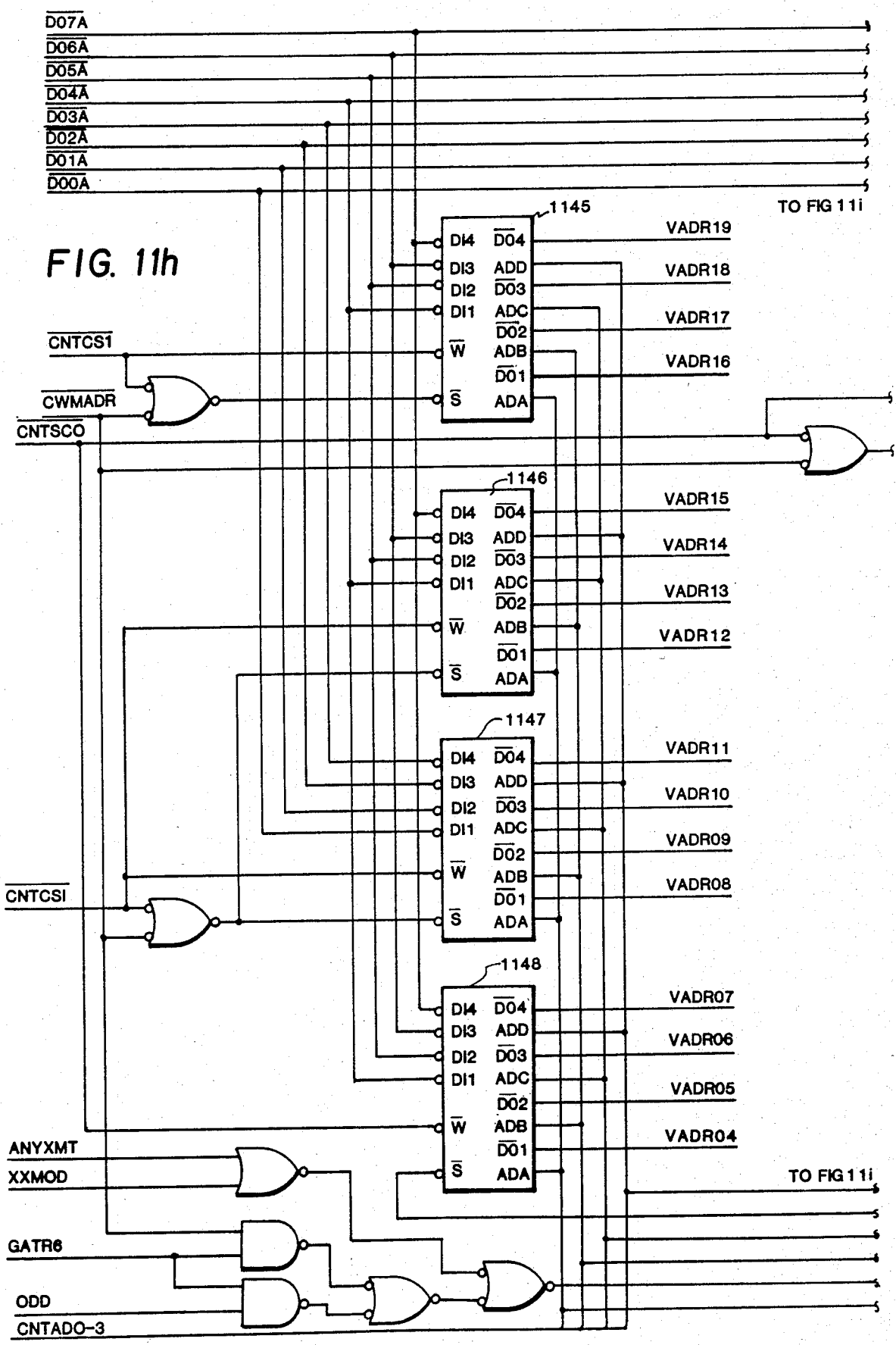

Referring now to FIGS. 11h and 11i, and the joint figure formed thereby, there is depicted the display address circuitry of the video formatter of the present invention.

Having previously defined the parameters of each of the sixteen zones (nine of which are display zones and seven of which are utilized for retrace signals) in terms of zone width and zone height in the arbitrary dimension of "rows" and the number of scans through the display per "row" it is now necessary to provide two additional parameters to operate the video formatter in the manner described.

First, it is necessary to define a starting address within the image memory to determine what section of the image will be contained within a selected zone. Secondly, it is likely that the zone width may not be sufficiently wide to encompass the entire image, and therefore simple unitary address incrementing will not suffice. As the end of the zone width is reached, the address of the next byte of image data displayed must be determined by incrementing with a selected number, which is dependent upon the width of the entire image. This selected number is referred to variously herein as the "delta" or "bump" increment. The bump increment is calculated by examining the width of the image and determining what number must be added to the starting address to arrive at the start of the next scan through that zone.

The starting address of each of the zones within the display may be stored within control memories 1145-1149. Control memories 1145-1149 are also sixty-four bit random access memories, organized into sixteen four bit words. As a matter of design choice, the address of image data stored within image memories in the video formatter of the present invention typically contains seventeen bits. Thus, control memories 1145-1149 are capable of storing the seventeen bit starting address of each of the sixteen display zones as written into the control memories by a control device.

Control memories 1150-1152 are utilized in a similar manner to receive and store the "delta" or "bump" number by which the address of the next byte of image to be displayed is determined. The starting address of each scan through the zone is incremented by the bump increment to address the first bit of image necessary for the next scan through a selected zone. Quad two input multiplexers 1153-1155 are utilized to shift the "delta" number and thereby multiply it by two. This shifting is necessary during interlace in the non alphanumeric (image) mode. Interlace is utilized to increase resolution of the image, and is accomplished by skipping a line of the image and then utilizing the skipped image data during the next complete frame of the image. In order to skip a line of image data, the increment number must be twice the normal number to arrive at the address of the beginning of the scan following the next scan.

Having defined each zone by size and starting address within the image memory, and by knowing the increment or address necessary to address the first bit in the next scan through the zone, it is possible to display a variable window within the display which may be easily scrolled in either axis (by incrementing the starting address) or enlarged (by changing zone dimensions) and may be utilized to visually display a selected portion of an image. Further, as will be explained below, certain zones may be dedicated to alphanumeric characters indicative of operating parameters, prompting cues or other pertinent data.

Figure 11J:
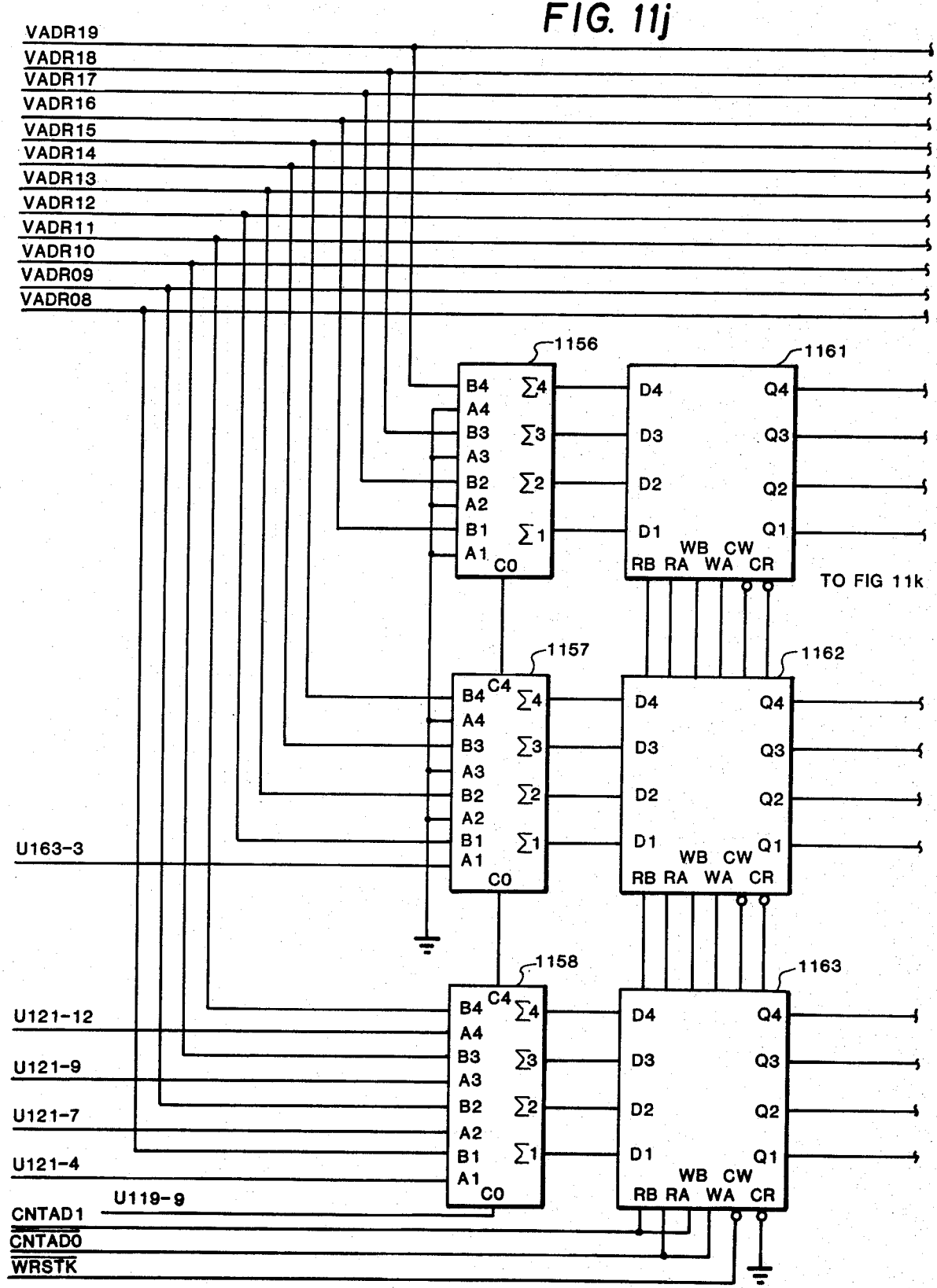
Figure 11K:
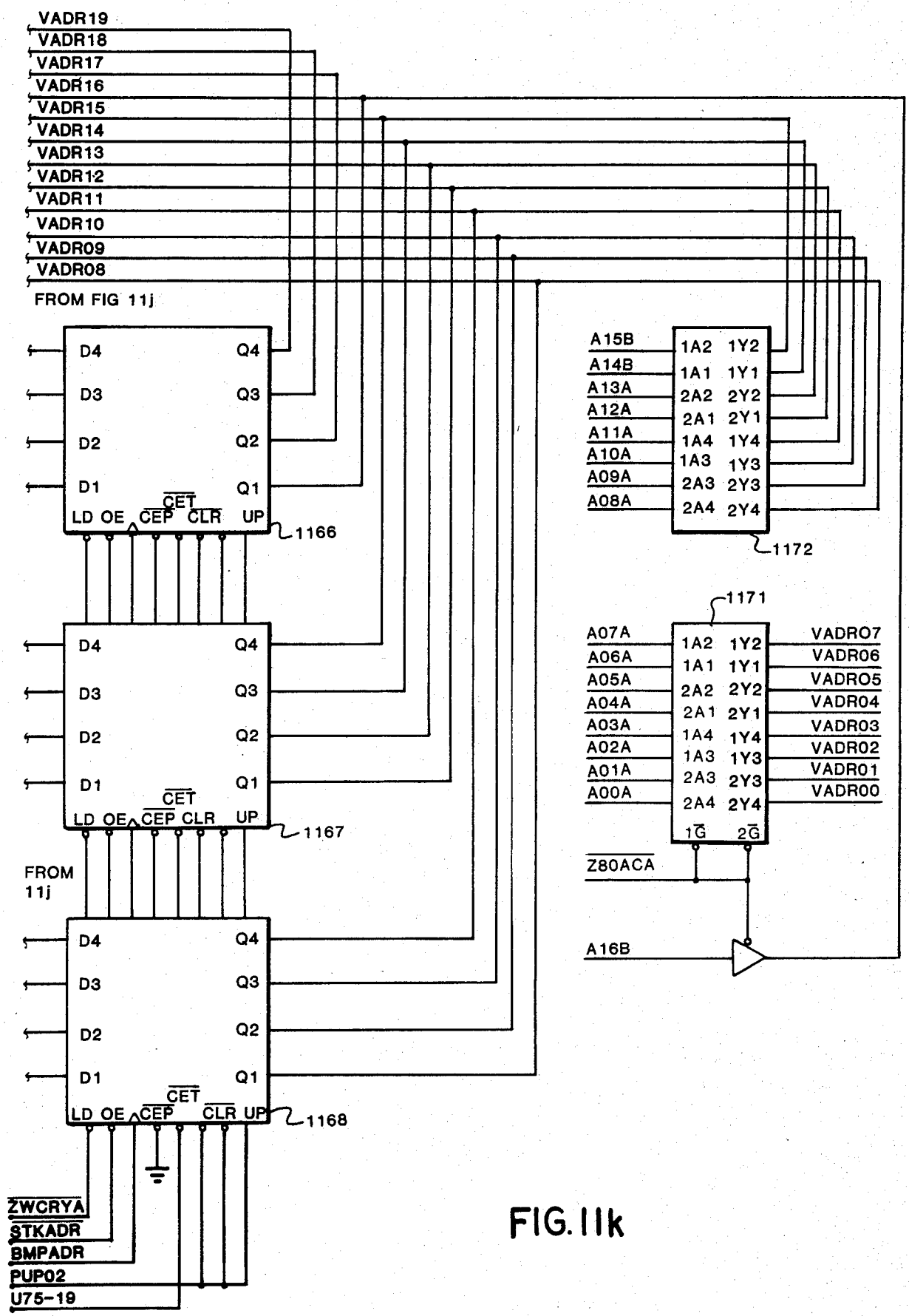
Figure 11L:
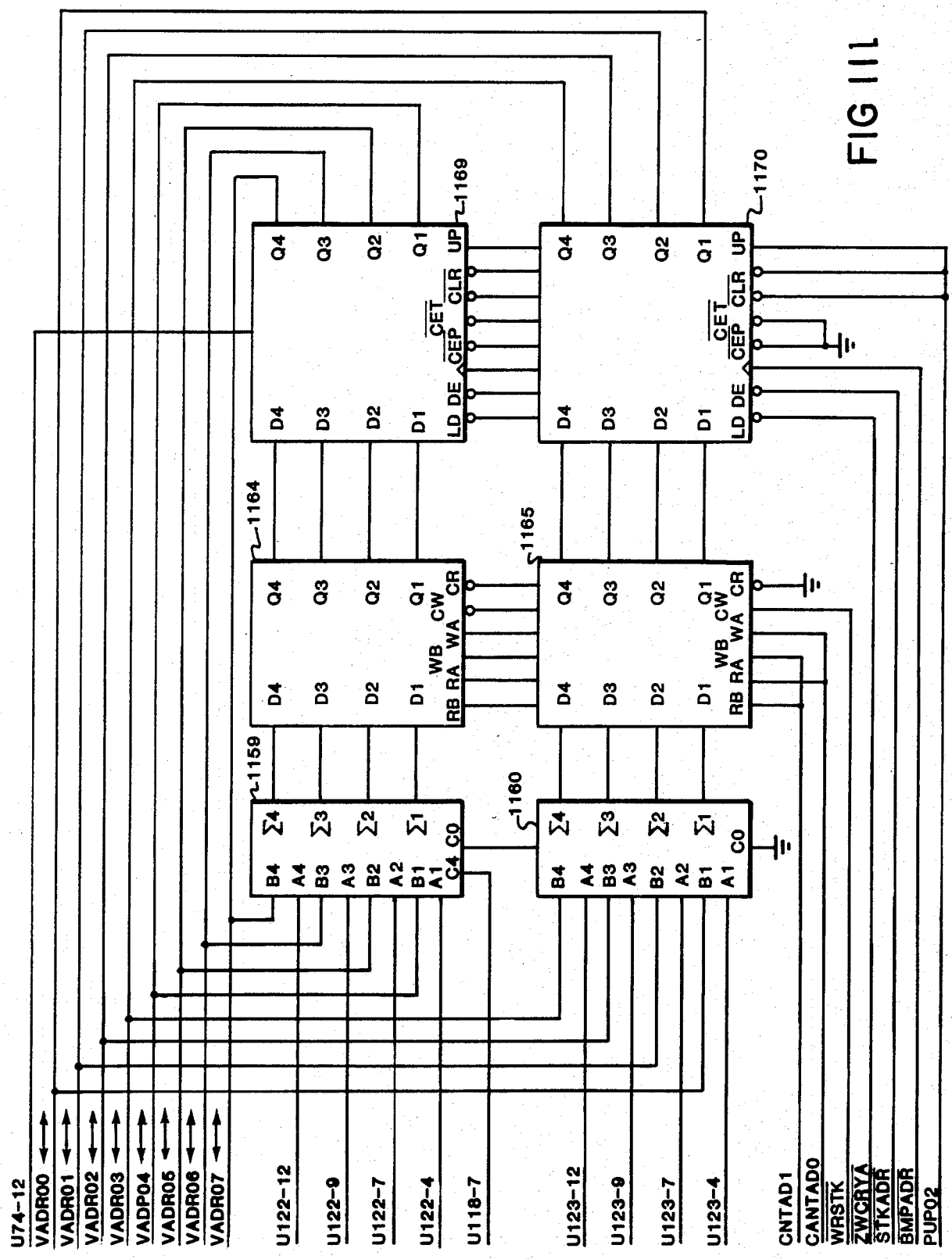

Referring now to the joint figure formed by FIGS. 11j and 11k and to FIG. 11l, there is depicted a schematic diagram of the display address generation circuitry of the present invention.

As discussed above, during operation of display devices, as the beginning of a zone occurs, the previous starting address must be incremented by a value equal to that of the width of the image to ensure that appropriate data is available during the next scan through a zone (or by twice the width of the image if image interlace is desired). Since this increment must take place at the beginning of each scan through a zone, it is convenient to conduct such an incrementation at each scan, including the first scan. Since the increment would then be added to the starting address for each zone, a compensation offset to each starting address is necessary.

The aforementioned compensated starting address is stored as previously discussed, in control memories 1145-1149 and is coupled to the inputs of four bit full adders 1156-1160. Also coupled to adders 1156-1160 are the outputs of multiplexers 1153-1155, representing the "delta" increment. Thus, adders 1156-1160 add the delta increment to the compensated starting address and couple the sum to four bit by four bit registers 1161-1165. The data thus stored represents the actual starting address of image data to be displayed in each zone.

The outputs of registers 1161-1165 are coupled to four bit up counters 1166-1170. Counters 1166-1170 are four bit counters with three state outputs which are utilized to increment the address data. The initial data clocked into counters 1166-1170 is immediately clocked out onto the bus and around to adders 1156-1160 to be incremented by the delta increment again. As the new starting address (for the next scan) is coupled into registers 1161-1165, counters 1166-1170 begin unitary incrementation of the previous starting address. It is therefore possible, with the depicted circuitry, to generate a starting address, increment that address until the zone boundary is reached, add a delta increment to the previous starting address to obtain the next starting address, and begin incrementing again when the zone is next entered. Also depicted in FIG. 11k are buffers 1171 and 1172 which are utilized to couple the control device into the internal bus.

Figure 11M:
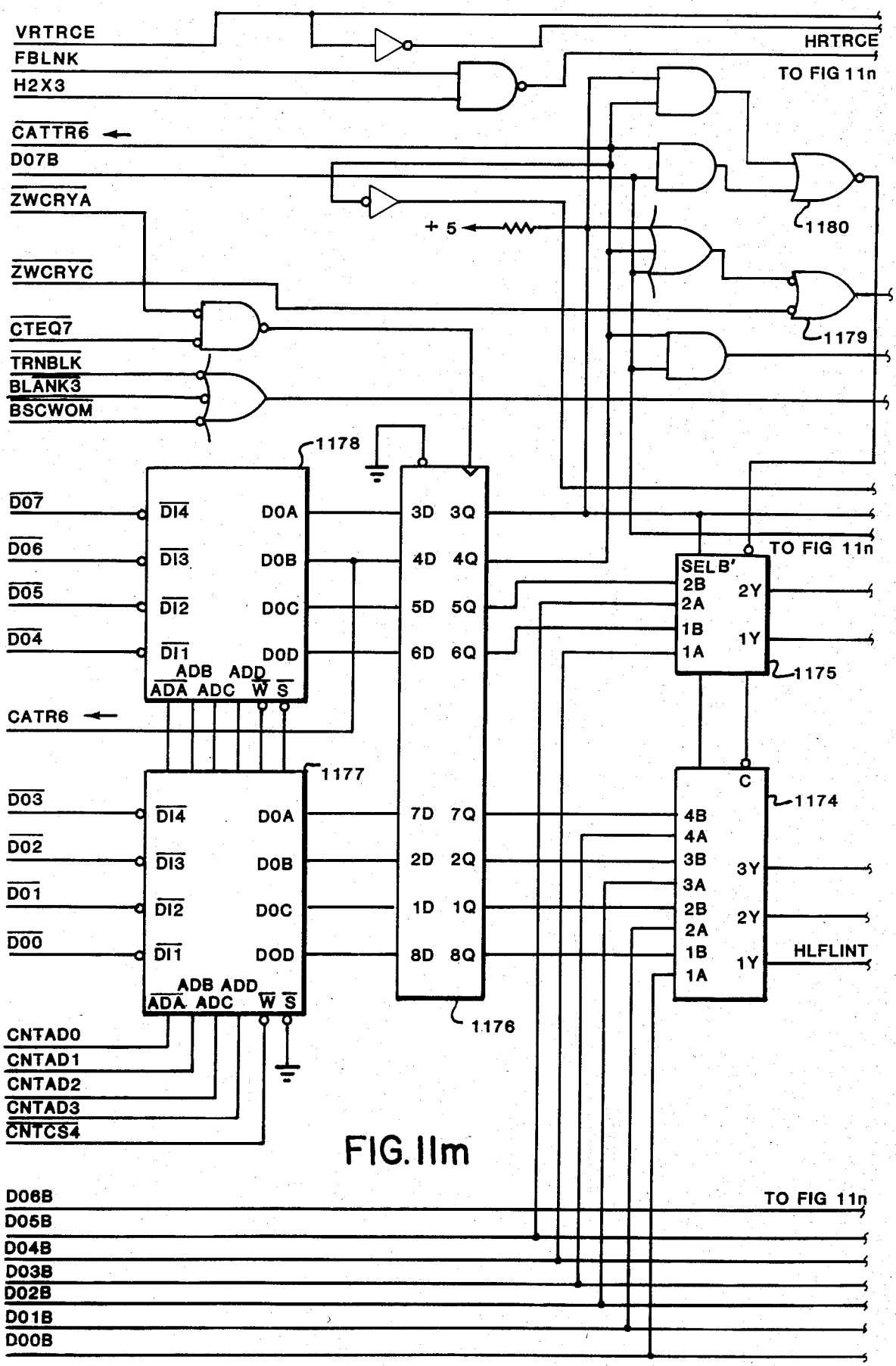
Figure 11N:
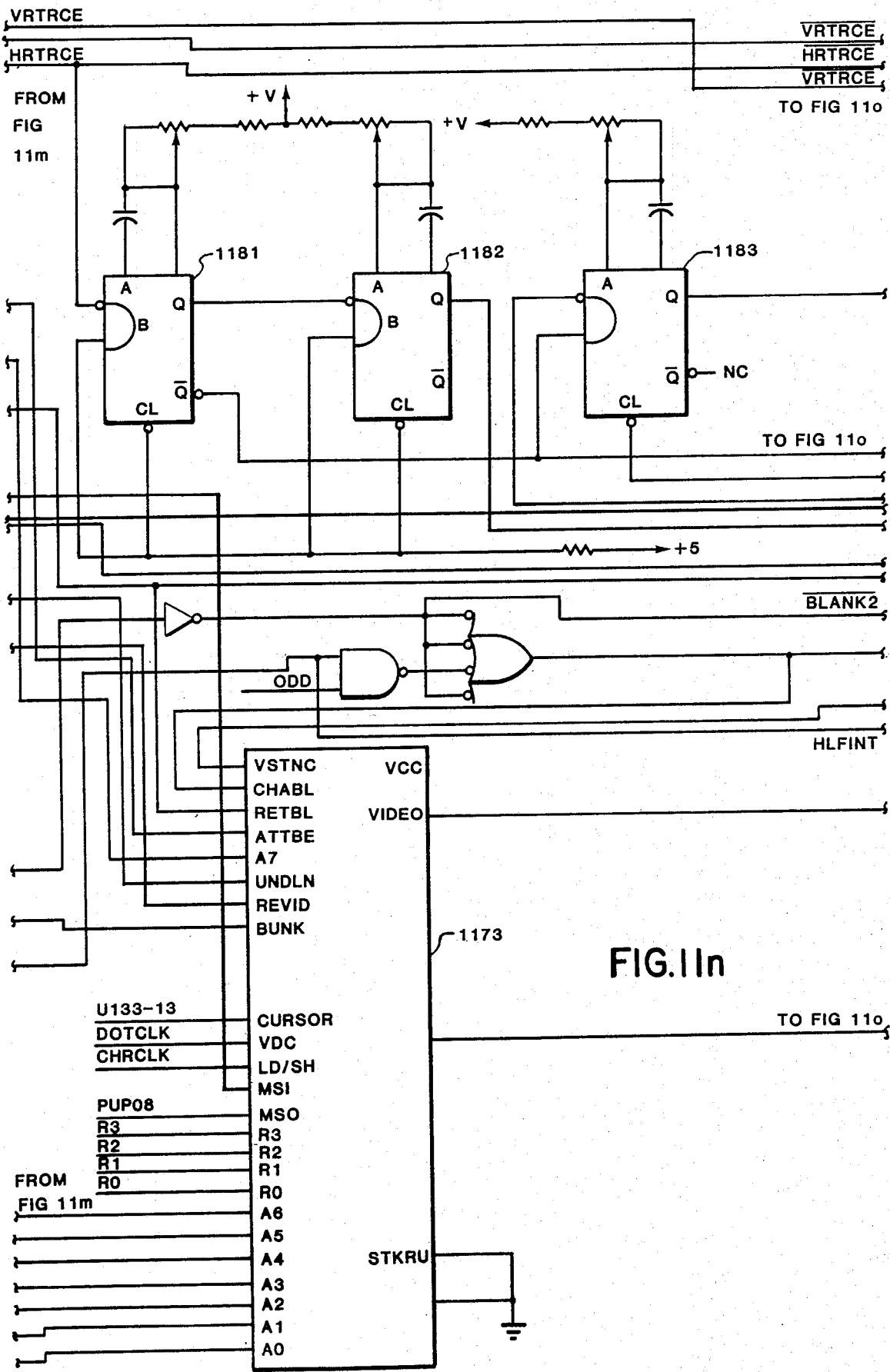
Figure 11O:
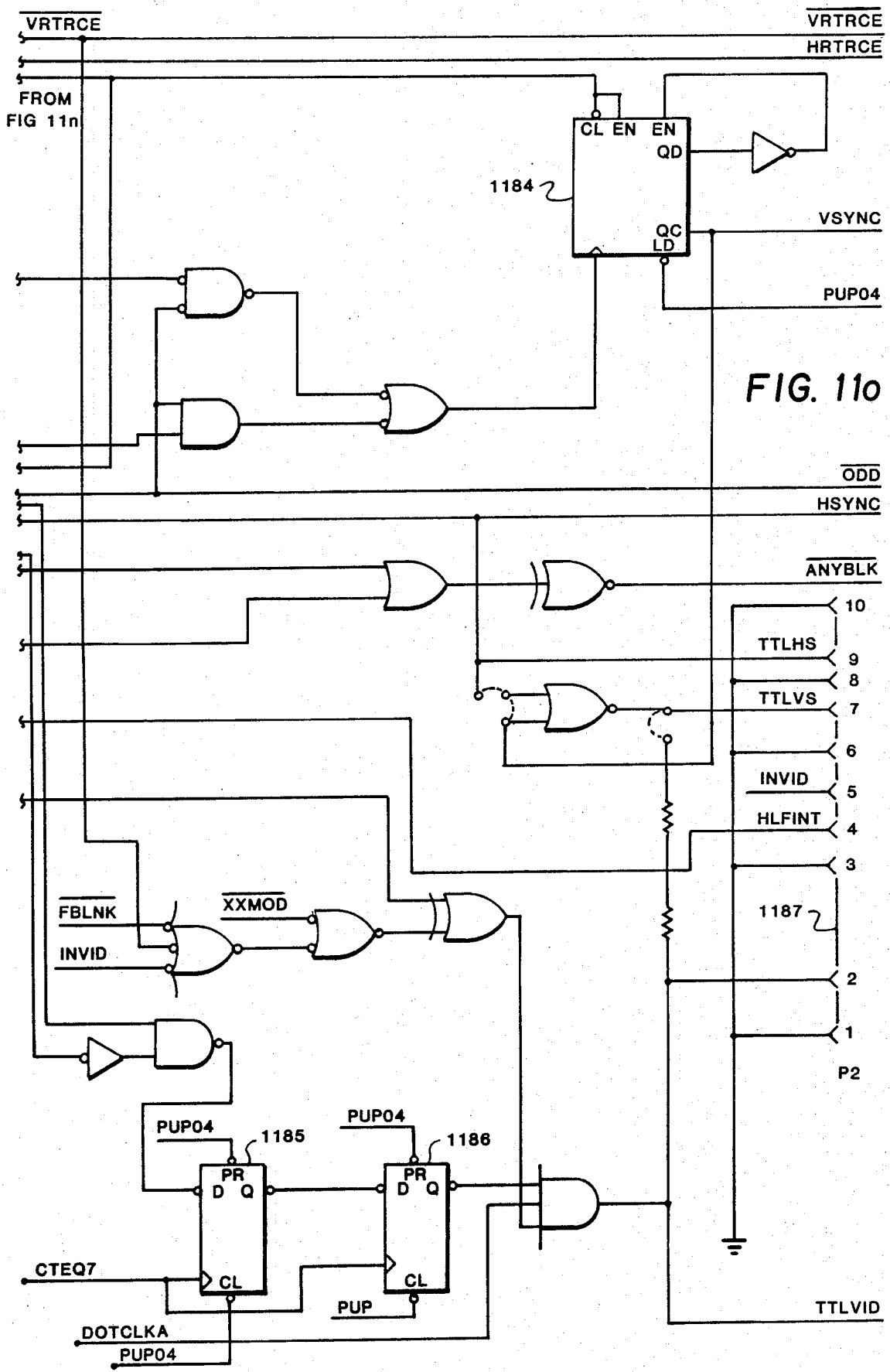

Referring now to the joint figure formed by FIGS. 11m, 11n and 11o, there is depicted a schematic diagram of the video generation and video display controller circuitry of the video formatter of the present invention.

Central to the video generation and video attribute circuitry is video generator 1173. Video generator 1173 is comprised of, in the illustrated embodiment, an SMC 8002 video display controller manufactured by the SMC Microsystems Corporation of Hauppauge, N.Y., and contains a mask programmable, on chip, one hundred twenty-eight character generator which utilizes a seven by eleven dot matrix block. Video generator 1173 also includes attribute logic including reverse video, character blank, character blink, underline and strike-through. Additionally, video generator 1173 has four cursor modes including underline, blinking underline, reverse video and blinking reverse video.

Attribute control signals are coupled to video generator 1173 by means of multiplexers 1174 and 1175. Multiplexers 1174 and 1175 receive their inputs from either attribute latch 1176 or from the data bus. If a global attribute is selected, the correct attribute code is written into attribute control memories 1177 and 1178 by the control device. Attribute control memories 1177 and 1178 are sixty-four bit random access memories and are utilized to store the attribute codes for each of the display zones. During field attribute operation (available only in the alphanumeric mode), selected data from the data bus is utilized to generate specific attributes for selected portions (fields) of the display zone, rather than the entire zone as in global attribute operations. The selected field attribute data is applied to video generator 1173 by means of multiplexers 1174 and 1175. Additional data from the data bus is applied to pins A0–A6 of video generator 1173 and is utilized to select a specific character from the character generator.

Logic gates 1179 and 1180, and the logic gates associated therewith, are utilized as a gating function for the attribute capability. Logic gate 1180 is utilized to enable multiplexers 1174 and 1175 and the output of logic gate 1179 is applied to the attribute enable pin (ATTBE) of video generator 1173, thus controlling the generation of video attributes.

Retriggerable single shot multivibrators 1181, 1182 and 1183 are utilized in conjunction with four bit counter 1184 to time and generate horizontal and vertical sync pulses. Multivibrator 1181 triggers for approximately 2.5 microseconds after the beginning of horizontal retrace to provide what is commonly referred to as the "front porch" of the horizontal retrace pulse. One output of multivibrator 1181 is utilized to trigger multivibrator 1182 which provides a five microsecond horizontal sync, the remaining period of horizontal retrace is the "back porch".

Multivibrator 1183 is utilized to provide interlace holdoff of the vertical sync pulse. Vertical sync is delayed for approximately one-half of the horizontal sweep time to cause interlace and thereby increase image resolution. Four bit counter 1184 is then utilized to generate the vertical sync pulse and the "front porch" and "back porch" periods.

Multivibrators 1185 and 1186 are utilized to provide a delay before the application of horizontal retrace blanking to compensate for delay encountered due to pipelined internal operation during character generation by video generator 1173. Interface 1187 is provided to interconnect the video formatter of the present invention to a video terminal interface for use in a video subsystem.

Figure 12A:
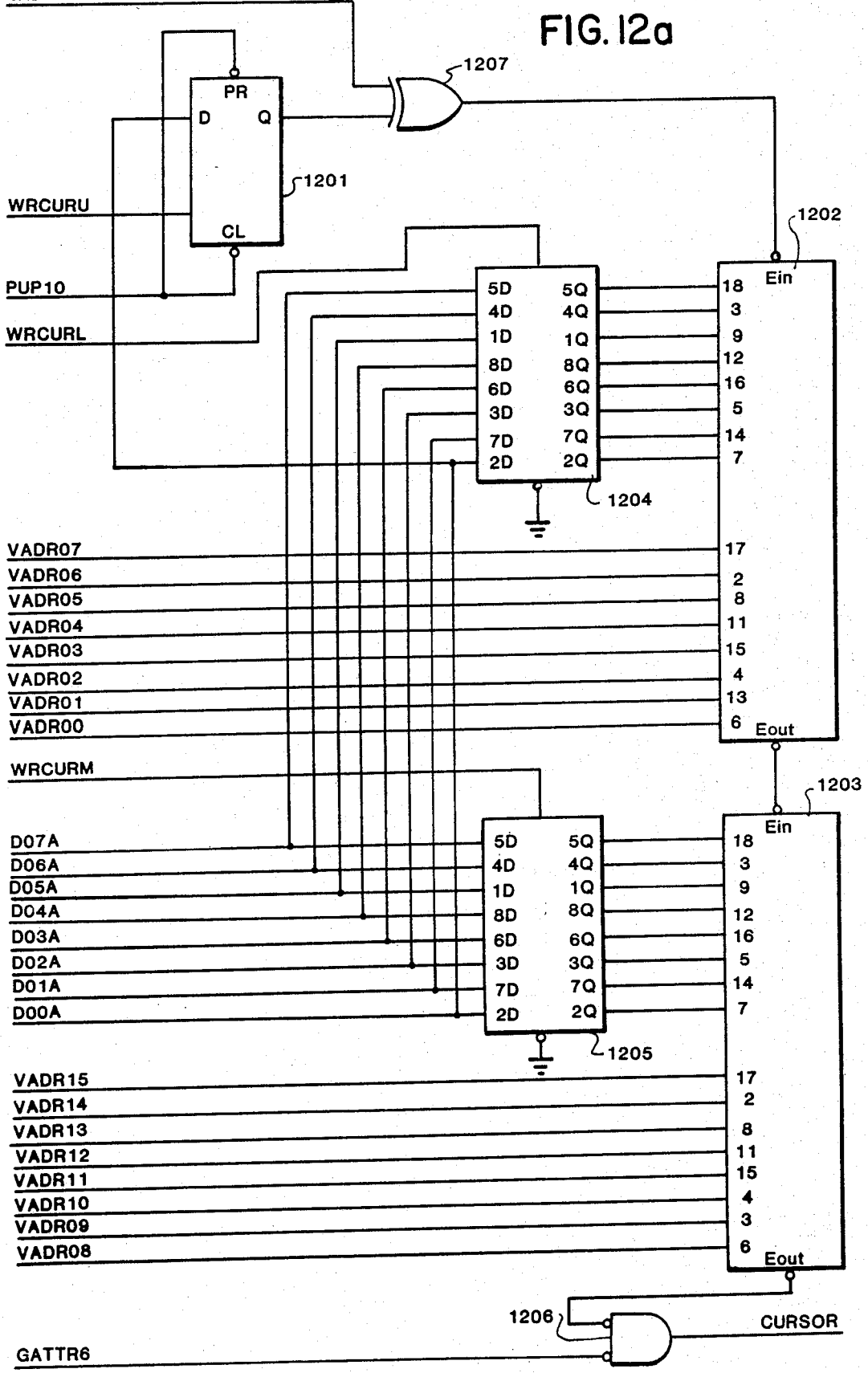

Referring now to FIG. 12a, there is depicted a schematic diagram of the cursor control circuitry of the video formatter of the present invention. Memory locations within the image memory of the video formatter of the present invention are, as a matter of design choice, characterized by seventeen bit addresses. Since a typical microprocessor type control device utilizes an eight bit bus, three separate write commands must be generated to load in seventeen bits. The cursor address is loaded into multivibrator 1201 and eight bit registers 1204 and 1205. The additional circuitry depicted is coupled to the video address bus and is utilized to compare the cursor address with each video address and generate the cursor signal when the correct address is reached.

Logic gate 1207 is utilized to compare one bit of cursor address with one bit of video address, and to enable eight bit comparators 1202 and 1203. If the comparator circuitry indicates a match, and the video display terminal is not in the image mode (no cursor being utilized during image mode) then logic gate 1206 is utilized to generate the cursor signal.

Figure 12B:
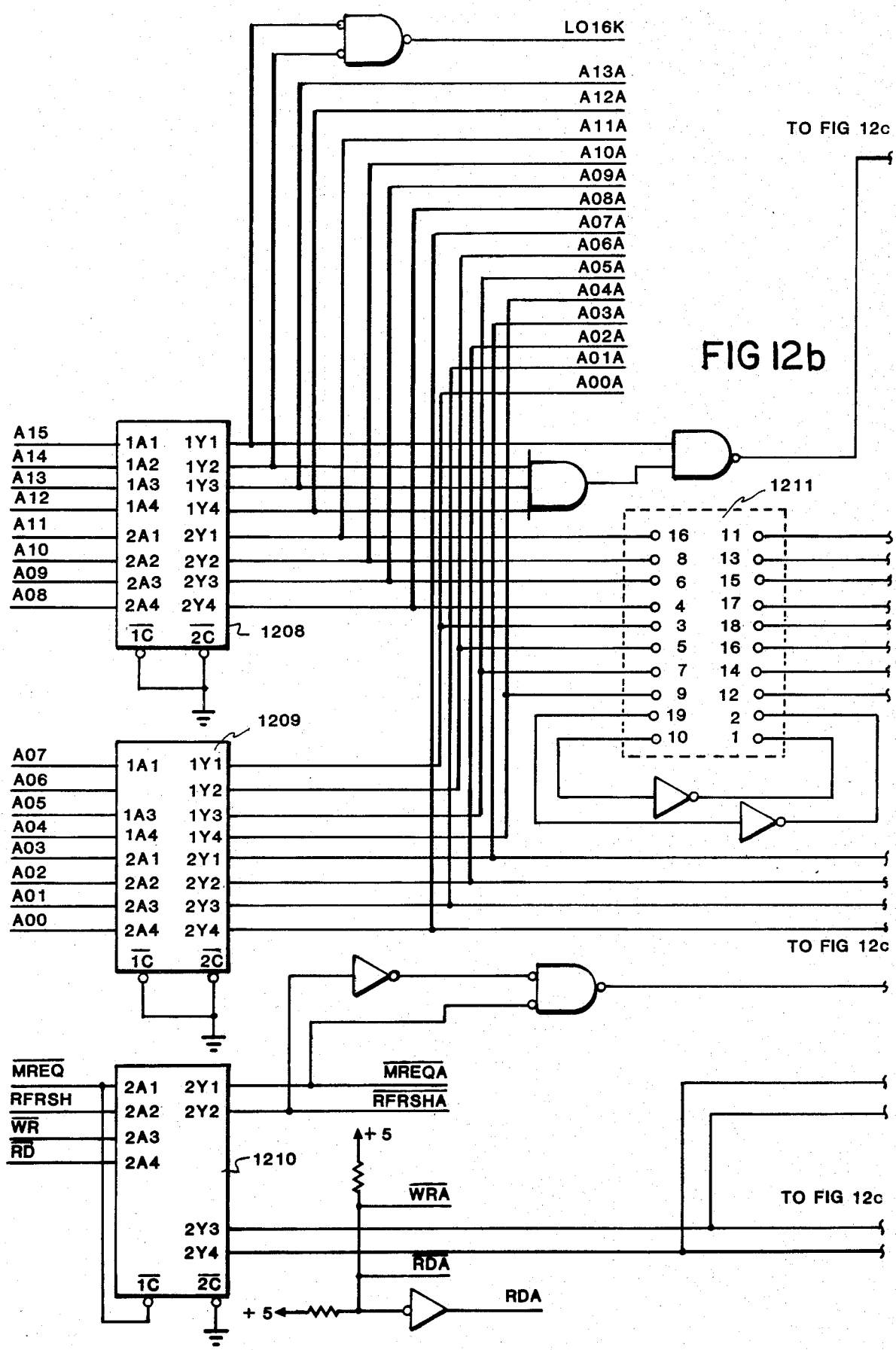
Figure 12C:
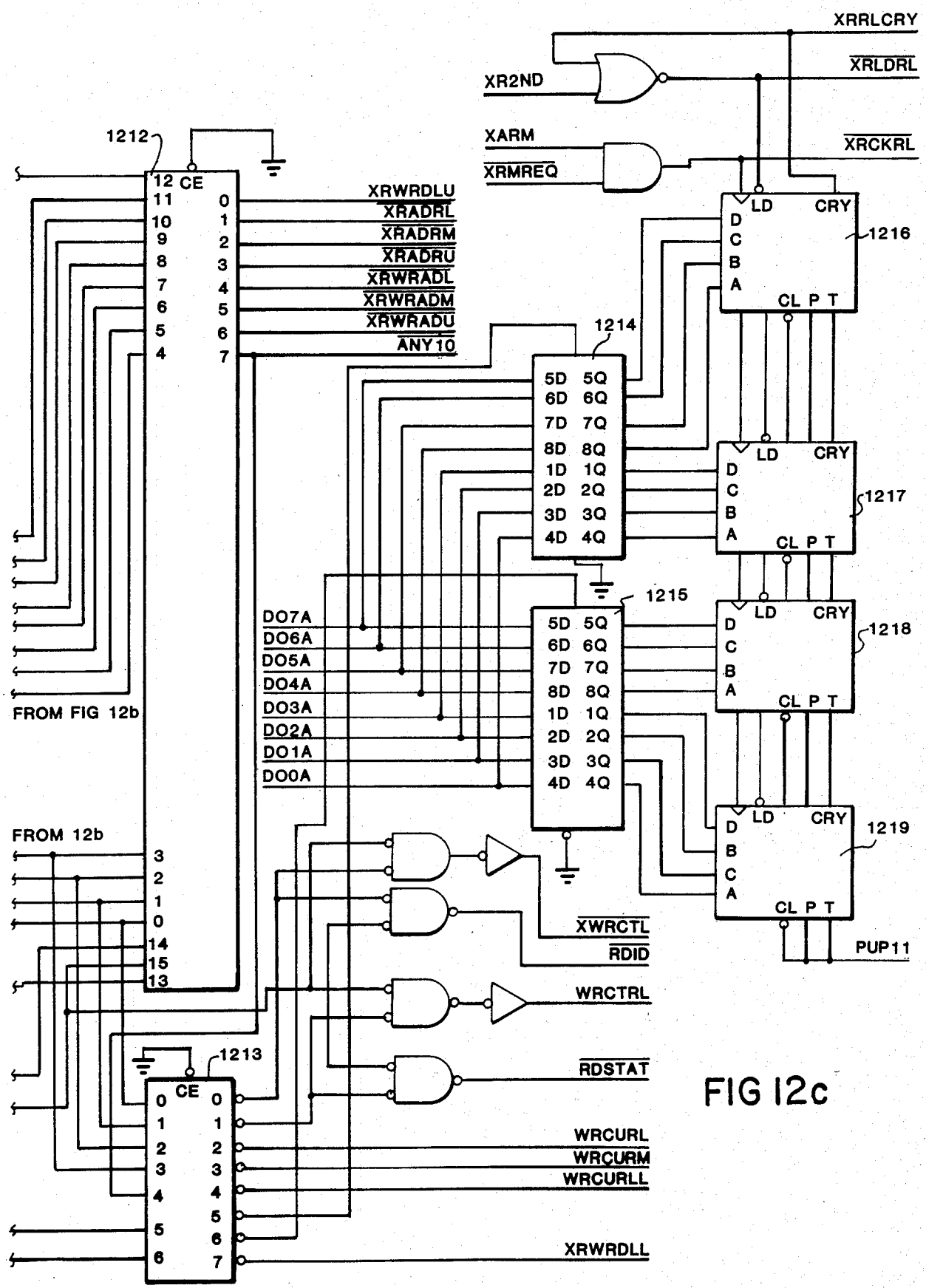

With reference now to FIGS. 12b and 12c, and the joint figure formed thereby, there is depicted a schematic diagram of the intra device addressing circuitry and run length counters of the video formatter of the present invention. As discussed with respect to the data compression system, it is possible to have up to sixteen separate addressable registers per system which may be directly addressed by a control device.

The address of a selected register is coupled from a microprocessor type control device through buffers 1208 and 1209, while various control signals are coupled through buffer 1210. Wire strap option 1211 is utilized to specifically identify a particular video formatter, and the register address is applied to field programmable logic arrays 1212 and 1213, where the actual address data is decoded and utilized to access desired registers.

Also depicted in FIG. 12c are the run length counters and controllers. Recalling that the video image data being generated by the data expansion circuitry may be generated in either a ladder or scan mode, it is necessary to keep track of the length of each "run" of data through the image in order to accurately reconstruct an original image as the data is loaded into display memory.

As in previous similar circuits, the run length is loaded into counter control registers 1214 and 1215, in two's complement form. The contents of registers 1214 and 1215 are then loaded into four bit counters 1216–1219, and counters 1216–1219 are incremented until they reach a carry condition, thus indicating the end of a run of data.

Figure 12E:
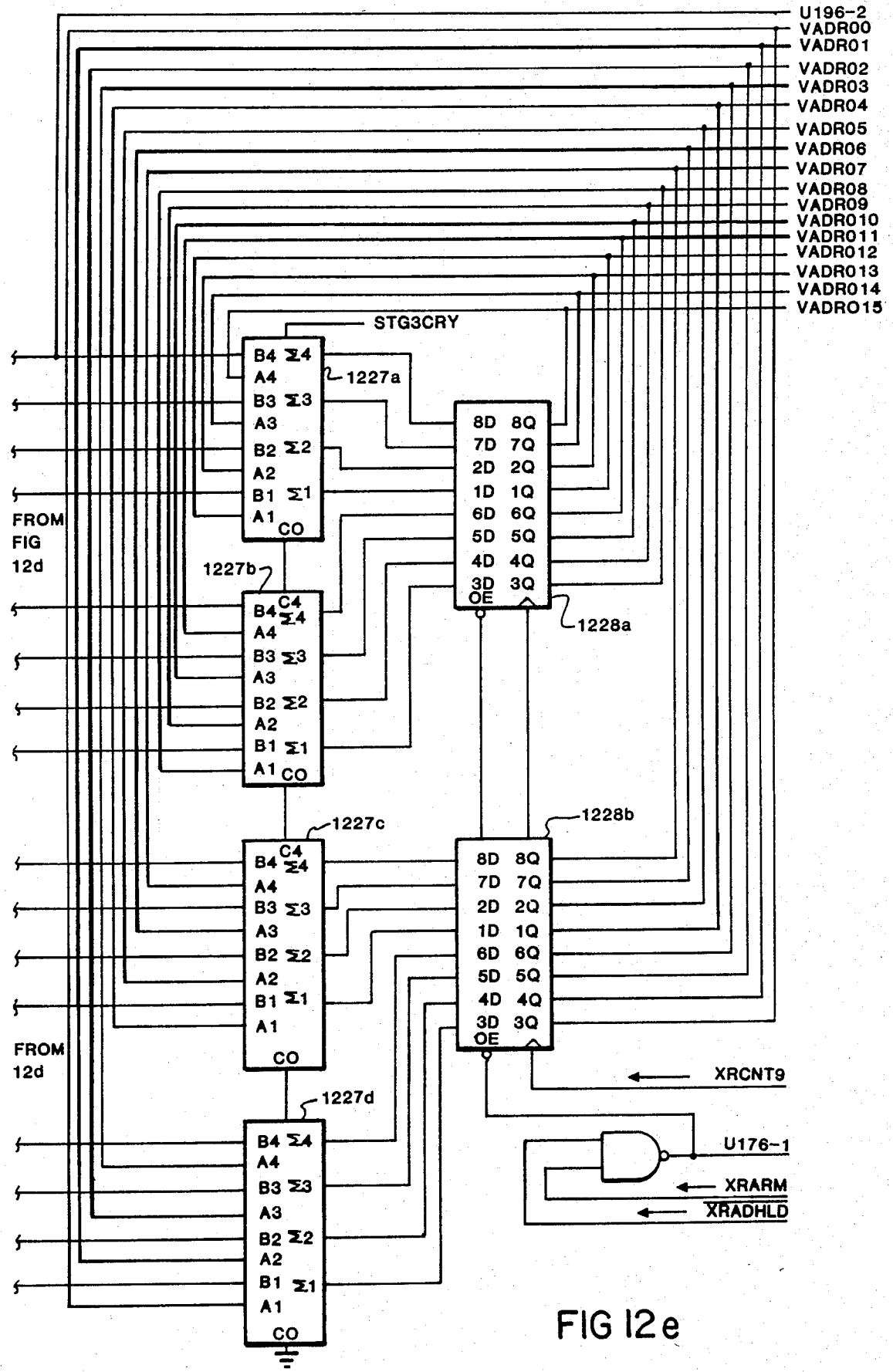
Figure 12F:
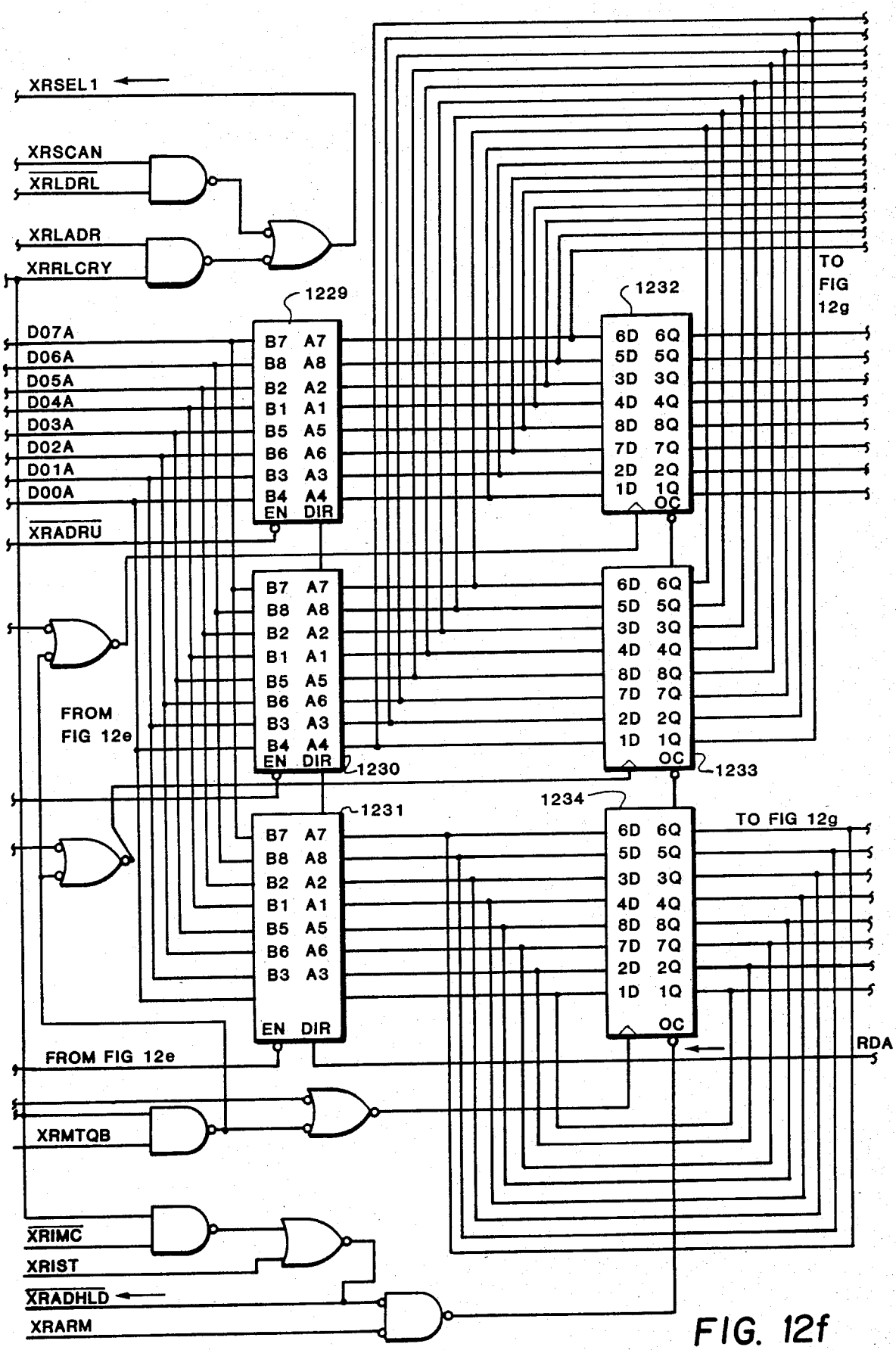
Figure 12G:
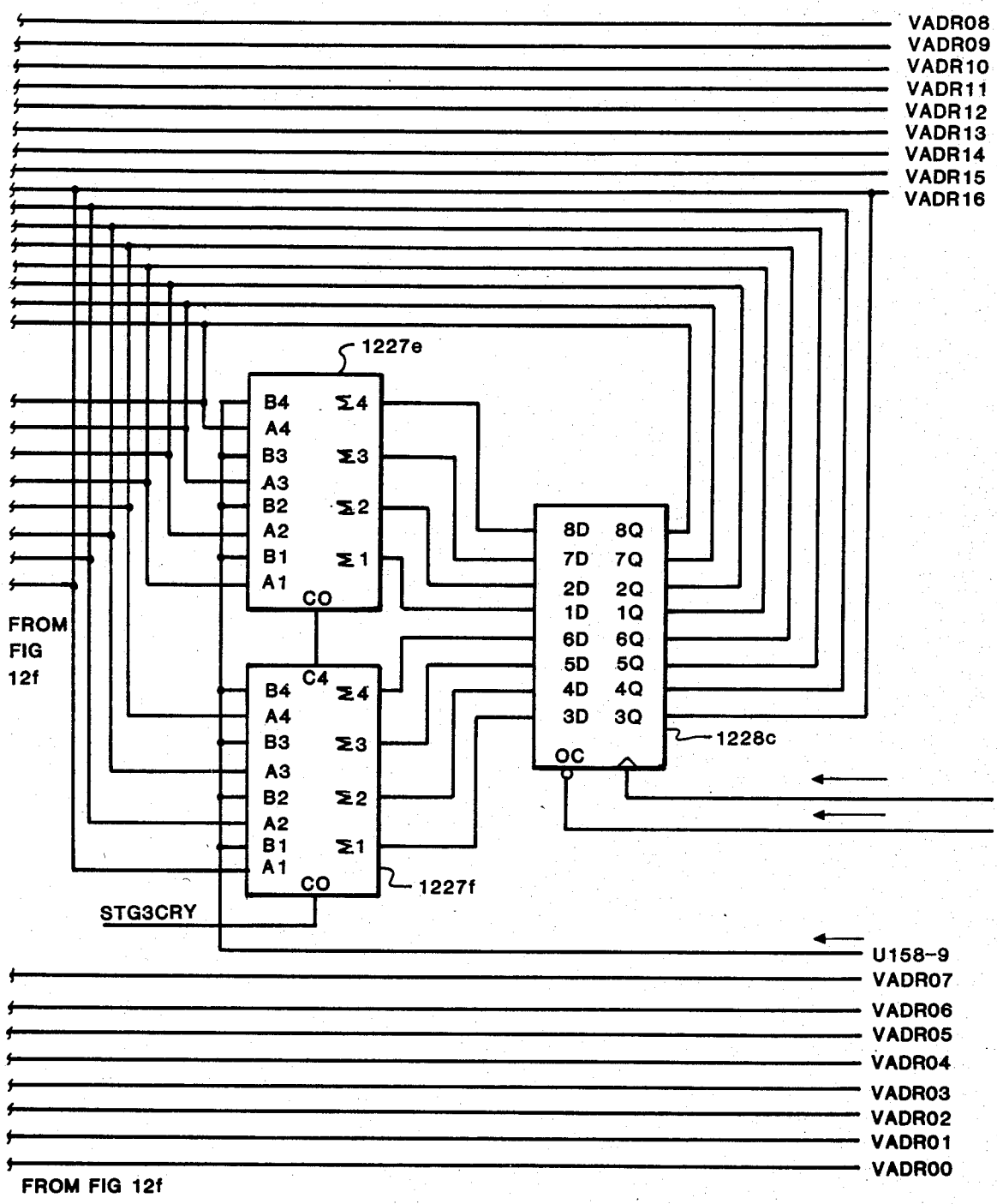

Referring now to the joint figures formed by joining FIGS. 12d and 12e and by joining FIGS. 12f and 12g, there is depicted the address generation circuitry whereby image data coupled to the video formatter is stored in image memory within the video formatter. Recalling the discussion of ladder format versus scan format for image data, those skilled in the art will appreciate that coherent storage of image data within the image memory will require that each successive byte of image data, while in the ladder format, will be stored at an address in memory which is either greater than or less than the previous address by a value equal to the width of the image. As counters 1216–1219 enter the carry condition, indicating the end of a run, the next byte of image data will be stored at an address which is either greater than or less than the previous starting address by one. Conversely, while in the scan format, image data addresses will increment or decrement by one, until a carry condition in counters 1216–1219 indicates the end of a run, at which time the next byte of data will be stored at an address greater than or less than the previous starting address by a value equal to the width of the image. The determination in either case of whether to increment or decrement the address of the image data is determined by the point in a document image at which the data begins.

Data bus transceiver 1220 is utilized to couple the value of the width of the image to width registers 1221 and 1222. The two most significant bits in register 1222 (pins 8Q and 7Q) are utilized for the sign bits for the address increments. The outputs of width registers 1121 and 1222 are coupled to multiplexers 1223–1226. Multiplexers 1223–1226 are utilized to output either a plus or a minus one, or a plus or minus width value, as determined by image orientation.

The output of multiplexers 1123–1126 is then coupled to full adders 1227a–1227f (adders 1227e and 1227f are depicted in FIG. 12g) where, the address increment or decrement is added to the previous address, or previous starting address to determine the storage address for the next byte of image data. The result of this address incrementing is coupled to address registers 1228a–c (register 1228c is depicted in FIG. 12g).

Bus transceivers 1229–1231 are utilized to couple the image data address to the control device. Registers 1232–1234 are utilized to temporarily store the starting address of each run of image data. The starting address is utilized when counters 1216–1219 enter a carry condition, indicating the end of a run. The next data address is determined by incrementing the previous starting address, and registers 1232–1234 are therefore utilized to retain each starting address of a run.

Figure 12H:
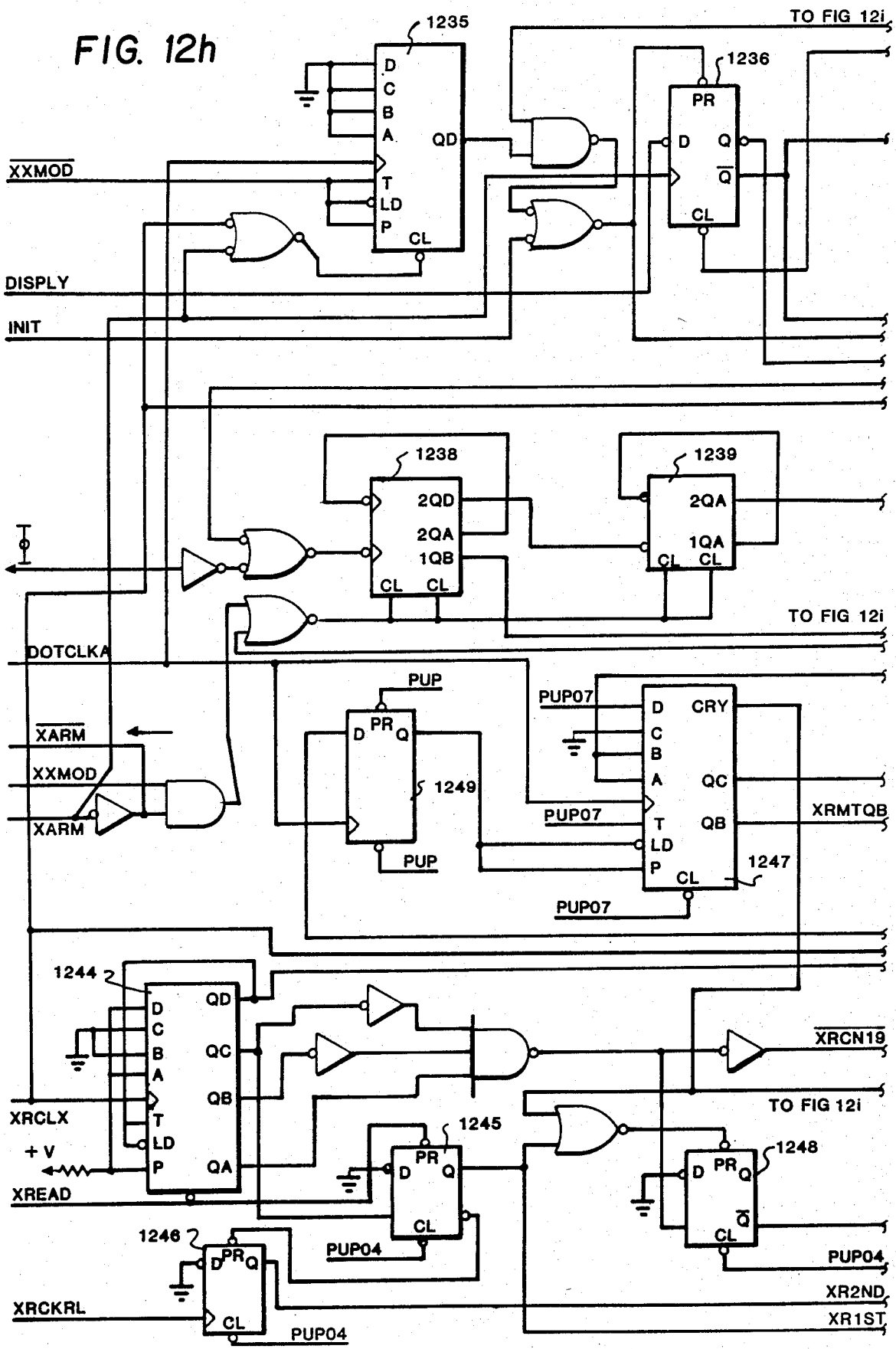
Figure 12I:
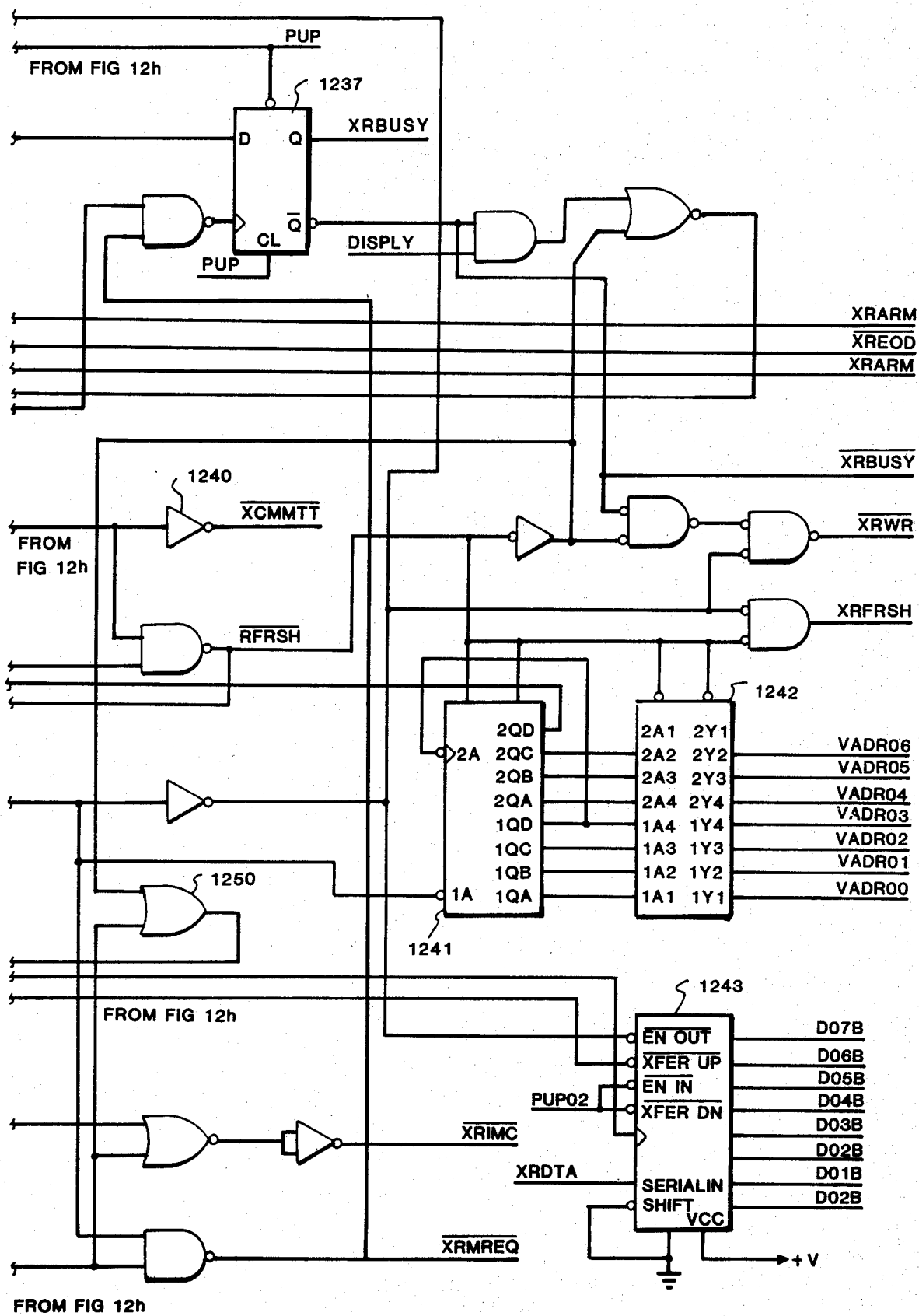

Referring now to FIGS. 12h and 12i, and the joint figure formed thereby, there is depicted a schematic representation of certain of the timing circuits of the video formatter of the present invention. Four bit counter 1235 serves as the end of data timer for the video formatter, counting the number of clock signals after data reception on the X bus ceases.

As a matter of design choice, if the X bus clock goes low for eight master clocks, the system will interpret it as an end of data, causing end of data multivibrator 1236 to set. The output of multivibrator 1236 is utilized to clear multivibrator 1237, but not until the completion of any memory access in progress. Multivibrator 1237 also serves to generate the busy signal when data is being received.

Dual four bit ripple counters 1238 and 1239 are the refresh timers which are utilized to time the periods between each successive refresh operation of the image memory. Refresh takes place every 1.6 milliseconds, and the signal output from logic gate 1240 (XCMMIT) is utilized to cause the incoming data on the X bus to temporarily stop.

The refresh signal ($\overline{RFRSH}$) is coupled to ripple counter 1241 which is utilized to cycle through the row addresses of the image memories to accomplish refresh. The refresh addresses thus generated are latched out through the three state outputs of buffer 1242.

Dual serial/parallel latch 1243 is the receive latch for image data input from the X bus. Latch 1243 accepts eight bits serially off the X bus and then shifts the eight bits into an eight bit wide parallel output latch where they are gated to the data bus and written into image memory while the next eight bits are being shifted into latch 1243. Four bit counter 1244 is utilized to count the input bits from the X bus to determine when an eight bit byte has been input to the system. One output of counter 1244 is utilized to set first byte multivibrator 1245. First byte multivibrator 1245 is utilized to disable the writing of data into the image memory. Recalling the operation of latch 1243, those ordinarily skilled in the art will appreciate that as a byte of data is accumulated, the previous byte is being written into memory. Since during accumulation of the first byte, no previous byte exists, the memory write is disabled.

Second byte multivibrator 1246 is cleared at the second byte of image data and is utilized to provide the load pulse which causes the run length to be loaded into counter control registers 1214 and 1215. (see FIG. 12c) Further, since the address incrementing circuitry will not be required for the starting address of image data, multivibrator 1246 also is utilized to disable multiplexers 1223–1226. (see FIG. 12d).

Four bit counter 1247 is the memory timing generator, which is utilized to operate the image memory independently of the X bus clock. Each time an eight bit byte is accumulated in latch 1243, multivibrator 1248 is utilized to initiate a memory timing cycle, through logic gate 1250 and multivibrator 1249.

Figure 12J:
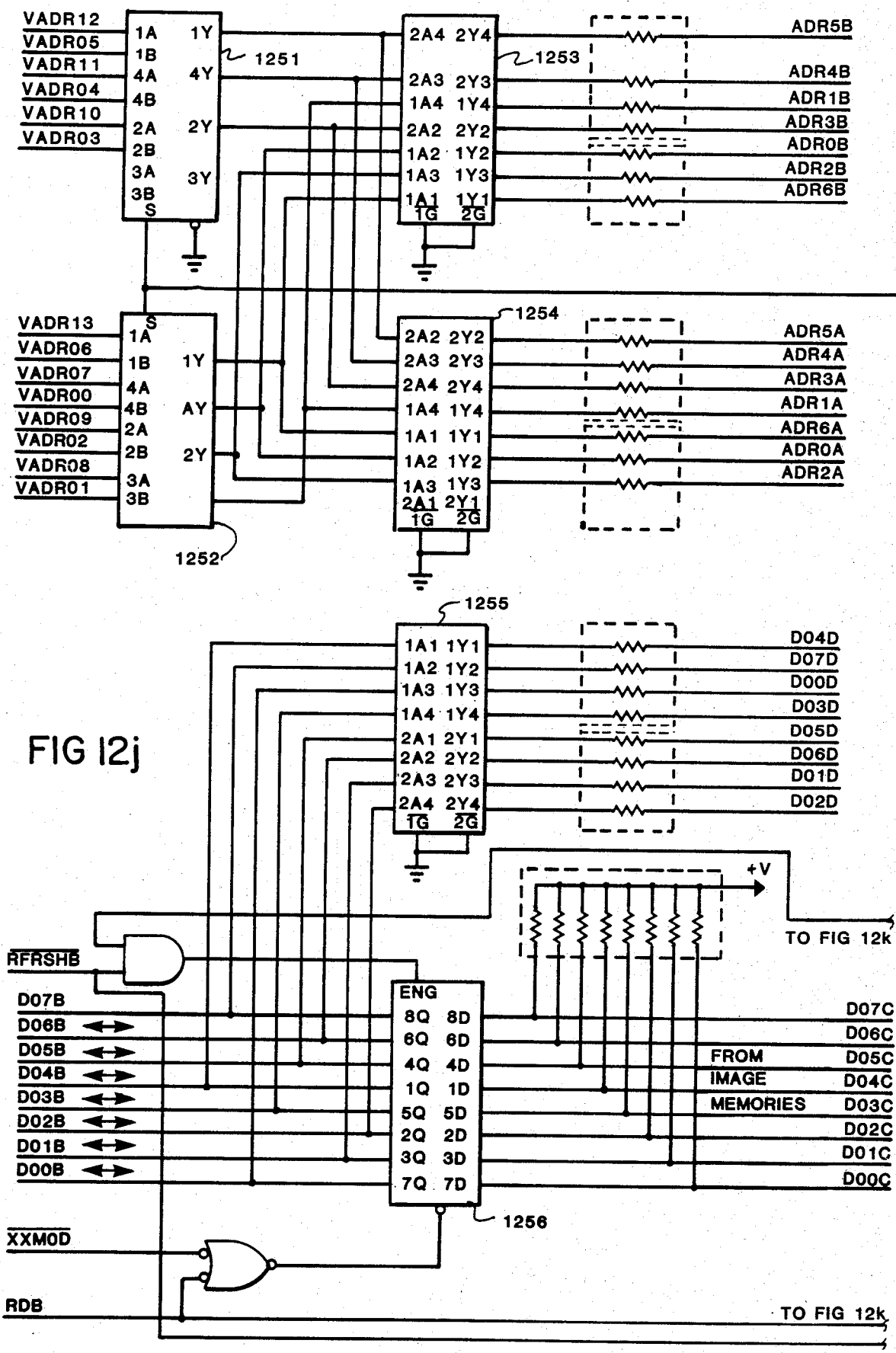
Figure 12K:
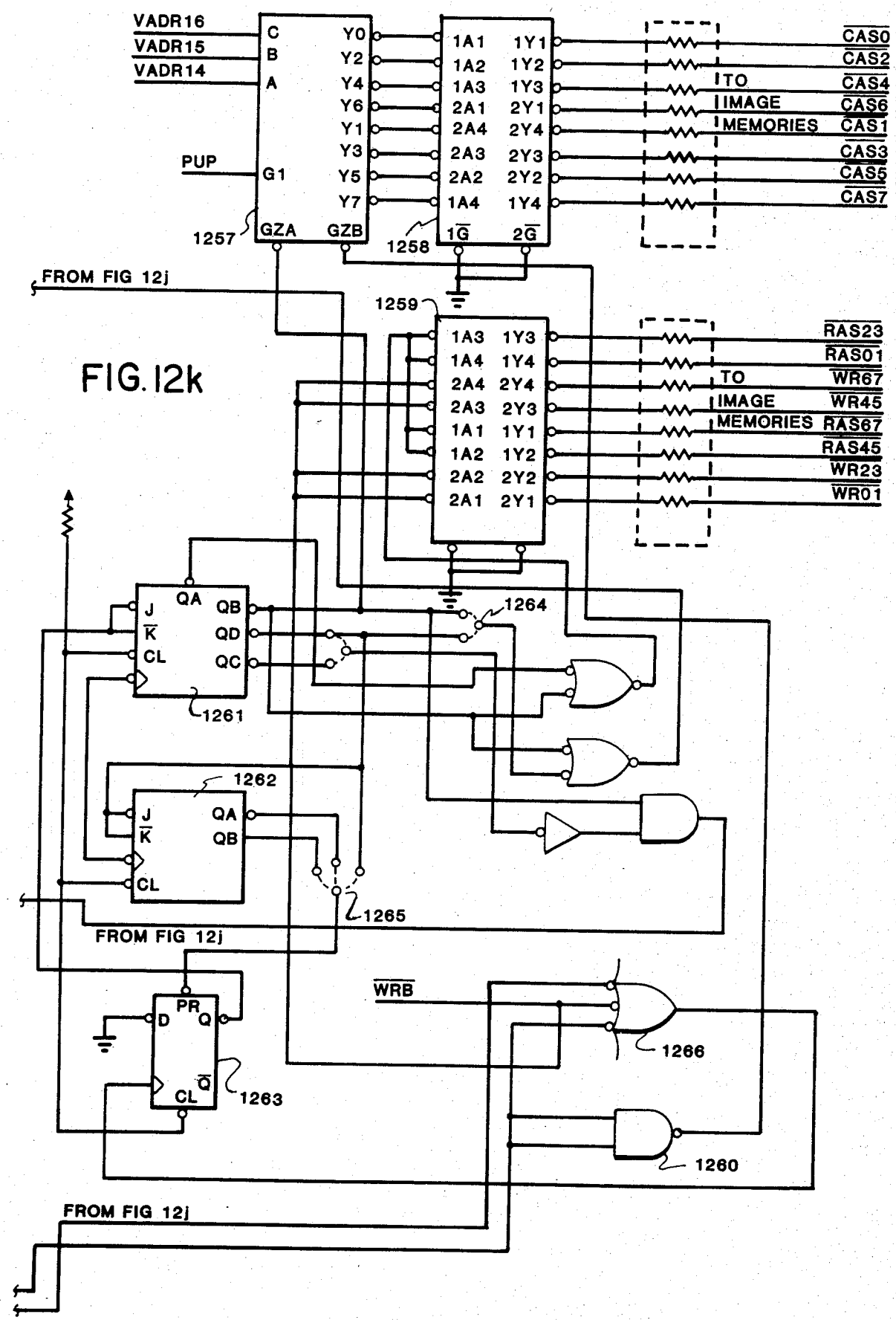
Figure 12L:
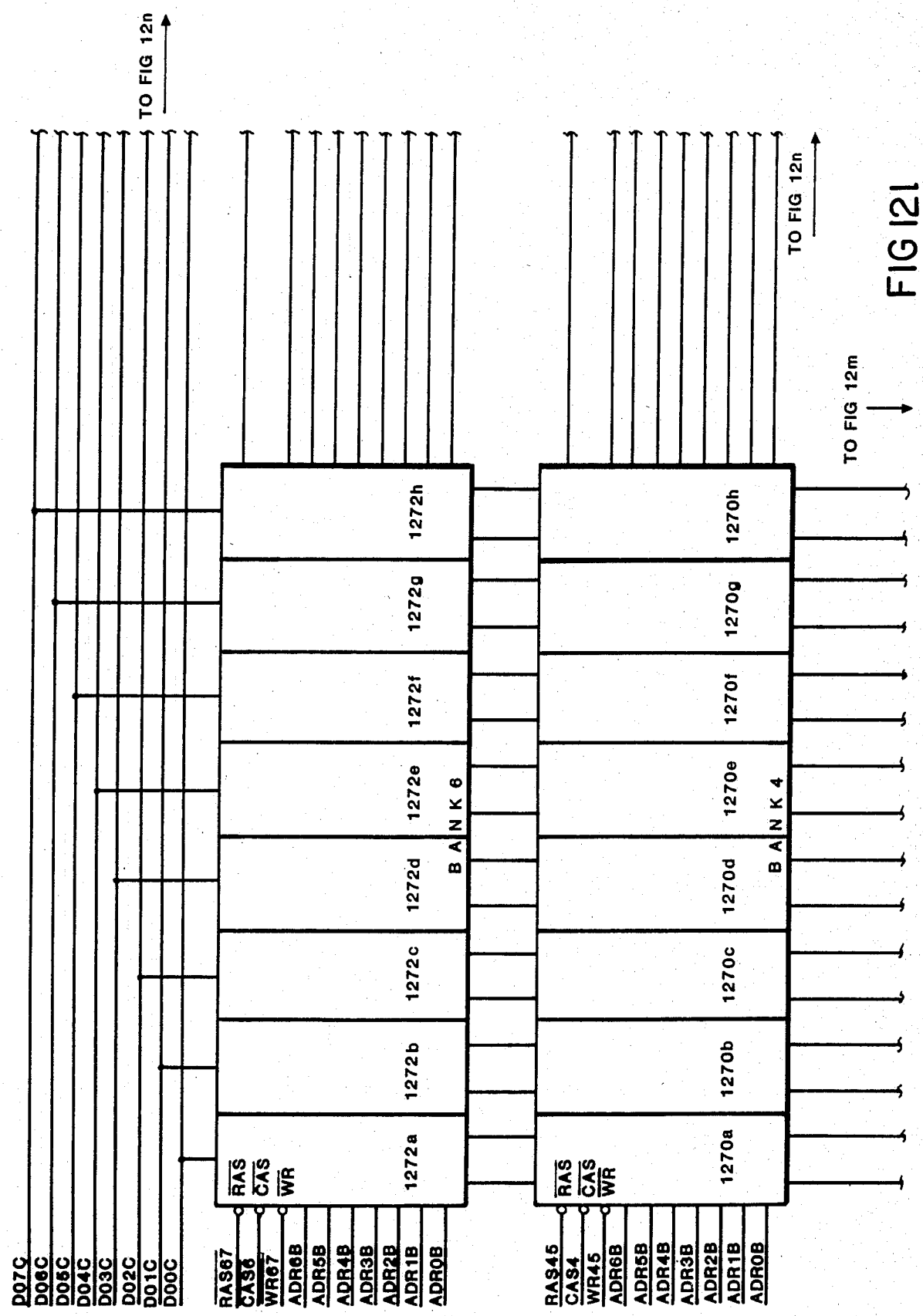

Referring now to FIGS. 12j and 12k, and the joint figure formed thereby, there is depicted a schematic representation of the display memory timing and control circuitry of the video formatter of the present invention.

Multiplexers 1251 and 1252 are utilized to multiplex the video address into row and column addresses. The outputs of multiplexers 1251 and 1252 are coupled to buffers 1253 and 1254, which are utilized to drive the image memory address lines.

Data is written into the image memory via write buffer 1255 and may be read out onto the data bus via buffer 1256. One of eight decoder 1257 is utilized to decode the highest three bits of video address to select one of the eight banks of image memory. A bank of image memory is selected by selecting the proper column address strobe signal (CAS). The selected bank column address strobe signal is driven by buffer 1258, which is disabled during refresh by the output of logic gate 1260, acting as an inverter.

Buffer 1259 is utilized to drive the write and row address strobe signals. Shift registers 1261 and 1262 are driven by the 30.5 megahertz clock and are utilized to generate timing signals for the image memory. Wire strap options 1264 and 1265 are utilized to vary the timing signals generated to accomodate various types of integrated circuit memories which may be utilized in the image memory. Multivibrator 1263 is cleared by the output of logic gate 1266 during a read, write or refresh action, and serves to control shift registers 1261 and 1262.

Referring now to the joint figure formed by joining FIGS. 12l, 12m, 12n and 12o, there is depicted a schematic representation of the image memory of the video formatter of the present invention. Image memory integrated circuits 1266a–h, 1267a–h, 1268a–h, 1269a–h, 1270a–h, 1271a–h, 1272a–h and 1273a–h are each, in a preferred embodiment, a 16K bit dynamic random access memory, such as the TMS 4116 manufactured by Texas Instruments, Incorporated of Dallas, Tex. The eight banks of memory form a 128K byte image memory which contains sufficient image data to accurately portray an entire display image. Further, in addition to image data, alphanumeric character codes may be stored within the image memory for character generation by means of video generator 1173 (see FIG. 11n).

Figure 12P:
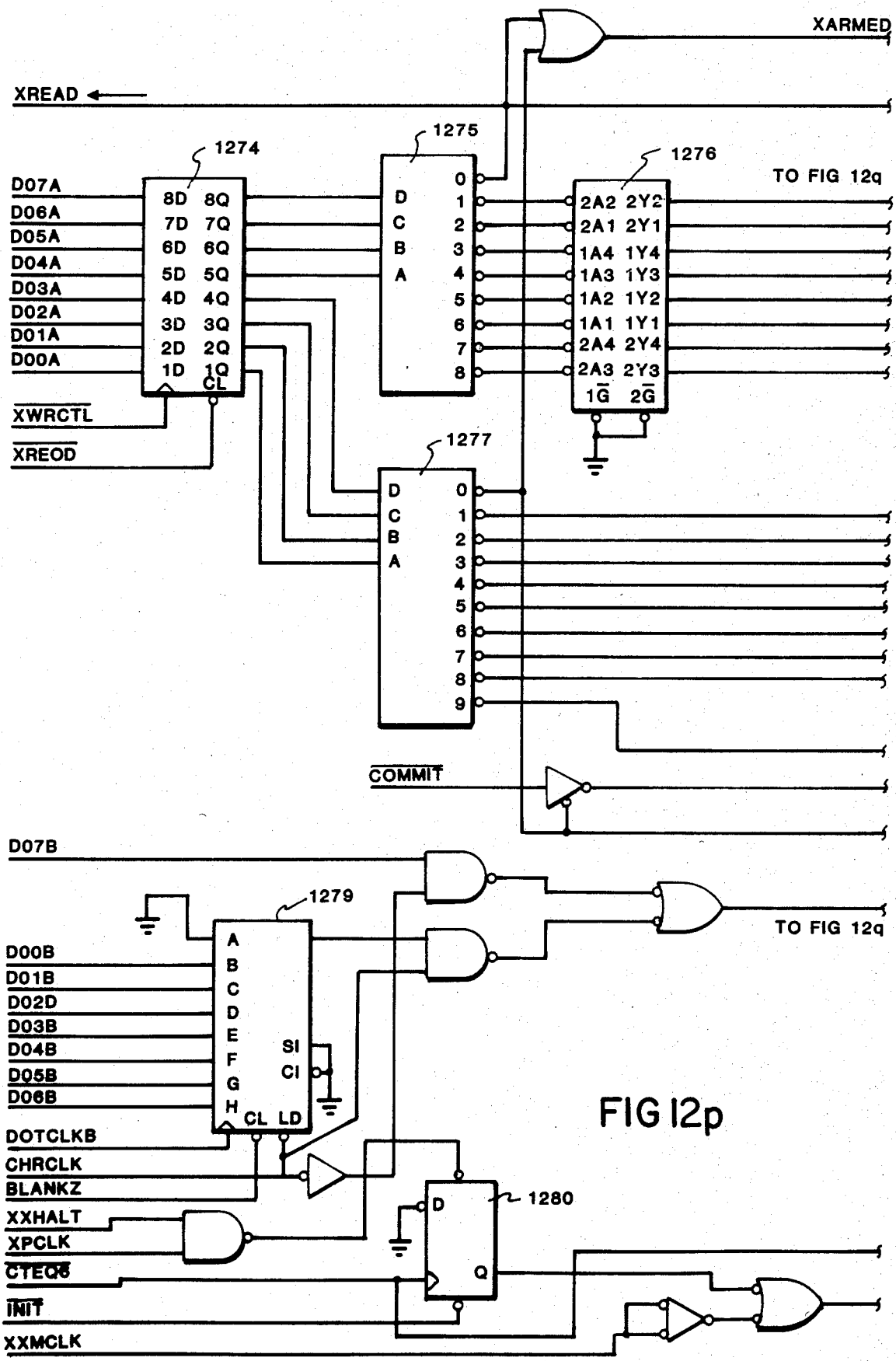

Finally now, referring to the joint figures formed by joining FIGS. 12p and 12q in the manner indicated in the figures, there is depicted a schematic diagram of the interface circuitry which couples the video formatter of the present invention to the other subsystems in the document processor by means of the X bus.

X bus control register 1274 is an internal video formatter register which is directly addressable by the external control device in the manner described herein. The data input to X bus control register 1274 is utilized to select a particular one of the eight X bus channels, and also specifies whether the video formatter will receive data or transmit data.

The upper four bits in X bus control register 1274 specify a receive condition and are applied to one of ten decoder 1275. The output of one of ten decoder 1275 is applied to inverter buffer 1276 and is then utilized to select one of the eight X bus transceivers 1278a-h.

In the transmit mode, the lower four bits of X bus control register 1274 are utilized and specify a transmit condition. The lower four bits are applied to one of ten decoder 1277, the output of which is utilized to select one of eight X bus transceivers 1278a-h.

During transmission of data from the video formatter, eight bit wide bytes of data are coupled to parallel in-out shift register 1279 for serialization and application to X bus transceivers 1278a-h.

Multivibrator 1280 is utilized to temporarily pause transmission of data during the refresh cycle, and is gated to ensure that the pause takes place at the end of a clock pulse, to prevent possible split clocks. Multivibrator 1281 is set and holds the clock low when the end of image data is encountered. After the last bit of data in the sixteen display zone has been transmitted, multivibrator 1281 is set and remains set until cleared by the external control device. This provides the end of data signal to the receiving device.

LASER PRINTER SUBSYSTEM

An important feature of the document processing system of the present invention is the ability to produce a facsimile image of the entire image of a processed document, any portion thereof, or multiple portions thereof, for inclusion in a statement, letter, or other document. With reference again to FIG. 1, the document images for a plurality of documents are stored, in one preferred embodiment, in magnetic disk storage. Digital computer 100 accesses a selected plurality of digital images via disk controller 102 and channel selector 116.

The selected digital images are transferred through multiplexed direct memory access 166, a sixteen channel direct memory access designed to be compatible with digital computer 100. The selected digital images are then transferred to local X bus through multiplexed direct memory access 164, a four channel direct memory access designed to be compatible with the microprocessor utilized in the local subsystems. If the image data selected is in compacted form, it is transferred via local X bus to digital image expander 162 for expansion. The resultant expanded data is transferred through X bus distributor 170 and X bus distributor 132 into a video formatter 134 for formatting and interfacing into the sequence required by the specific laser printer system. Video formatter 134 utilizes identical circuitry to that utilized in video formatters 1008, 1010, 1012 and 1014 of FIG. 10, and that circuitry is explained in greater depth with reference to FIGS. 11a-11o and 12a-12q. The properly formatted image data is temporarily stored in image memory 128, and selectively applied to laser printer 130 by printer controller 126.

Video formatter 134 may also be utilized to generate alphanumeric characters for use in addition to the digital image data, in those applications wherein a single document is required to have an image and alphanumeric information. In such applications, the image and data required for the alphanumeric characters are both stored in image memory 128.

Laser printer 130, in the embodiment disclosed, is a Model ND2 high speed printer manufactured by the Siemens Corporation of Cherry Hill, N.J. Laser printer 130 employs laser technology and electrophotographic techniques. The digital image data is utilized to control a laser which exposes selected portions of a rotating, photoconductor surfaced drum. Toner will adhere to the exposed portions of the drum and will then be transferred to paper in the manner well known in the art.

It should be appreciated by those skilled in the art that ink jet or other state of the art printing systems may be utilized with the document processing system of the present invention.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

TABLE I

| CODE | CODED COUNT LENGTH | ACTUAL CODE LENGTH |
|---|---|---|
| MAPPING MODE | | |
| 000 | 2 BIT MAP COUNT | 1 TO 4 BITS LONG |
| 001 | 3 BIT MAP COUNT | 5 TO 12 BITS LONG |
| 0100 | 4 BIT MAP COUNT | 13 TO 28 BITS LONG |
| 1111000 | 4 BIT MAP COUNT | 29 TO 44 BITS LONG |
| 111111110 | 5 BIT MAP COUNT | 45 TO 76 BITS LONG |
| DUPLICATE MODE | | |
| 1111101 | 3 BIT DUPLICATE COUNT | 5 TO 12 BITS LONG |
| 1111010 | 4 BIT DUPLICATE COUNT | 13 TO 28 BITS LONG |
| 1111001 | 5 BIT DUPLICATE COUNT | 29 TO 60 BITS LONG |
| 1110100 | 6 BIT DUPLICATE COUNT | 61 TO 124 BITS LONG |
| 1110110 | 7 BIT DUPLICATE COUNT | 125 TO 252 BITS LONG |
| 111000100 | 10 BIT DUPLICATE COUNT | 253 TO 1276 BITS LONG |
| 111000101 | 10 BIT DUPLICATE COUNT | 1277 TO 2300 BITS LONG |
| 1110101 | 11 BIT DUPLICATE COUNT | 2301 TO 4095 BITS LONG |
| 11111111001 | 4096 DUPLICATES | |
| BLACK CELL MODE | | |
| 0101 | 3 BIT BLACK COUNT | 8 TO 15 BITS LONG |
| 1010 | 4 BIT BLACK COUNT | 16 TO 31 BITS LONG |
| 1110010 | 5 BIT BLACK COUNT | 32 TO 63 BITS LONG |
| 111111101 | 6 BIT BLACK COUNT | 64 TO 127 BITS LONG |

TABLE I-continued

| CODE | CODED COUNT LENGTH | ACTUAL CODE LENGTH |
|---|---|---|
| 11111111000 | 7 BIT BLACK COUNT | 128 TO 255 BITS LONG |
| WHITE CELL MODE | | |
| 1011 | 3 BIT WHITE COUNT | 8 TO 15 BITS LONG |
| 1001 | 4 BIT WHITE COUNT | 16 TO 31 BITS LONG |
| 1000 | 5 BIT WHITE COUNT | 32 TO 63 BITS LONG |
| 1100 | 6 BIT WHITE COUNT | 64 TO 127 BITS LONG |
| 1110000 | 7 BIT WHITE COUNT | 128 TO 255 BITS LONG |
| 1110011 | 8 BIT WHITE COUNT | 256 TO 511 BITS LONG |
| 111111000 | 9 BIT WHITE COUNT | 512 TO 1023 BITS LONG |
| 1110111 | 11 BIT WHITE COUNT COUNT | 1024 TO 3071 BITS LONG |
| 111000110 | 10 BIT WHITE COUNT COUNT | 3072 TO 4095 BITS LONG |
| 111000111 | 4096 WHITE | |
| Q CODE MODE | | |
| 0110 | 2 BIT Q1 COUNT | 2 TO 5 BITS LONG |
| 1111100 | 3 BIT Q1 COUNT | 6 TO 13 BITS LONG |
| 1111111010 | 5 BIT Q1 COUNT | 14 TO 45 BITS LONG |
| 0111 | 2 BIT Q2 COUNT | 2 TO 5 BITS LONG |
| 1111011 | 3 BIT Q2 COUNT | 6 TO 13 BITS LONG |
| 1111111011 | 5 BIT Q2 COUNT | 14 TO 45 BITS LONG |
| 1101 | 2 BIT Q3 COUNT | 2 TO 5 BITS LONG |
| 1111110 | 3 BIT Q3 COUNT | 6 TO 13 BITS LONG |
| 1111111001 | 5 BIT Q3 COUNT | 14 TO 45 BITS LONG |

What is claimed is:

1. Apparatus for processing documents, comprising:
   (a) transport means for continuously transporting said documents along a transport path;
   (b) encoding means disposed adjacent said transport path for selectively encoding machine readable data upon said documents, said encoding means comprising a plurality of fixed dies, a plurality of electronically controlled hammers, and a magnetic ink bearing ribbon interposed between said documents and said dies and being transported at the same velocity as the velocity of transport of said documents;
   (c) reader means disposed adjacent said transport path for reading machine readable data on said documents while said documents are transported, without interruption, past said reader means; and
   (d) image capture means disposed adjacent said transport path for capturing and digitizing an image of at least a portion of said documents, said image capture means comprising means for vertically scanning said documents, means for horizontally analyzing consecutive vertical scans to identify black and white sections as well as repetitive patterns of said image, and means for generating distinctive codes representative of said analyzing.

* * * * *